United States Patent
Binder

(10) Patent No.: US 11,095,708 B2
(45) Date of Patent: *Aug. 17, 2021

(54) INFORMATION DEVICE

(75) Inventor: Yehuda Binder, Hod Hasharon (IL)

(73) Assignee: May Patents Ltd., Hod-Hasharon (IL)

( * ) Notice: Subject to any disclaimer, the term of this patent is extended or adjusted under 35 U.S.C. 154(b) by 822 days.

This patent is subject to a terminal disclaimer.

(21) Appl. No.: 12/889,998

(22) Filed: Sep. 24, 2010

(65) Prior Publication Data

US 2011/0013758 A1   Jan. 20, 2011

Related U.S. Application Data

(63) Continuation of application No. 12/358,571, filed on Jan. 23, 2009, which is a continuation of application No. 11/506,907, filed on Aug. 21, 2006, now abandoned, which is a continuation of application No. 11/017,060, filed on Dec. 21, 2004, now abandoned.

(30) Foreign Application Priority Data

Jan. 13, 2004 (IL) .......................... 159838

(51) Int. Cl.
  *H04L 29/08* (2006.01)
  *H04L 12/66* (2006.01)
  *H04L 29/06* (2006.01)

(52) U.S. Cl.
  CPC .............. *H04L 67/10* (2013.01); *H04L 12/66* (2013.01); *H04L 65/60* (2013.01); *H04L 67/02* (2013.01); *H04L 67/2842* (2013.01); *H04L 67/06* (2013.01)

(58) Field of Classification Search
  USPC ........ 379/93.17, 93.25, 93.28, 90.01, 110.01
  See application file for complete search history.

(56) References Cited

U.S. PATENT DOCUMENTS

| | | | |
|---|---|---|---|
| 404,721 A | 6/1889 | Messer |
| 405,422 A | 6/1889 | Law et al. |
| 2,264,395 A | 12/1941 | Mitchell |
| 2,264,396 A | 12/1941 | Moore |
| 2,510,273 A | 6/1950 | Barstow et al. |
| 2,516,211 A | 7/1950 | Hochgraf |
| 2,568,342 A | 9/1951 | Koehler et al. |
| 2,680,162 A | 6/1954 | Brehm et al. |

(Continued)

FOREIGN PATENT DOCUMENTS

| | | |
|---|---|---|
| CA | 2459117 A1 | 3/2003 |
| EP | 1 009 156 A2 | 6/2000 |

(Continued)

OTHER PUBLICATIONS

IS-60.04; Node Communications Protocol Part 6: Application Layer Specification; Revision Apr. 18, 1996 (129 pages).

(Continued)

*Primary Examiner* — Stella L. Woo

(57) ABSTRACT

A device for obtaining, storing and displaying information from a remote server, the device has a modem for establishing communication sessions with the remote server. A memory coupled to the modem stores the obtained information, and a display is coupled to the memory for displaying the stored information. The device automatically and periodically communicates with the remote server for obtaining the information.

24 Claims, 26 Drawing Sheets

(56) References Cited

U.S. PATENT DOCUMENTS

| | | |
|---|---|---|
| 3,280,259 A | 10/1966 | Cotter |
| 3,369,078 A | 2/1968 | Stradley |
| 3,406,344 A | 10/1968 | Hopper |
| 3,511,936 A | 5/1970 | Saltzberg |
| 3,529,088 A | 9/1970 | Hauer |
| 3,539,727 A | 11/1970 | Pasternack |
| 3,651,471 A | 3/1972 | Hasselwood et al. |
| 3,699,523 A | 10/1972 | Percher |
| 3,723,653 A | 3/1973 | Tatsuzawa |
| 3,835,334 A | 9/1974 | Notteau |
| 3,870,822 A | 3/1975 | Matthews |
| 3,872,253 A | 3/1975 | Jurschak |
| 3,873,771 A | 3/1975 | Kleinerman et al. |
| 3,875,339 A | 4/1975 | Gruen et al. |
| 3,876,984 A | 4/1975 | Chertok |
| 3,922,490 A | 11/1975 | Pettis |
| 3,937,889 A | 2/1976 | Bell, III et al. |
| 3,949,172 A | 4/1976 | Brown et al. |
| 3,968,333 A | 7/1976 | Simokat et al. |
| 3,992,589 A | 11/1976 | Kuegler |
| 4,008,369 A | 2/1977 | Theurer et al. |
| 4,035,838 A | 7/1977 | Bassani et al. |
| 4,054,910 A | 10/1977 | Chou et al. |
| 4,058,678 A | 11/1977 | Dunn et al. |
| 4,171,467 A | 10/1979 | Evenchik |
| 4,197,431 A | 4/1980 | Vis |
| 4,206,320 A | 6/1980 | Keasler et al. |
| 4,232,200 A | 11/1980 | Hestad et al. |
| 4,241,243 A | 12/1980 | Ball |
| 4,262,171 A | 4/1981 | Schneider et al. |
| 4,302,629 A | 11/1981 | Foulkes et al. |
| 4,328,579 A | 5/1982 | Hashimoto et al. |
| 4,332,980 A | 6/1982 | Reynolds et al. |
| 4,339,816 A | 7/1982 | Reed |
| 4,349,706 A | 8/1982 | Thompson |
| 4,367,548 A | 1/1983 | Cotten, Jr. et al. |
| 4,373,117 A | 2/1983 | Pierce |
| 4,378,470 A | 3/1983 | Murto et al. |
| 4,380,009 A | 4/1983 | Long et al. |
| 4,387,271 A | 6/1983 | Artom |
| 4,388,489 A | 6/1983 | Wigan et al. |
| 4,393,508 A | 7/1983 | Boudault |
| 4,395,590 A | 7/1983 | Pierce |
| 4,415,774 A | 11/1983 | Driver |
| 4,417,099 A | 11/1983 | Pierce |
| 4,424,967 A | 1/1984 | Yokoi et al. |
| 4,425,642 A | 1/1984 | Moses et al. |
| 4,431,869 A | 2/1984 | Sweet |
| 4,433,212 A | 2/1984 | Moses et al. |
| 4,441,106 A | 4/1984 | Jackson |
| 4,442,320 A | 4/1984 | James et al. |
| 4,442,540 A | 4/1984 | Allen |
| 4,443,662 A | 4/1984 | Nakhla |
| 4,444,999 A | 4/1984 | Sparrevohn |
| 4,449,218 A | 5/1984 | Strehl |
| 4,456,985 A | 6/1984 | Carsten et al. |
| 4,456,986 A | 6/1984 | Carsten et al. |
| 4,459,434 A | 7/1984 | Benning et al. |
| 4,475,193 A | 10/1984 | Brown |
| 4,479,033 A | 10/1984 | Brown et al. |
| 4,485,400 A | 11/1984 | Lemelson et al. |
| 4,493,948 A | 1/1985 | Sues et al. |
| 4,500,751 A | 2/1985 | Darland et al. |
| 4,506,387 A | 3/1985 | Walter |
| 4,507,721 A | 3/1985 | Yamano et al. |
| 4,514,594 A | 4/1985 | Brown et al. |
| 4,521,881 A | 6/1985 | Stapleford et al. |
| 4,523,307 A | 6/1985 | Brown et al. |
| 4,528,422 A | 7/1985 | Cupani |
| 4,543,450 A | 9/1985 | Brandt |
| 4,546,212 A | 10/1985 | Crowder, Sr. |
| 4,559,415 A | 12/1985 | Bernard et al. |
| 4,561,020 A | 12/1985 | Matsuda |
| 4,564,940 A | 1/1986 | Yahata |
| 4,577,311 A | 3/1986 | Duquesne et al. |
| 4,577,314 A | 3/1986 | Chu et al. |
| 4,578,533 A | 3/1986 | Pierce |
| 4,578,535 A | 3/1986 | Simmons |
| 4,578,540 A | 3/1986 | Borg et al. |
| 4,580,291 A | 4/1986 | Ab Der Halden |
| 4,583,214 A | 4/1986 | Miyashita et al. |
| 4,584,690 A | 4/1986 | Cafiero et al. |
| 4,592,069 A | 5/1986 | Redding |
| 4,593,389 A | 6/1986 | Wurzburg et al. |
| 4,597,077 A | 6/1986 | Nelson et al. |
| 4,604,741 A | 8/1986 | Barsellotti |
| 4,608,686 A | 8/1986 | Barsellotti |
| 4,631,367 A | 12/1986 | Coviello et al. |
| 4,639,714 A | 1/1987 | Crowe |
| 4,642,607 A | 2/1987 | Strom et al. |
| 4,644,526 A | 2/1987 | Wu |
| 4,646,289 A | 2/1987 | Tsiakas et al. |
| 4,646,296 A | 2/1987 | Bartholet et al. |
| 4,649,551 A | 3/1987 | Sander et al. |
| 4,656,655 A | 4/1987 | Hashimoto |
| 4,665,516 A | 5/1987 | Middleton et al. |
| 4,670,870 A | 6/1987 | Hewinson et al. |
| 4,670,874 A | 6/1987 | Sato et al. |
| 4,672,602 A | 6/1987 | Hargrave et al. |
| 4,672,605 A | 6/1987 | Hustig et al. |
| 4,677,646 A | 6/1987 | Dodds et al. |
| 4,679,227 A | 7/1987 | Hughes-Hartogs |
| 4,691,344 A | 9/1987 | Brown et al. |
| 4,701,945 A | 10/1987 | Pedigo |
| 4,703,499 A | 10/1987 | Fossas et al. |
| 4,709,412 A | 11/1987 | Seymour et al. |
| 4,724,435 A | 2/1988 | Moses et al. |
| 4,731,821 A | 3/1988 | Jackson, III |
| 4,733,380 A | 3/1988 | Havira |
| 4,733,389 A | 3/1988 | Puvogel |
| 4,734,932 A | 3/1988 | Lott |
| 4,742,538 A | 5/1988 | Szlam |
| 4,751,578 A | 6/1988 | Reiter et al. |
| 4,754,326 A | 6/1988 | Kram et al. |
| 4,757,495 A | 7/1988 | Decker et al. |
| 4,757,497 A | 7/1988 | Beierle et al. |
| 4,761,646 A | 8/1988 | Choquet et al. |
| 4,764,922 A | 8/1988 | Dieter et al. |
| 4,766,402 A | 8/1988 | Crane |
| 4,768,110 A | 8/1988 | Dunlap et al. |
| 4,768,206 A | 8/1988 | Van Gerwen |
| 4,769,837 A | 9/1988 | McCormick et al. |
| 4,772,870 A | 9/1988 | Reyes |
| 4,776,006 A | 10/1988 | Comerford et al. |
| 4,780,757 A | 10/1988 | Bryer et al. |
| 4,780,758 A | 10/1988 | Lin et al. |
| 4,785,448 A | 11/1988 | Reichert et al. |
| 4,785,472 A | 11/1988 | Shapiro |
| 4,789,895 A | 12/1988 | Mustafa et al. |
| 4,789,994 A | 12/1988 | Randall et al. |
| 4,797,914 A | 1/1989 | Vaello |
| 4,799,213 A | 1/1989 | Fitzgerald |
| 4,803,719 A * | 2/1989 | Ulrich ............... H04M 19/08 379/399.01 |
| 4,807,225 A | 2/1989 | Fitch |
| 4,815,106 A | 3/1989 | Propp et al. |
| 4,821,319 A | 4/1989 | Middleton et al. |
| 4,825,435 A | 4/1989 | Amundsen et al. |
| 4,829,570 A | 5/1989 | Scholz |
| 4,837,799 A | 6/1989 | Prohs et al. |
| 4,839,743 A | 6/1989 | Best et al. |
| 4,843,606 A | 6/1989 | Bux et al. |
| 4,847,903 A | 7/1989 | Schotz |
| 4,849,811 A | 7/1989 | Kleinerman |
| 4,850,007 A | 7/1989 | Marino et al. |
| 4,866,602 A | 9/1989 | Hall |
| 4,866,704 A | 9/1989 | Bergman |
| 4,872,197 A | 10/1989 | Pemmaraju |
| 4,882,747 A | 11/1989 | Williams |
| 4,885,747 A | 12/1989 | Foglia |
| 4,885,766 A | 12/1989 | Yasuoka et al. |
| 4,885,775 A | 12/1989 | Lucas |
| 4,888,795 A | 12/1989 | Ando et al. |
| 4,890,316 A | 12/1989 | Walsh et al. |

(56) References Cited

U.S. PATENT DOCUMENTS

| | | |
|---|---|---|
| 4,893,326 A | 1/1990 | Duran et al. |
| 4,901,342 A | 2/1990 | Jones |
| 4,918,688 A | 4/1990 | Krause et al. |
| 4,918,690 A | 4/1990 | Markkula, Jr. et al. |
| 4,924,492 A | 5/1990 | Gitlin et al. |
| 4,932,022 A | 6/1990 | Keeney et al. |
| 4,932,047 A | 6/1990 | Emmons et al. |
| 4,939,728 A | 7/1990 | Markkula, Jr. et al. |
| 4,945,404 A | 7/1990 | Miller |
| 4,947,483 A | 8/1990 | Dirr |
| 4,949,187 A | 8/1990 | Cohen |
| 4,953,160 A | 8/1990 | Gupta |
| 4,954,886 A | 9/1990 | Elberbaum |
| 4,955,048 A | 9/1990 | Iwamura et al. |
| 4,969,136 A | 11/1990 | Chamberlain et al. |
| 4,969,147 A | 11/1990 | Markkula, Jr. et al. |
| 4,973,954 A | 11/1990 | Schwarz |
| 4,975,896 A | 12/1990 | D'Agosto, III et al. |
| 4,975,906 A | 12/1990 | Takiyasu et al. |
| 4,979,028 A | 12/1990 | Minematsu et al. |
| 4,985,892 A | 1/1991 | Camarata |
| 4,989,081 A | 1/1991 | Miyagawa et al. |
| 4,995,479 A | 2/1991 | Fujiwara et al. |
| 4,996,709 A | 2/1991 | Heep et al. |
| 5,010,399 A | 4/1991 | Goodman et al. |
| 5,014,308 A | 5/1991 | Fox |
| 5,018,138 A | 5/1991 | Twitty et al. |
| 5,022,069 A | 6/1991 | Chen |
| 5,023,868 A | 6/1991 | Davidson et al. |
| 5,027,426 A | 6/1991 | Chiocca, Jr. |
| 5,032,819 A | 7/1991 | Sakuragi et al. |
| 5,033,062 A | 7/1991 | Morrow et al. |
| 5,034,883 A | 7/1991 | Donaldson et al. |
| 5,036,513 A | 7/1991 | Greenblatt |
| 5,051,822 A | 9/1991 | Rhoades |
| 5,056,629 A | 10/1991 | Tsuji et al. |
| 5,065,133 A | 11/1991 | Howard |
| 5,070,522 A | 12/1991 | Nilssen |
| 5,089,886 A | 2/1992 | Grandmougin |
| 5,090,052 A | 2/1992 | Nakajima et al. |
| 5,095,497 A | 3/1992 | Aman et al. |
| 5,113,498 A | 5/1992 | Evan et al. |
| 5,115,847 A | 5/1992 | Taber |
| 5,125,077 A | 6/1992 | Hall |
| 5,131,020 A | 7/1992 | Liebesny et al. |
| 5,134,387 A | 7/1992 | Smith et al. |
| 5,144,544 A | 9/1992 | Jenneve et al. |
| 5,148,144 A | 9/1992 | Sutterlin et al. |
| 5,157,711 A | 10/1992 | Shimanuki |
| 5,175,764 A | 12/1992 | Patel et al. |
| 5,181,240 A | 1/1993 | Sakuragi et al. |
| 5,192,999 A | 3/1993 | Graczyk et al. |
| 5,210,788 A | 5/1993 | Nilssen |
| 5,216,704 A | 6/1993 | Williams et al. |
| 5,218,352 A | 6/1993 | Endoh et al. |
| 5,218,629 A | 6/1993 | Dumond, Jr. et al. |
| 5,220,597 A | 6/1993 | Horiuchi |
| 5,224,154 A | 6/1993 | Aldridge et al. |
| 5,247,347 A | 9/1993 | Litteral et al. |
| 5,255,267 A | 10/1993 | Hansen et al. |
| 5,257,006 A | 10/1993 | Graham et al. |
| 5,261,825 A | 11/1993 | Chaves |
| 5,283,637 A | 2/1994 | Goolcharan |
| 5,289,359 A | 2/1994 | Ziermann |
| 5,301,028 A | 4/1994 | Banker et al. |
| 5,317,391 A | 5/1994 | Banker et al. |
| 5,319,634 A | 6/1994 | Bartholomew et al. |
| 5,323,461 A | 6/1994 | Rosenbaum et al. |
| 5,341,415 A | 8/1994 | Baran |
| 5,343,514 A | 8/1994 | Snyder |
| 5,347,549 A | 9/1994 | Baumann |
| 5,351,272 A | 9/1994 | Abraham |
| 5,353,334 A | 10/1994 | O'Sullivan |
| 5,357,276 A | 10/1994 | Banker et al. |
| 5,359,374 A | 10/1994 | Schwartz |
| 5,363,432 A | 11/1994 | Martin et al. |
| 5,365,448 A | 11/1994 | Nobe et al. |
| 5,367,571 A | 11/1994 | Bowen et al. |
| 5,379,005 A | 1/1995 | Aden et al. |
| 5,387,942 A | 2/1995 | Lemelson |
| 5,391,932 A | 2/1995 | Small et al. |
| 5,400,401 A | 3/1995 | Wasilewski et al. |
| 5,406,260 A | 4/1995 | Cummings et al. |
| 5,408,260 A | 4/1995 | Arnon |
| 5,410,343 A | 4/1995 | Coddington et al. |
| 5,414,811 A | 5/1995 | Parulski et al. |
| 5,420,578 A | 5/1995 | O'Brien et al. |
| 5,420,886 A | 5/1995 | Ohmori |
| 5,424,710 A | 6/1995 | Baumann |
| 5,428,682 A | 6/1995 | Apfel |
| 5,430,656 A | 7/1995 | Dekel et al. |
| 5,440,335 A | 8/1995 | Beveridge |
| 5,448,635 A | 9/1995 | Biehl et al. |
| 5,452,289 A | 9/1995 | Sharma et al. |
| 5,454,008 A | 9/1995 | Baumann et al. |
| 5,461,671 A | 10/1995 | Sakuragi et al. |
| 5,463,616 A | 10/1995 | Kruse et al. |
| 5,475,687 A | 12/1995 | Markkula, Jr. et al. |
| 5,483,574 A | 1/1996 | Yuyama |
| 5,485,897 A | 1/1996 | Matsumoto et al. |
| 5,499,465 A | 3/1996 | Manico |
| 5,526,035 A | 6/1996 | Lappington et al. |
| 5,530,737 A | 6/1996 | Bartholomew et al. |
| 5,530,748 A | 6/1996 | Ohmori |
| 5,533,101 A | 7/1996 | Miyagawa |
| 5,539,805 A | 7/1996 | Bushue et al. |
| 5,544,243 A | 8/1996 | Papadopoulos |
| 5,546,385 A | 8/1996 | Caspi et al. |
| 5,548,592 A | 8/1996 | Komarek et al. |
| 5,548,614 A | 8/1996 | Stoll et al. |
| 5,550,836 A | 8/1996 | Albrecht et al. |
| 5,553,063 A | 9/1996 | Dickson |
| 5,553,138 A | 9/1996 | Heald et al. |
| 5,565,910 A | 10/1996 | Rowse et al. |
| 5,566,233 A | 10/1996 | Liu |
| 5,568,547 A | 10/1996 | Nishimura |
| 5,570,085 A | 10/1996 | Bertsch |
| 5,574,748 A | 11/1996 | Vander Mey et al. |
| 5,581,555 A | 12/1996 | Dubberly et al. |
| 5,583,577 A | 12/1996 | Tsukagoshi |
| 5,583,934 A | 12/1996 | Zhou |
| 5,584,070 A | 12/1996 | Harris et al. |
| 5,585,838 A | 12/1996 | Lawler et al. |
| 5,587,692 A | 12/1996 | Graham et al. |
| 5,589,892 A | 12/1996 | Knee et al. |
| 5,592,540 A | 1/1997 | Beveridge |
| 5,592,551 A | 1/1997 | Lett et al. |
| 5,594,732 A | 1/1997 | Bell et al. |
| 5,596,631 A | 1/1997 | Chen |
| 5,599,190 A | 2/1997 | Willette |
| 5,599,206 A | 2/1997 | Slack et al. |
| 5,600,364 A | 2/1997 | Hendricks et al. |
| 5,604,737 A | 2/1997 | Iwami et al. |
| 5,604,791 A | 2/1997 | Lee |
| 5,608,792 A | 3/1997 | Laidler |
| 5,610,916 A | 3/1997 | Kostreski et al. |
| 5,615,324 A | 3/1997 | Kuboyama |
| 5,619,252 A | 4/1997 | Nakano |
| 5,621,455 A | 4/1997 | Rogers et al. |
| 5,623,537 A | 4/1997 | Ensor et al. |
| 5,625,673 A | 4/1997 | Grewe et al. |
| 5,625,863 A | 4/1997 | Abraham |
| 5,627,827 A | 5/1997 | Dale et al. |
| 5,628,055 A | 5/1997 | Stein |
| 5,646,983 A | 7/1997 | Suffern et al. |
| 5,650,770 A | 7/1997 | Schlager et al. |
| 5,651,696 A | 7/1997 | Jennison |
| 5,654,886 A | 8/1997 | Zereski, Jr. et al. |
| 5,659,608 A | 8/1997 | Stiefel |
| 5,664,228 A | 9/1997 | Mital |
| 5,668,591 A | 9/1997 | Shintani |
| 5,675,375 A | 10/1997 | Riffee |
| 5,675,629 A | 10/1997 | Raffel et al. |
| 5,682,423 A | 10/1997 | Walker |

(56) References Cited

U.S. PATENT DOCUMENTS

| | | |
|---|---|---|
| 5,682,441 A | 10/1997 | Ligtenberg et al. |
| 5,684,826 A | 11/1997 | Bratner |
| 5,689,641 A | 11/1997 | Ludwig et al. |
| 5,696,790 A | 12/1997 | Graham et al. |
| 5,705,974 A | 1/1998 | Patel et al. |
| 5,706,007 A | 1/1998 | Fragnito et al. |
| 5,706,157 A | 1/1998 | Galecki et al. |
| 5,708,701 A | 1/1998 | Houvig et al. |
| 5,708,961 A | 1/1998 | Hylton et al. |
| 5,710,815 A | 1/1998 | Ming et al. |
| 5,710,884 A | 1/1998 | Dedrick |
| 5,721,815 A | 2/1998 | Ottesen et al. |
| 5,721,878 A | 2/1998 | Ottesen et al. |
| 5,729,824 A | 3/1998 | O'Neill et al. |
| 5,731,844 A | 3/1998 | Rauch et al. |
| 5,731,847 A | 3/1998 | Tsukagoshi |
| 5,732,074 A | 3/1998 | Spaur et al. |
| 5,732,267 A | 3/1998 | Smith |
| 5,740,549 A | 4/1998 | Reilly et al. |
| 5,742,527 A | 4/1998 | Rybicki et al. |
| 5,742,596 A | 4/1998 | Baratz et al. |
| 5,748,634 A | 5/1998 | Sokol et al. |
| 5,757,803 A | 5/1998 | Russell et al. |
| 5,757,891 A | 5/1998 | Wang |
| 5,757,936 A | 5/1998 | Lee |
| 5,758,258 A | 5/1998 | Shoff et al. |
| 5,764,743 A | 6/1998 | Goedken et al. |
| 5,771,064 A | 6/1998 | Lett |
| 5,774,526 A | 6/1998 | Propp et al. |
| 5,778,303 A | 7/1998 | Shinozaki et al. |
| 5,787,115 A | 7/1998 | Turnbull et al. |
| 5,799,069 A | 8/1998 | Weston et al. |
| 5,802,283 A | 9/1998 | Grady et al. |
| 5,802,292 A | 9/1998 | Mogul |
| 5,805,053 A | 9/1998 | Patel et al. |
| 5,805,591 A | 9/1998 | Naboulsi et al. |
| 5,805,806 A | 9/1998 | McArthur |
| 5,806,005 A | 9/1998 | Hull et al. |
| 5,809,115 A | 9/1998 | Inkinen |
| 5,812,647 A | 9/1998 | Beaumont et al. |
| 5,812,786 A | 9/1998 | Seazholtz et al. |
| 5,815,195 A | 9/1998 | Tam |
| 5,815,681 A | 9/1998 | Kikinis |
| 5,818,710 A | 10/1998 | Levan Suu |
| 5,818,821 A | 10/1998 | Schurig |
| 5,819,284 A * | 10/1998 | Farber et al. ............... 709/203 |
| 5,822,123 A | 10/1998 | Davis et al. |
| 5,822,678 A | 10/1998 | Evanyk |
| 5,825,427 A | 10/1998 | MacLeod |
| 5,826,196 A | 10/1998 | Cuthrell |
| 5,835,005 A | 11/1998 | Furukawa et al. |
| 5,838,683 A | 11/1998 | Corley et al. |
| 5,838,777 A | 11/1998 | Chang et al. |
| 5,841,360 A | 11/1998 | Binder |
| 5,841,418 A | 11/1998 | Bril |
| 5,841,840 A | 11/1998 | Smith et al. |
| 5,841,841 A | 11/1998 | Dodds et al. |
| 5,842,032 A | 11/1998 | Bertsch |
| 5,842,111 A | 11/1998 | Byers |
| 5,844,181 A * | 12/1998 | Amo et al. ............... 187/396 |
| 5,844,888 A | 12/1998 | Markkula et al. |
| 5,848,150 A | 12/1998 | Bingel |
| 5,848,378 A | 12/1998 | Shelton et al. |
| 5,848,397 A | 12/1998 | Marsh et al. |
| 5,854,893 A | 12/1998 | Ludwig et al. |
| 5,862,511 A | 1/1999 | Croyle et al. |
| 5,870,724 A | 2/1999 | Lawlor |
| 5,878,047 A | 3/1999 | Ganek et al. |
| 5,878,133 A | 3/1999 | Zhou et al. |
| 5,878,223 A | 3/1999 | Becker et al. |
| 5,884,086 A | 3/1999 | Amoni et al. |
| 5,884,096 A | 3/1999 | Beasley et al. |
| 5,889,856 A | 3/1999 | O'Toole et al. |
| 5,892,764 A | 4/1999 | Riemann et al. |
| 5,892,792 A | 4/1999 | Walley |
| 5,896,443 A | 4/1999 | Dichter |
| 5,896,556 A | 4/1999 | Moreland et al. |
| 5,903,213 A | 5/1999 | Hodge et al. |
| 5,903,643 A | 5/1999 | Bruhnke |
| 5,905,521 A | 5/1999 | Gatto et al. |
| 5,905,786 A | 5/1999 | Hoopes |
| 5,907,815 A | 5/1999 | Grimm et al. |
| 5,911,119 A | 6/1999 | Bartholomew et al. |
| 5,912,895 A | 6/1999 | Terry et al. |
| 5,913,040 A | 6/1999 | Rakavy et al. |
| 5,918,180 A | 6/1999 | Dimino |
| 5,922,047 A | 7/1999 | Newlin et al. |
| 5,926,116 A | 7/1999 | Kitano et al. |
| 5,929,655 A | 7/1999 | Roe et al. |
| 5,929,896 A | 7/1999 | Goodman et al. |
| 5,930,340 A | 7/1999 | Bell |
| 5,937,055 A | 8/1999 | Kaplan |
| 5,938,757 A | 8/1999 | Bertsch |
| 5,940,400 A | 8/1999 | Eastmond et al. |
| 5,940,479 A | 8/1999 | Guy et al. |
| 5,943,404 A | 8/1999 | Sansom et al. |
| 5,943,630 A | 8/1999 | Busby et al. |
| 5,949,476 A | 9/1999 | Pocock et al. |
| 5,955,710 A | 9/1999 | DiFranza |
| 5,960,066 A | 9/1999 | Hartmann et al. |
| 5,961,603 A | 10/1999 | Kunkel et al. |
| 5,963,539 A | 10/1999 | Webber, Jr. et al. |
| 5,963,595 A | 10/1999 | Graham et al. |
| 5,966,386 A | 10/1999 | Maegawa |
| 5,970,127 A | 10/1999 | Smith et al. |
| 5,974,222 A | 10/1999 | Yuen et al. |
| 5,982,784 A | 11/1999 | Bell |
| 5,982,854 A | 11/1999 | Ehreth |
| 5,983,073 A | 11/1999 | Ditzik |
| 5,986,650 A | 11/1999 | Ellis et al. |
| 5,988,078 A | 11/1999 | Levine |
| 5,990,927 A | 11/1999 | Hendricks et al. |
| 5,991,800 A | 11/1999 | Burke et al. |
| 5,994,998 A | 11/1999 | Fisher et al. |
| 5,995,598 A | 11/1999 | Berstis |
| 5,999,179 A | 12/1999 | Kekic et al. |
| 5,999,207 A | 12/1999 | Rodriguez et al. |
| 6,002,722 A | 12/1999 | Wu |
| 6,005,631 A | 12/1999 | Anderson et al. |
| 6,005,873 A | 12/1999 | Amit |
| 6,011,794 A | 1/2000 | Mordowitz et al. |
| 6,020,880 A | 2/2000 | Naimpally |
| 6,023,241 A | 2/2000 | Clapper |
| 6,026,150 A | 2/2000 | Frank |
| 6,028,604 A | 2/2000 | Matthews, III et al. |
| 6,029,047 A | 2/2000 | Ishida et al. |
| 6,029,111 A | 2/2000 | Croyle |
| 6,034,689 A | 3/2000 | White et al. |
| 6,038,425 A | 3/2000 | Jeffrey |
| 6,046,674 A | 4/2000 | Irwin et al. |
| 6,047,055 A | 4/2000 | Carkner et al. |
| 6,049,823 A | 4/2000 | Hwang |
| 6,052,145 A | 4/2000 | Macrae et al. |
| 6,052,380 A | 4/2000 | Bell |
| 6,052,442 A | 4/2000 | Cooper et al. |
| 6,052,648 A | 4/2000 | Burfeind et al. |
| 6,055,435 A | 4/2000 | Smith et al. |
| 6,055,569 A | 4/2000 | O'Brien et al. |
| 6,058,428 A | 5/2000 | Wang et al. |
| 6,061,357 A | 5/2000 | Olshansky et al. |
| 6,061,392 A | 5/2000 | Bremer et al. |
| 6,069,896 A | 5/2000 | Borgstahl et al. |
| 6,069,899 A | 5/2000 | Foley |
| 6,078,350 A | 6/2000 | Davis |
| 6,081,533 A | 6/2000 | Laubach et al. |
| 6,087,860 A | 7/2000 | Liu et al. |
| 6,088,368 A | 7/2000 | Rubinstain et al. |
| 6,094,441 A | 7/2000 | Jung et al. |
| 6,097,801 A | 8/2000 | Williams et al. |
| 6,101,341 A | 8/2000 | Manabe |
| 6,101,499 A | 8/2000 | Ford et al. |
| 6,101,534 A | 8/2000 | Rothschild |
| 6,107,912 A | 8/2000 | Bullock et al. |
| 6,108,330 A | 8/2000 | Bhatia et al. |

(56) References Cited

U.S. PATENT DOCUMENTS

| | | |
|---|---|---|
| 6,111,764 A | 8/2000 | Atou et al. |
| 6,112,264 A | 8/2000 | Beasley et al. |
| 6,115,468 A | 9/2000 | De Nicolo |
| 6,115,755 A | 9/2000 | Krishan |
| 6,119,167 A | 9/2000 | Boyle |
| 6,128,471 A | 10/2000 | Quelch et al. |
| 6,130,893 A | 10/2000 | Whittaker et al. |
| 6,130,896 A | 10/2000 | Lueker et al. |
| 6,134,235 A | 10/2000 | Goldman et al. |
| 6,134,308 A | 10/2000 | Fallon et al. |
| 6,134,606 A | 10/2000 | Anderson et al. |
| 6,137,865 A | 10/2000 | Ripy et al. |
| 6,137,866 A | 10/2000 | Staber et al. |
| 6,141,356 A | 10/2000 | Gorman |
| 6,144,363 A | 11/2000 | Alloul et al. |
| 6,144,399 A | 11/2000 | Manchester et al. |
| 6,144,702 A | 11/2000 | Yurt et al. |
| 6,144,963 A | 11/2000 | Tsuda |
| 6,151,480 A | 11/2000 | Fischer et al. |
| 6,154,205 A | 11/2000 | Carroll et al. |
| 6,154,465 A | 11/2000 | Pickett |
| 6,154,660 A | 11/2000 | Singh |
| 6,157,377 A | 12/2000 | Shah-Nazaroff et al. |
| 6,157,716 A | 12/2000 | Ortel |
| 6,160,880 A | 12/2000 | Allen |
| 6,163,598 A | 12/2000 | Moore |
| 6,163,816 A | 12/2000 | Anderson et al. |
| 6,167,043 A | 12/2000 | Frantz |
| 6,167,469 A | 12/2000 | Safai et al. |
| 6,167,567 A | 12/2000 | Chiles et al. |
| 6,169,795 B1 | 1/2001 | Dunn et al. |
| 6,175,362 B1 | 1/2001 | Harms et al. |
| 6,175,743 B1 | 1/2001 | Alperovich et al. |
| 6,175,860 B1 | 1/2001 | Gaucher |
| 6,178,230 B1 | 1/2001 | Borland |
| 6,181,324 B1 | 1/2001 | Lamb et al. |
| 6,185,851 B1 | 2/2001 | Loudermilk et al. |
| 6,188,917 B1 | 2/2001 | Laureanti |
| 6,192,044 B1 | 2/2001 | Mack |
| 6,192,399 B1 | 2/2001 | Goodman |
| 6,195,692 B1 | 2/2001 | Hsu |
| 6,198,390 B1 | 3/2001 | Schlager et al. |
| 6,202,211 B1 | 3/2001 | Williams, Jr. |
| 6,205,495 B1 | 3/2001 | Gilbert et al. |
| 6,208,637 B1 | 3/2001 | Eames |
| 6,208,879 B1 | 3/2001 | Iwata et al. |
| 6,209,028 B1 | 3/2001 | Walker et al. |
| 6,212,226 B1 | 4/2001 | Newton |
| 6,212,227 B1 | 4/2001 | Ko et al. |
| 6,212,274 B1 | 4/2001 | Ninh |
| 6,215,483 B1 | 4/2001 | Zigmond |
| 6,215,789 B1 | 4/2001 | Keenan et al. |
| 6,216,160 B1 | 4/2001 | Dichter |
| 6,218,930 B1 | 4/2001 | Katzenberg et al. |
| 6,219,694 B1 | 4/2001 | Lazaridis et al. |
| 6,227,499 B1 | 5/2001 | Jennison et al. |
| 6,233,389 B1 | 5/2001 | Barton et al. |
| 6,236,653 B1 | 5/2001 | Dalton et al. |
| 6,236,664 B1 | 5/2001 | Erreygers |
| 6,237,022 B1 | 5/2001 | Bruck et al. |
| 6,237,025 B1 | 5/2001 | Ludwig et al. |
| 6,240,166 B1 | 5/2001 | Collin et al. |
| 6,243,571 B1 | 6/2001 | Bullock et al. |
| 6,243,578 B1 | 6/2001 | Koike |
| 6,246,748 B1 | 6/2001 | Yano |
| 6,252,957 B1 | 6/2001 | Jauregui et al. |
| 6,253,228 B1 | 6/2001 | Ferris et al. |
| 6,256,193 B1 | 7/2001 | Janik et al. |
| 6,256,518 B1 | 7/2001 | Buhrmann |
| 6,259,775 B1 | 7/2001 | Alpert et al. |
| 6,262,769 B1 | 7/2001 | Anderson et al. |
| 6,263,503 B1 | 7/2001 | Margulis |
| 6,263,505 B1 | 7/2001 | Walker et al. |
| 6,266,069 B1 | 7/2001 | Thagard et al. |
| 6,266,539 B1 | 7/2001 | Pardo |
| 6,268,849 B1 | 7/2001 | Boyer et al. |
| 6,272,553 B2 | 8/2001 | Way et al. |
| 6,272,680 B1 | 8/2001 | Gaughan et al. |
| 6,278,862 B1 | 8/2001 | Henderson |
| 6,282,238 B1 | 8/2001 | Landry |
| 6,282,277 B1 | 8/2001 | DeBalko |
| 6,285,754 B1 | 9/2001 | Sun et al. |
| 6,292,467 B1 | 9/2001 | Keller |
| 6,292,517 B1 | 9/2001 | Jeffress et al. |
| 6,295,356 B1 | 9/2001 | De Nicolo |
| 6,215,411 B1 | 10/2001 | Gothard |
| 6,259,891 B1 | 10/2001 | Allen |
| 6,298,037 B1 | 10/2001 | Sharifi |
| 6,301,607 B2 | 10/2001 | Barraclough et al. |
| 6,310,886 B1 | 10/2001 | Barton |
| 6,310,894 B1 | 10/2001 | Counterman |
| 6,314,457 B1 | 11/2001 | Schena et al. |
| 6,317,777 B1 | 11/2001 | Skarbo et al. |
| 6,317,884 B1 | 11/2001 | Eames et al. |
| 6,320,866 B2 | 11/2001 | Wolf et al. |
| 6,320,900 B1 | 11/2001 | Liu |
| 6,320,941 B1 | 11/2001 | Tyroler |
| 6,324,268 B1 | 11/2001 | Balachandran et al. |
| 6,324,338 B1 | 11/2001 | Wood et al. |
| 6,332,020 B1 | 12/2001 | Mitchell et al. |
| 6,334,160 B1 | 12/2001 | Emmert et al. |
| 6,334,793 B1 | 1/2002 | Amoni et al. |
| 6,336,098 B1 | 1/2002 | Fortenberry et al. |
| 6,348,932 B1 | 2/2002 | Nishikawa et al. |
| 6,349,133 B1 | 2/2002 | Matthews et al. |
| 6,349,324 B1 | 2/2002 | Tokoro |
| 6,349,410 B1 | 2/2002 | Lortz |
| 6,351,270 B1 | 2/2002 | Nishikawa et al. |
| 6,356,562 B1 | 3/2002 | Bamba |
| 6,360,053 B1 | 3/2002 | Wood et al. |
| 6,363,440 B1 | 3/2002 | Stepp et al. |
| 6,374,180 B1 | 4/2002 | Slominski et al. |
| 6,375,344 B1 | 4/2002 | Hanson et al. |
| 6,381,748 B1 | 4/2002 | Lin et al. |
| 6,388,714 B1 | 5/2002 | Schein et al. |
| 6,389,125 B1 | 5/2002 | Ubowski |
| 6,393,050 B1 | 5/2002 | Liu |
| 6,396,391 B1 | 5/2002 | Binder |
| 6,396,393 B2 | 5/2002 | Yuasa |
| 6,396,537 B1 | 5/2002 | Squilla et al. |
| 6,404,773 B1 | 6/2002 | Williams et al. |
| 6,414,952 B2 | 7/2002 | Foley |
| 6,415,244 B1 | 7/2002 | Dickens et al. |
| 6,421,781 B1 | 7/2002 | Fox et al. |
| 6,424,661 B1 | 7/2002 | Bentley |
| 6,427,237 B1 | 7/2002 | Aranguren et al. |
| 6,430,199 B1 | 8/2002 | Kerpez |
| 6,433,672 B1 | 8/2002 | Shirmard |
| 6,434,123 B1 | 8/2002 | Park |
| 6,434,648 B1 | 8/2002 | Assour et al. |
| 6,437,692 B1 | 8/2002 | Petite et al. |
| 6,442,573 B1 | 8/2002 | Schiller et al. |
| 6,370,149 B1 | 9/2002 | Gorman et al. |
| 6,449,318 B1 | 9/2002 | Rumbaugh |
| 6,449,348 B1 | 9/2002 | Lamb et al. |
| 6,456,841 B1 | 9/2002 | Tomimori |
| 6,463,586 B1 | 10/2002 | Jerding |
| 6,467,088 B1 | 10/2002 | alSafadi et al. |
| 6,470,053 B1 | 10/2002 | Liu |
| 6,470,378 B1 | 10/2002 | Tracton et al. |
| 6,473,495 B1 | 10/2002 | Willer |
| 6,473,608 B1 | 10/2002 | Lehr et al. |
| 6,477,357 B1 | 11/2002 | Cook |
| 6,477,565 B1 | 11/2002 | Daswani et al. |
| 6,480,510 B1 | 11/2002 | Binder |
| 6,480,714 B1 | 11/2002 | DePani et al. |
| 6,481,010 B2 | 11/2002 | Nishikawa et al. |
| 6,481,013 B1 | 11/2002 | Dinwiddie et al. |
| 6,483,698 B1 | 11/2002 | Loh |
| 6,483,902 B1 | 11/2002 | Stewart et al. |
| 6,493,002 B1 | 12/2002 | Christensen |
| 6,493,020 B1 | 12/2002 | Stevenson et al. |
| 6,493,325 B1 | 12/2002 | Hjalmtysson et al. |
| 6,493,875 B1 | 12/2002 | Eames et al. |

(56) References Cited

U.S. PATENT DOCUMENTS

| | | |
|---|---|---|
| 6,505,055 B1 | 1/2003 | Kahn et al. |
| 6,507,647 B1 | 1/2003 | Mandalia |
| 6,509,907 B1 | 1/2003 | Kuwabara |
| 6,510,204 B2 | 1/2003 | De Clercq et al. |
| 6,510,553 B1 | 1/2003 | Hazra |
| 6,510,557 B1 | 1/2003 | Thrift |
| 6,512,570 B2 | 1/2003 | Garfinkle et al. |
| 6,513,719 B1 | 2/2003 | Imura |
| 6,516,202 B1 | 2/2003 | Hawkins et al. |
| 6,518,724 B2 | 2/2003 | Janik |
| 6,518,889 B2 | 2/2003 | Schlager et al. |
| 6,522,662 B1 | 2/2003 | Liu |
| 6,522,728 B1 | 2/2003 | Willer |
| 6,522,730 B1 | 2/2003 | Timm et al. |
| 6,522,731 B2 | 2/2003 | Matsumoto |
| 6,526,268 B1 | 2/2003 | Marrah et al. |
| 6,526,581 B1 | 2/2003 | Edson |
| 6,532,279 B1 | 3/2003 | Goodman |
| 6,532,280 B1 | 3/2003 | McDonald |
| 6,535,228 B1 * | 3/2003 | Bandaru et al. ............ 715/752 |
| 6,535,587 B1 | 3/2003 | Kobayashi |
| 6,536,041 B1 | 3/2003 | Knudson et al. |
| 6,539,011 B1 | 3/2003 | Keenan et al. |
| 6,549,616 B1 | 4/2003 | Binder |
| 6,549,929 B1 | 4/2003 | Sullivan |
| 6,556,564 B2 | 4/2003 | Rogers |
| 6,556,581 B1 | 4/2003 | He et al. |
| 6,557,030 B1 | 4/2003 | Hoang |
| 6,560,319 B1 | 5/2003 | Binder |
| 6,560,333 B1 | 5/2003 | Consiglio et al. |
| 6,560,456 B1 | 5/2003 | Lohtia |
| 6,563,816 B1 | 5/2003 | Nodoushani et al. |
| 6,565,440 B2 | 5/2003 | Hames |
| 6,567,981 B1 | 5/2003 | Jeffrey |
| 6,570,869 B1 | 5/2003 | Shankar et al. |
| 6,570,890 B1 | 5/2003 | Keenan et al. |
| 6,572,384 B1 | 6/2003 | Marchevsky |
| 6,573,927 B2 | 6/2003 | Parulski et al. |
| 6,574,242 B1 | 6/2003 | Keenan et al. |
| 6,574,313 B1 | 6/2003 | Chea, Jr. et al. |
| 6,577,631 B1 | 6/2003 | Keenan et al. |
| 6,577,882 B1 | 6/2003 | Roos |
| 6,580,254 B2 | 6/2003 | Schofield |
| 6,580,710 B1 | 6/2003 | Bowen et al. |
| 6,580,785 B2 | 6/2003 | Bremer et al. |
| 6,584,122 B1 | 6/2003 | Matthews et al. |
| 6,584,148 B1 | 6/2003 | Zitting et al. |
| 6,584,197 B1 | 6/2003 | Boudreaux, Jr. et al. |
| 6,584,533 B1 | 6/2003 | Cho et al. |
| 6,587,454 B1 | 7/2003 | Lamb |
| 6,587,473 B2 | 7/2003 | Terry et al. |
| 6,587,479 B1 | 7/2003 | Bianchi et al. |
| 6,587,560 B1 | 7/2003 | Scott et al. |
| 6,587,787 B1 | 7/2003 | Yokota |
| 6,590,529 B2 | 7/2003 | Schwoegler |
| 6,591,247 B2 | 7/2003 | Stern |
| 6,600,734 B1 | 7/2003 | Gernert et al. |
| 6,600,936 B1 | 7/2003 | Karkkainen et al. |
| 6,603,808 B1 | 8/2003 | Anne et al. |
| 6,606,506 B1 | 8/2003 | Jones |
| 6,611,537 B1 | 8/2003 | Edens et al. |
| 6,625,383 B1 | 9/2003 | Wakimoto et al. |
| 6,625,472 B1 | 9/2003 | Farazmandnia et al. |
| 6,628,302 B2 | 9/2003 | White et al. |
| 6,628,517 B1 | 9/2003 | Helot et al. |
| 6,633,932 B1 | 10/2003 | Bork et al. |
| 6,640,308 B1 | 10/2003 | Keyghobad et al. |
| 6,643,566 B1 | 11/2003 | Lehr et al. |
| 6,647,270 B1 | 11/2003 | Himmelstein |
| 6,650,622 B1 | 11/2003 | Austerman, III et al. |
| 6,653,932 B1 | 11/2003 | Beamish et al. |
| 6,657,994 B1 | 12/2003 | Rajakarunanayake |
| 6,658,098 B2 | 12/2003 | Lamb et al. |
| 6,658,108 B1 | 12/2003 | Bissell et al. |
| 6,658,268 B1 | 12/2003 | Bodnar et al. |
| 6,661,472 B2 | 12/2003 | Shintani et al. |
| 6,665,404 B2 | 12/2003 | Cohen |
| 6,675,098 B2 | 1/2004 | Peek et al. |
| 6,678,215 B1 | 1/2004 | Treyz et al. |
| 6,678,321 B1 | 1/2004 | Graham et al. |
| 6,678,721 B1 | 1/2004 | Bell |
| 6,678,737 B1 | 1/2004 | Bucher |
| 6,681,013 B1 | 1/2004 | Miyamoto |
| 6,686,832 B2 | 2/2004 | Abraham |
| 6,690,403 B1 | 2/2004 | Tuli |
| 6,690,677 B1 | 2/2004 | Binder |
| 6,690,792 B1 | 2/2004 | Robinson et al. |
| 6,690,947 B1 | 2/2004 | Tom |
| 6,693,896 B1 | 2/2004 | Utsumi et al. |
| 6,693,916 B1 | 2/2004 | Chaplik et al. |
| 6,694,316 B1 * | 2/2004 | Langseth et al. |
| 6,697,032 B2 | 2/2004 | Chitturi et al. |
| 6,697,358 B2 | 2/2004 | Berstein |
| 6,698,019 B1 | 2/2004 | Kim et al. |
| 6,698,023 B2 | 2/2004 | Levitan |
| 6,700,970 B1 | 3/2004 | Aronson et al. |
| 6,701,406 B1 | 3/2004 | Chang et al. |
| 6,702,604 B1 | 3/2004 | Moscovitch |
| 6,704,414 B2 | 3/2004 | Murakoshi |
| 6,704,493 B1 | 3/2004 | Matthews et al. |
| 6,710,704 B2 | 3/2004 | Fisher et al. |
| 6,711,138 B1 | 3/2004 | Pai et al. |
| 6,717,567 B1 | 4/2004 | Bowden, III et al. |
| 6,718,015 B1 | 4/2004 | Berstis |
| 6,721,365 B1 | 4/2004 | Yin et al. |
| 6,721,419 B1 | 4/2004 | Stell et al. |
| 6,721,790 B1 | 4/2004 | Chen |
| 6,721,956 B2 | 4/2004 | Wasilewski |
| 6,726,567 B1 | 4/2004 | Khosla |
| 6,731,627 B1 | 5/2004 | Gupta et al. |
| 6,732,152 B2 | 5/2004 | Lockhart et al. |
| 6,732,315 B2 | 5/2004 | Yagil et al. |
| 6,732,368 B1 | 5/2004 | Michael et al. |
| 6,735,217 B1 | 5/2004 | Webber, Jr. et al. |
| 6,738,382 B1 | 5/2004 | West et al. |
| 6,738,470 B1 | 5/2004 | Aronovitz |
| 6,738,597 B1 | 5/2004 | Jeung et al. |
| 6,744,883 B1 | 6/2004 | Bingel et al. |
| 6,745,256 B2 | 6/2004 | Suzuki et al. |
| 6,747,995 B1 | 6/2004 | Brown et al. |
| 6,748,078 B1 | 6/2004 | Posthuma |
| 6,754,186 B1 | 6/2004 | Bullman |
| 6,757,707 B1 | 6/2004 | Houghton et al. |
| 6,759,946 B2 | 7/2004 | Sahinoglu et al. |
| 6,763,097 B1 | 7/2004 | Vitenberg |
| 6,763,109 B1 | 7/2004 | Hoskins |
| 6,765,543 B1 | 7/2004 | Masuda et al. |
| 6,766,296 B1 | 7/2004 | Adachi |
| 6,766,363 B1 | 7/2004 | Rothschild |
| 6,768,792 B2 | 7/2004 | Brown et al. |
| 6,769,018 B2 | 7/2004 | Gagnon |
| 6,771,750 B1 | 8/2004 | Nayler et al. |
| 6,771,773 B1 | 8/2004 | Hanrieder et al. |
| 6,771,774 B1 | 8/2004 | Phan et al. |
| 6,771,980 B2 | 8/2004 | Moon |
| 6,773,632 B1 | 8/2004 | Marshall et al. |
| 6,775,299 B1 | 8/2004 | Olson et al. |
| 6,775,463 B1 | 8/2004 | Nooralahiyan et al. |
| 6,778,549 B1 | 8/2004 | Keller |
| 6,778,646 B1 | 8/2004 | Sun |
| 6,778,817 B1 | 8/2004 | Bullock et al. |
| 6,784,798 B2 | 8/2004 | Morris |
| 6,784,873 B1 | 8/2004 | Boesen et al. |
| 6,784,924 B2 | 8/2004 | Ward et al. |
| 6,785,296 B1 | 8/2004 | Bell |
| 6,785,903 B1 | 8/2004 | Kuh |
| 6,788,782 B1 | 9/2004 | Fotsch et al. |
| 6,792,195 B2 | 9/2004 | Barton |
| 6,792,280 B1 | 9/2004 | Hori et al. |
| 6,792,323 B2 | 9/2004 | Krzyzanowski et al. |
| 6,795,539 B2 | 9/2004 | Culli et al. |
| 6,798,767 B1 | 9/2004 | Alexande et al. |
| 6,804,536 B1 | 10/2004 | Bultman |
| 6,804,708 B1 | 10/2004 | Jerding et al. |

(56) References Cited

U.S. PATENT DOCUMENTS

| | | |
|---|---|---|
| 6,806,887 B2 | 10/2004 | Chernock et al. |
| 6,807,574 B1 | 10/2004 | Partovi et al. |
| 6,813,639 B2 | 11/2004 | Nobakht et al. |
| 6,814,509 B2 | 11/2004 | Ashizaki |
| 6,815,844 B2 | 11/2004 | Kovarik |
| 6,816,878 B1 | 11/2004 | Zimmers et al. |
| 6,816,904 B1 | 11/2004 | Ludwig et al. |
| 6,817,028 B1 | 11/2004 | Jerding et al. |
| 6,819,550 B2 | 11/2004 | Jobs et al. |
| 6,819,760 B1 | 11/2004 | Nayler |
| 6,823,047 B1 | 11/2004 | Cruickshank |
| 6,823,373 B1 | 11/2004 | Pancha et al. |
| 6,826,863 B1 | 12/2004 | Goodfellow |
| 6,831,975 B1 | 12/2004 | Easwaran et al. |
| 6,831,976 B1 | 12/2004 | Comerford et al. |
| 6,834,057 B1 | 12/2004 | Rabenko et al. |
| 6,836,546 B1 | 12/2004 | Willer |
| 6,839,055 B1 | 1/2005 | Nguyen |
| 6,839,345 B2 | 1/2005 | Lu et al. |
| 6,842,459 B1 | 1/2005 | Binder |
| 6,844,823 B2 | 1/2005 | Hooks et al. |
| 6,847,718 B1 | 1/2005 | Hiraoka |
| 6,847,969 B1 | 1/2005 | Mathai et al. |
| 6,850,691 B1 | 2/2005 | Stam et al. |
| 6,856,799 B1 | 2/2005 | Ritter |
| 6,857,074 B2 | 2/2005 | Bobo, II |
| 6,862,353 B2 | 3/2005 | Rabenko et al. |
| 6,865,193 B2 | 3/2005 | Terk |
| 6,868,072 B1 | 3/2005 | Lin et al. |
| 6,868,081 B1 | 3/2005 | Akram et al. |
| 6,873,307 B2 | 3/2005 | Nitta et al. |
| 6,876,648 B1 | 4/2005 | Lee |
| 6,879,843 B1 | 4/2005 | Kim |
| 6,882,714 B2 | 4/2005 | Mansfield |
| 6,898,413 B2 | 5/2005 | Yip et al. |
| 6,898,424 B2 | 5/2005 | Nishida |
| 6,904,134 B2 | 6/2005 | Jeon et al. |
| 6,909,725 B1 | 6/2005 | Chow |
| 6,912,209 B1 | 6/2005 | Thi et al. |
| 6,917,681 B2 | 7/2005 | Robinson et al. |
| 6,919,678 B2 | 7/2005 | Ozolins et al. |
| 6,922,407 B2 | 7/2005 | Wu |
| 6,922,845 B2 | 7/2005 | Yap et al. |
| 6,925,089 B2 | 8/2005 | Chow et al. |
| 6,927,340 B1 | 8/2005 | Binder |
| 6,934,510 B2 | 8/2005 | Katayama |
| 6,934,754 B2 | 8/2005 | West et al. |
| 6,937,056 B2 | 8/2005 | Binder |
| 6,941,364 B2 | 9/2005 | Kim et al. |
| 6,947,067 B2 | 9/2005 | Halttunen |
| 6,947,396 B1 | 9/2005 | Salmi |
| 6,947,736 B2 | 9/2005 | Shaver et al. |
| 6,956,545 B2 | 10/2005 | McClintock et al. |
| 6,956,826 B1 | 10/2005 | Binder |
| 6,957,040 B1 | 10/2005 | Tanaka |
| 6,959,172 B2 | 10/2005 | Becker et al. |
| 6,959,449 B1 | 10/2005 | Fujii |
| 6,961,046 B2 | 11/2005 | Bowden, III et al. |
| 6,961,237 B2 | 11/2005 | Dickie |
| 6,961,303 B1 | 11/2005 | Binder |
| 6,961,904 B1 | 11/2005 | Pilu |
| 6,963,559 B2 | 11/2005 | Elo |
| 6,963,914 B1 | 11/2005 | Breitbart |
| 6,967,900 B2 | 11/2005 | Chapman |
| 6,970,538 B2 | 11/2005 | Binder |
| 6,973,394 B2 | 12/2005 | Jaeger et al. |
| 6,973,669 B2 | 12/2005 | Daniels |
| 6,975,308 B1 | 12/2005 | Bitetto et al. |
| 6,975,713 B1 | 12/2005 | Smith et al. |
| 6,978,147 B2 | 12/2005 | Coombes |
| 6,980,049 B2 | 12/2005 | Burkhard |
| 6,980,638 B1 | 12/2005 | Smith et al. |
| 6,980,812 B1 | 12/2005 | Sandhu et al. |
| 6,985,714 B2 | 1/2006 | Akiyama et al. |
| 6,988,008 B2 | 1/2006 | Hudson et al. |
| 6,989,733 B2 | 1/2006 | Simonsen et al. |
| 6,990,676 B1 | 1/2006 | Proehl et al. |
| 6,992,711 B2 | 1/2006 | Kubo |
| 6,993,289 B2 | 1/2006 | Janik |
| 6,995,963 B2 | 2/2006 | Fadell et al. |
| 6,996,213 B1 | 2/2006 | De Jong |
| 6,996,729 B2 | 2/2006 | Volkening et al. |
| 6,998,964 B2 | 2/2006 | Lomax, Jr. et al. |
| 6,999,792 B2 | 2/2006 | Warren |
| 6,999,945 B1 | 2/2006 | Freeny, Jr. |
| 7,002,898 B1 | 2/2006 | Lou |
| 7,003,102 B2 | 2/2006 | Kiko |
| 7,009,946 B1 | 3/2006 | Kardach |
| 7,010,601 B2 | 3/2006 | Yoshimine et al. |
| 7,016,377 B1 | 3/2006 | Chun et al. |
| 7,027,566 B2 | 4/2006 | Bossemeyer, Jr. et al. |
| 7,027,768 B2 | 4/2006 | Hill |
| 7,035,270 B2 | 4/2006 | Moore, Jr. et al. |
| 7,035,914 B1 | 4/2006 | Payne et al. |
| 7,042,515 B2 | 5/2006 | Sung |
| 7,042,583 B2 | 5/2006 | Wilkins et al. |
| 7,050,097 B2 | 5/2006 | Schick et al. |
| 7,051,357 B2 | 5/2006 | Carr |
| 7,053,501 B1 | 5/2006 | Barrass |
| 7,054,303 B2 | 5/2006 | Miyazaki et al. |
| 7,054,904 B2 | 5/2006 | Ludwig et al. |
| 7,058,174 B2 | 6/2006 | Posthuma |
| 7,058,376 B2 | 6/2006 | Logan et al. |
| 7,058,663 B2 | 6/2006 | Johnston et al. |
| 7,065,390 B2 | 6/2006 | Yin |
| 7,065,778 B1 | 6/2006 | Lu |
| 7,068,668 B2 | 6/2006 | Feuer |
| 7,072,932 B1 | 7/2006 | Stahl |
| 7,079,647 B2 | 7/2006 | Tomobe |
| 7,080,158 B1 * | 7/2006 | Squire ............... H04L 67/2814 370/389 |
| 7,080,400 B1 | 7/2006 | Navar |
| 7,082,141 B2 | 7/2006 | Sharma et al. |
| 7,086,081 B2 | 8/2006 | Martinez et al. |
| 7,095,848 B1 | 8/2006 | Fischer et al. |
| 7,095,849 B2 | 8/2006 | Smith et al. |
| 7,099,368 B2 | 8/2006 | Santhoff et al. |
| 7,099,707 B2 | 8/2006 | Amin et al. |
| 7,103,194 B2 | 9/2006 | Hsia |
| 7,103,905 B2 | 9/2006 | Novak |
| 7,106,721 B1 | 9/2006 | Binder |
| 7,107,225 B1 | 9/2006 | McClung, III |
| 7,107,605 B2 * | 9/2006 | Janik ............................ 725/51 |
| 7,110,789 B1 * | 9/2006 | Curtiss et al. ............. 455/556.1 |
| 7,113,218 B2 | 9/2006 | Battles et al. |
| 7,113,574 B1 | 9/2006 | Haas et al. |
| 7,123,926 B2 | 10/2006 | Himmelstein |
| 7,130,584 B2 | 10/2006 | Hirvonen |
| 7,130,600 B2 | 10/2006 | Chan et al. |
| 7,130,616 B2 | 10/2006 | Janik |
| 7,142,560 B2 | 11/2006 | Mansfield |
| 7,142,563 B1 | 11/2006 | Lin |
| 7,142,934 B2 | 11/2006 | Janik |
| 7,143,428 B1 | 11/2006 | Bruck et al. |
| 7,143,478 B2 | 12/2006 | Quijano |
| 7,145,767 B2 | 12/2006 | Mache et al. |
| 7,149,182 B1 | 12/2006 | Renucci et al. |
| 7,149,474 B1 | 12/2006 | Mikhak |
| 7,154,642 B2 | 12/2006 | Lichtfuss |
| 7,154,996 B2 | 12/2006 | Strauss |
| 7,155,214 B2 | 12/2006 | Struthers et al. |
| 7,155,679 B2 | 12/2006 | Bandaru et al. |
| 7,162,013 B2 | 1/2007 | Gavette et al. |
| 7,167,551 B2 | 1/2007 | Brown et al. |
| 7,170,486 B2 | 1/2007 | Lemel et al. |
| 7,170,984 B2 | 1/2007 | Gosselin |
| 7,171,307 B2 | 1/2007 | Matsumoto |
| 7,171,506 B2 | 1/2007 | Iwamura |
| 7,158,531 B2 | 2/2007 | Barton |
| 7,181,756 B1 | 2/2007 | Zigmond et al. |
| 7,184,003 B2 | 2/2007 | Cupps et al. |
| 7,185,044 B2 | 2/2007 | Ryan et al. |
| 7,194,009 B2 | 3/2007 | Eng |
| 7,194,285 B2 | 3/2007 | Tom |

(56) References Cited

U.S. PATENT DOCUMENTS

| | | |
|---|---|---|
| 7,194,757 B1 | 3/2007 | Fish et al. |
| 7,196,805 B1 | 3/2007 | Toebes et al. |
| 7,199,706 B2 | 4/2007 | Dawson et al. |
| 7,206,322 B1 | 4/2007 | Garg et al. |
| 7,206,417 B2 | 4/2007 | Nathan |
| 7,206,809 B2 | 4/2007 | Ludwig et al. |
| 7,209,719 B2 | 4/2007 | Liebenow |
| 7,221,331 B2 | 5/2007 | Bear et al. |
| 7,221,663 B2 | 5/2007 | Rodman et al. |
| 7,224,777 B1 | 5/2007 | Tannenbaum |
| 7,231,529 B2 | 6/2007 | Park |
| 7,240,092 B2 | 7/2007 | Houghton et al. |
| 7,248,689 B2 | 7/2007 | Wilson |
| 7,263,382 B2 | 8/2007 | Chandhok et al. |
| 7,265,779 B2 | 9/2007 | Sato et al. |
| 7,274,482 B2 | 9/2007 | Yeh et al. |
| 7,274,949 B2 | 9/2007 | Tanaka |
| 7,278,064 B1 | 10/2007 | Chan |
| 7,307,658 B2 | 12/2007 | Mino |
| 7,317,793 B2 | 1/2008 | Binder |
| 7,324,346 B2 | 1/2008 | Ribeiro et al. |
| 7,324,824 B2 | 1/2008 | Smith et al. |
| 7,327,385 B2 | 2/2008 | Yamaguchi |
| 7,330,737 B2 | 2/2008 | Mahini |
| 7,337,948 B2 | 3/2008 | Melick et al. |
| 7,346,332 B2 | 3/2008 | McCarty et al. |
| 7,348,961 B1 | 3/2008 | Shneidman |
| 7,349,532 B2 | 3/2008 | Henderson |
| 7,352,407 B2 | 4/2008 | Lan et al. |
| 7,359,721 B2 | 4/2008 | Gay et al. |
| 7,363,034 B2 | 4/2008 | DePani et al. |
| 7,363,645 B1 | 4/2008 | Hendricks |
| 7,370,279 B2 | 5/2008 | Sugimoto |
| 7,376,696 B2 | 5/2008 | Bell et al. |
| 7,395,088 B2 | 7/2008 | Shinzaki |
| 7,395,126 B2 | 7/2008 | Decker |
| 7,395,324 B1 | 7/2008 | Murphy |
| 7,397,807 B2 | 7/2008 | Chen et al. |
| 7,401,238 B2 | 7/2008 | Lindley et al. |
| RE40,468 E | 8/2008 | Tsukamoto et al. |
| 7,420,800 B1 | 9/2008 | Knapp et al. |
| 7,420,956 B2 | 9/2008 | Karaoguz et al. |
| 7,421,504 B2 | 9/2008 | Imaida et al. |
| 7,429,965 B2 | 9/2008 | Weiner |
| 7,430,423 B1 | 9/2008 | Falkner, Jr. |
| 7,433,341 B2 | 10/2008 | Perrot et al. |
| 7,436,842 B2 | 10/2008 | Binder |
| 7,441,041 B2 | 10/2008 | Williams |
| 7,444,336 B2 | 10/2008 | Karaoguz et al. |
| 7,444,665 B2 | 10/2008 | Cezeaux et al. |
| 7,450,112 B2 | 11/2008 | Shneidman |
| 7,454,228 B2 | 11/2008 | Mizumaki et al. |
| 7,454,776 B1 | 11/2008 | Walker et al. |
| 7,454,777 B1 | 11/2008 | Nishikawa et al. |
| 7,457,583 B2 | 11/2008 | Katayama |
| 7,463,647 B2 | 12/2008 | Stone et al. |
| 7,463,732 B1 | 12/2008 | Hiscock et al. |
| 7,468,934 B1 | 12/2008 | Janik |
| 7,471,402 B2 | 12/2008 | Takamatsu et al. |
| 7,486,201 B2 | 2/2009 | Kelly et al. |
| 7,493,015 B1 | 2/2009 | Van Stam et al. |
| 7,496,647 B2 | 2/2009 | Karaoguz et al. |
| 7,543,099 B2 | 2/2009 | Han |
| 7,497,039 B2 | 3/2009 | Zhu et al. |
| 7,505,579 B2 | 3/2009 | Choi |
| 7,506,035 B1 * | 3/2009 | Lu ................................ 709/219 |
| 7,524,197 B2 | 4/2009 | Milis et al. |
| 7,526,383 B2 | 4/2009 | Dai et al. |
| 7,528,973 B2 | 5/2009 | Enomoto et al. |
| 7,529,465 B2 | 5/2009 | Barton et al. |
| 7,543,323 B1 | 6/2009 | Zigmond et al. |
| 7,546,033 B2 | 6/2009 | Kawada |
| 7,554,536 B2 | 6/2009 | Huh et al. |
| 7,565,106 B1 | 7/2009 | Oh et al. |
| 7,571,226 B1 | 8/2009 | Partovi et al. |
| 7,571,455 B2 | 8/2009 | Lee |
| 7,571,458 B1 | 8/2009 | Eyal |
| 7,580,255 B2 | 8/2009 | Crooijmans et al. |
| 7,584,494 B2 | 9/2009 | Dow, III |
| 7,590,997 B2 | 9/2009 | Diaz Perez |
| 7,590,998 B2 | 9/2009 | Hanley |
| 7,627,343 B2 | 12/2009 | Fadell et al. |
| 7,630,743 B2 | 12/2009 | Uejima et al. |
| 7,631,325 B2 | 12/2009 | Rys et al. |
| 7,631,338 B2 | 12/2009 | Del Sesto et al. |
| 7,633,405 B2 | 12/2009 | Moulis, Jr. et al. |
| 7,634,296 B2 | 12/2009 | Haeusel |
| 7,634,756 B2 | 12/2009 | Bjornson et al. |
| 7,634,794 B1 | 12/2009 | Paik et al. |
| 7,650,519 B1 | 1/2010 | Hobbs et al. |
| 7,650,621 B2 | 1/2010 | Thomas et al. |
| 7,656,439 B1 | 2/2010 | Manico et al. |
| 7,657,910 B1 | 2/2010 | McAulay et al. |
| 7,669,134 B1 | 2/2010 | Christie et al. |
| 7,692,635 B2 | 4/2010 | Iwamura |
| 7,725,256 B2 | 5/2010 | Marsh |
| 7,746,381 B1 | 6/2010 | Ye et al. |
| 7,746,629 B2 | 6/2010 | Assouad et al. |
| 7,751,805 B2 | 7/2010 | Neven et al. |
| 7,779,026 B2 | 8/2010 | Faulkner et al. |
| 7,783,767 B2 | 8/2010 | Collazo |
| 7,783,982 B1 | 8/2010 | Reynolds et al. |
| 7,792,708 B2 | 9/2010 | Alva |
| 7,800,646 B2 | 9/2010 | Martin |
| 7,823,181 B2 | 10/2010 | Gaughan et al. |
| 7,716,715 B2 | 11/2010 | Kuang |
| 7,830,248 B2 | 11/2010 | Logvinov et al. |
| 7,831,141 B2 | 11/2010 | Wassingbo et al. |
| 7,831,992 B2 | 11/2010 | Stone |
| 7,836,141 B2 | 11/2010 | Bobo, II |
| 7,839,984 B2 | 11/2010 | Katz |
| 7,849,226 B2 | 12/2010 | Zigmond et al. |
| 7,852,837 B1 | 12/2010 | Au et al. |
| 7,853,891 B2 | 12/2010 | Chaudhri et al. |
| 7,856,645 B2 | 12/2010 | Pharn |
| 7,859,429 B2 | 12/2010 | Satoh |
| 7,861,272 B2 | 12/2010 | Russ et al. |
| 7,873,040 B2 | 1/2011 | Karlsgodt |
| 7,898,438 B2 | 3/2011 | Brosius, III |
| 7,917,130 B1 | 3/2011 | Christensen et al. |
| 7,929,280 B2 | 4/2011 | Choi |
| 7,949,726 B2 | 5/2011 | Freeberg et al. |
| 7,965,673 B2 | 6/2011 | Iwamura |
| 7,966,503 B2 | 6/2011 | Kimura |
| 7,970,126 B2 | 6/2011 | Ahn et al. |
| 7,990,985 B2 | 8/2011 | Chen |
| 8,031,264 B2 | 10/2011 | Iwamura |
| 8,032,259 B2 | 10/2011 | Sherman et al. |
| 8,059,098 B2 | 11/2011 | Huang et al. |
| 8,063,987 B2 | 11/2011 | Cheng et al. |
| 8,072,631 B2 | 12/2011 | Murai et al. |
| 8,081,964 B1 | 12/2011 | Enzmann et al. |
| 8,089,559 B2 | 1/2012 | Cheng et al. |
| 8,108,892 B1 | 1/2012 | Durkee et al. |
| 8,144,201 B2 | 3/2012 | Lee et al. |
| 8,237,696 B2 | 8/2012 | Chung et al. |
| 8,266,657 B2 | 9/2012 | Margulis |
| 8,290,144 B1 | 10/2012 | Smith et al. |
| 8,295,454 B2 | 10/2012 | Ron et al. |
| 8,875,198 B1 | 10/2014 | Goodwin et al. |
| 2001/0021659 A1 | 9/2001 | Okamura |
| 2001/0030950 A1 | 10/2001 | Chen et al. |
| 2002/0003873 A1 | 1/2002 | Rabenko |
| 2002/0006137 A1 | 1/2002 | Rabenko et al. |
| 2002/0013727 A1 | 1/2002 | Lee |
| 2002/0015489 A1 | 2/2002 | Ben-David |
| 2002/0018115 A1 | 2/2002 | Sakata |
| 2002/0037004 A1 | 3/2002 | Bossemeyer et al. |
| 2002/0038351 A1 | 3/2002 | Khan et al. |
| 2002/0054090 A1 | 5/2002 | Silva et al. |
| 2002/0057581 A1 | 5/2002 | Nadav |
| 2002/0061012 A1 | 5/2002 | Thi et al. |
| 2002/0063736 A1 | 5/2002 | Sugimoto |
| 2002/0069308 A1 | 6/2002 | Jones et al. |

(56) References Cited

U.S. PATENT DOCUMENTS

| | | |
|---|---|---|
| 2002/0076038 A1* | 6/2002 | Barrese et al. ............... 379/413 |
| 2002/0077076 A1 | 6/2002 | Suryanarayana |
| 2002/0080010 A1 | 6/2002 | Zhang |
| 2002/0080042 A1 | 6/2002 | Gothard |
| 2002/0088001 A1 | 7/2002 | Zustak et al. |
| 2002/0090919 A1 | 7/2002 | Hofman |
| 2002/0102947 A1 | 8/2002 | Hofman |
| 2002/0107985 A1 | 8/2002 | Hwang |
| 2002/0110236 A1 | 8/2002 | Karnad |
| 2002/0113894 A1 | 8/2002 | Yang et al. |
| 2002/0118676 A1 | 8/2002 | Tonnby et al. |
| 2002/0128009 A1 | 9/2002 | Boch et al. |
| 2002/0142763 A1 | 10/2002 | Kolsky |
| 2002/0144159 A1 | 10/2002 | Wu et al. |
| 2002/0176567 A1 | 11/2002 | Chen et al. |
| 2002/0180592 A1 | 12/2002 | Gromov |
| 2002/0198952 A1 | 12/2002 | Bell |
| 2003/0014296 A1 | 1/2003 | Meine |
| 2003/0016794 A1 | 1/2003 | Brothers |
| 2003/0018755 A1* | 1/2003 | Masterson et al. ............ 709/220 |
| 2003/0026402 A1* | 2/2003 | Clapper ................ 379/142.01 |
| 2003/0041206 A1 | 2/2003 | Dickie |
| 2003/0058085 A1 | 3/2003 | Fisher et al. |
| 2003/0061522 A1 | 3/2003 | Ke et al. |
| 2003/0067910 A1 | 4/2003 | Razazian et al. |
| 2003/0076369 A1 | 4/2003 | Resner et al. |
| 2003/0088706 A1 | 5/2003 | Chan et al. |
| 2003/0093476 A1* | 5/2003 | Syed ............................ 709/204 |
| 2003/0095152 A1 | 5/2003 | Fong |
| 2003/0099076 A1 | 5/2003 | Elkayam et al. |
| 2003/0107269 A1 | 6/2003 | Jetzt |
| 2003/0112965 A1 | 6/2003 | McNamara et al. |
| 2003/0131002 A1 | 7/2003 | Gennetten et al. |
| 2003/0146765 A1 | 8/2003 | Darshan et al. |
| 2003/0153355 A1 | 8/2003 | Warren |
| 2003/0179869 A1 | 9/2003 | Yoshitani |
| 2003/0194912 A1 | 10/2003 | Ferentz |
| 2003/0204393 A1 | 10/2003 | Czerwiec et al. |
| 2003/0206623 A1 | 11/2003 | Deichstetter et al. |
| 2003/0207697 A1 | 11/2003 | Shpak |
| 2003/0223736 A1 | 12/2003 | Muzaffer et al. |
| 2003/0234804 A1 | 12/2003 | Parker et al. |
| 2004/0002877 A1* | 1/2004 | Angelo ................. G06Q 10/06 705/302 |
| 2004/0003040 A1 | 1/2004 | Beavers et al. |
| 2004/0006484 A1 | 1/2004 | Manis et al. |
| 2004/0032400 A1 | 2/2004 | Freeman et al. |
| 2004/0037317 A1 | 2/2004 | Zalitzky et al. |
| 2004/0044723 A1* | 3/2004 | Bell ...................... G06F 3/0486 709/203 |
| 2004/0044785 A1* | 3/2004 | Bell ........................ H04L 29/06 709/238 |
| 2004/0057576 A1* | 3/2004 | Lavaud ................. H04M 19/08 379/413 |
| 2004/0075581 A1 | 4/2004 | Staniszewski |
| 2004/0075700 A1 | 4/2004 | Liu et al. |
| 2004/0083262 A1 | 4/2004 | Trantow |
| 2004/0090984 A1 | 5/2004 | Saint-Hilaire et al. |
| 2004/0100460 A1* | 5/2004 | Yamada ............... G09B 29/106 345/204 |
| 2004/0107299 A1 | 6/2004 | Lee et al. |
| 2004/0116164 A1 | 6/2004 | Beguet et al. |
| 2004/0119666 A1 | 6/2004 | Lim |
| 2004/0125819 A1 | 7/2004 | Binder |
| 2004/0128376 A1 | 7/2004 | Matsune et al. |
| 2004/0133848 A1 | 7/2004 | Hunt et al. |
| 2004/0136373 A1 | 7/2004 | Bareis |
| 2004/0152493 A1 | 8/2004 | Phillips et al. |
| 2004/0160460 A1 | 8/2004 | Casey et al. |
| 2004/0162829 A1 | 8/2004 | Gabos |
| 2004/0165359 A1 | 8/2004 | Cheng et al. |
| 2004/0170262 A1 | 9/2004 | Ohno |
| 2004/0177167 A1 | 9/2004 | Iwamura et al. |
| 2004/0177380 A1 | 9/2004 | Hamel et al. |
| 2004/0180573 A1 | 9/2004 | Chen |
| 2004/0181550 A1 | 9/2004 | Warsta |
| 2004/0204040 A1 | 10/2004 | Heijnen |
| 2004/0205811 A1 | 10/2004 | Grandy et al. |
| 2004/0214610 A1 | 10/2004 | Tanemura et al. |
| 2004/0225708 A1 | 11/2004 | Christodoulou |
| 2004/0244054 A1 | 12/2004 | Sheu et al. |
| 2004/0248594 A1* | 12/2004 | Wren, III ............... H04W 84/16 455/465 |
| 2004/0250205 A1 | 12/2004 | Conning |
| 2004/0253945 A1 | 12/2004 | Janik |
| 2004/0259537 A1 | 12/2004 | Ackley |
| 2004/0268160 A1 | 12/2004 | Atkinson et al. |
| 2005/0002407 A1 | 1/2005 | Shaheen et al. |
| 2005/0010954 A1 | 1/2005 | Binder |
| 2005/0015516 A1* | 1/2005 | Ju ......................... H04M 1/2535 709/250 |
| 2005/0015805 A1 | 1/2005 | Iwamura |
| 2005/0025162 A1 | 2/2005 | Binder |
| 2005/0035850 A1 | 2/2005 | Schwager et al. |
| 2005/0038875 A1 | 2/2005 | Park |
| 2005/0044566 A1 | 2/2005 | Jerding et al. |
| 2005/0047431 A1 | 3/2005 | Binder |
| 2005/0047572 A1 | 3/2005 | Luneau et al. |
| 2005/0055374 A1 | 3/2005 | Sato |
| 2005/0076149 A1 | 4/2005 | McKown et al. |
| 2005/0086694 A1 | 4/2005 | Hicks et al. |
| 2005/0108429 A1 | 5/2005 | Bodin |
| 2005/0114325 A1 | 5/2005 | Liu et al. |
| 2005/0114884 A1 | 5/2005 | Diwan |
| 2005/0117546 A1 | 6/2005 | Lioy |
| 2005/0129069 A1 | 6/2005 | Binder |
| 2005/0136983 A1 | 6/2005 | Agapi |
| 2005/0138546 A1* | 6/2005 | AbiEzzi ....................... 715/513 |
| 2005/0143149 A1 | 6/2005 | Becker et al. |
| 2005/0150100 A1 | 7/2005 | Merdan et al. |
| 2005/0152517 A1* | 7/2005 | Binder ....................... 379/93.17 |
| 2005/0155077 A1 | 7/2005 | Lawrence |
| 2005/0180561 A1 | 8/2005 | Binder |
| 2005/0181839 A1 | 8/2005 | Tiainen et al. |
| 2005/0226200 A1 | 10/2005 | Askildsen et al. |
| 2005/0249245 A1 | 11/2005 | Binder |
| 2005/0283812 A1 | 12/2005 | Soo et al. |
| 2006/0038794 A1* | 2/2006 | Shneidman ................... 345/173 |
| 2006/0072591 A1 | 4/2006 | Rogalski et al. |
| 2006/0103888 A1 | 5/2006 | Min et al. |
| 2006/0123053 A1* | 6/2006 | Scannell, Jr. ............. 707/104.1 |
| 2006/0140178 A1 | 6/2006 | Cheng et al. |
| 2006/0153169 A1 | 7/2006 | Koifman et al. |
| 2006/0156332 A1 | 7/2006 | Kendall |
| 2006/0170669 A1 | 8/2006 | Walker et al. |
| 2006/0176044 A1 | 8/2006 | Binder |
| 2006/0187331 A1 | 8/2006 | Watanabe et al. |
| 2006/0193310 A1 | 8/2006 | Landry et al. |
| 2006/0193313 A1 | 8/2006 | Landry et al. |
| 2006/0215680 A1 | 9/2006 | Camagna |
| 2006/0221182 A1 | 10/2006 | Sham |
| 2006/0221183 A1 | 10/2006 | Sham |
| 2006/0238250 A1 | 10/2006 | Camagna et al. |
| 2006/0251094 A1 | 11/2006 | Van Vleck et al. |
| 2006/0251159 A1 | 11/2006 | Huotari et al. |
| 2006/0251179 A1 | 11/2006 | Ghoshal |
| 2006/0280197 A1 | 12/2006 | Stone |
| 2006/0291493 A1 | 12/2006 | Schley-May et al. |
| 2007/0081643 A1 | 4/2007 | Divine |
| 2007/0124418 A1* | 5/2007 | Binder ........................... 709/217 |
| 2007/0173202 A1 | 7/2007 | Binder |
| 2007/0174886 A1 | 7/2007 | Scheuer et al. |
| 2007/0198738 A1 | 8/2007 | Angiolillo et al. |
| 2007/0276925 A1 | 11/2007 | La Joie et al. |
| 2007/0294343 A1 | 12/2007 | Daswani et al. |
| 2008/0143890 A1 | 6/2008 | Rosencwaig et al. |
| 2008/0158217 A1 | 7/2008 | Hata et al. |
| 2008/0164845 A1 | 7/2008 | Choi |
| 2008/0186150 A1 | 8/2008 | Kao |
| 2008/0195962 A1 | 8/2008 | Lin et al. |
| 2008/0236014 A1 | 10/2008 | Chao et al. |
| 2008/0250150 A1 | 10/2008 | Chang |
| 2008/0251250 A1 | 10/2008 | Brezinski et al. |

(56) References Cited

U.S. PATENT DOCUMENTS

| | | | |
|---|---|---|---|
| 2008/0253339 A1 | 10/2008 | Libault et al. | |
| 2008/0273126 A1 | 11/2008 | Chang | |
| 2008/0280561 A1 | 11/2008 | Lin | |
| 2009/0023475 A1 | 1/2009 | Chang et al. | |
| 2009/0077612 A1 | 3/2009 | Shen et al. | |
| 2009/0124418 A1 | 5/2009 | Sullivan et al. | |
| 2009/0129570 A1* | 5/2009 | Binder | 379/93.17 |
| 2009/0132679 A1* | 5/2009 | Binder | 709/217 |
| 2009/0147934 A1* | 6/2009 | Binder | 379/93.17 |
| 2009/0152517 A1 | 6/2009 | Takiguchi et al. | |
| 2009/0153438 A1 | 6/2009 | Miller et al. | |
| 2009/0160732 A1 | 6/2009 | Kimura | |
| 2009/0160831 A1* | 6/2009 | Binder | 345/204 |
| 2009/0171970 A1 | 7/2009 | Keefe | |
| 2009/0174693 A1* | 7/2009 | Binder | 345/204 |
| 2009/0179887 A1 | 7/2009 | Chang et al. | |
| 2009/0182800 A1 | 7/2009 | Lin et al. | |
| 2009/0182840 A1* | 7/2009 | Binder | 709/217 |
| 2009/0198795 A1* | 8/2009 | Binder | 709/219 |
| 2009/0262135 A1 | 10/2009 | Huston et al. | |
| 2010/0115564 A1* | 5/2010 | Binder | 725/83 |
| 2010/0115571 A1* | 5/2010 | Binder | 725/110 |
| 2010/0194981 A1 | 8/2010 | Hardacker et al. | |
| 2010/0267416 A1* | 10/2010 | Binder | 455/552.1 |
| 2010/0303438 A1* | 12/2010 | Binder | 386/230 |
| 2011/0007220 A1* | 1/2011 | Binder | 348/725 |
| 2011/0009077 A1* | 1/2011 | Binder | 455/90.3 |
| 2011/0013758 A1* | 1/2011 | Binder | 379/93.17 |
| 2011/0013759 A1* | 1/2011 | Binder | 379/93.17 |
| 2011/0016505 A1* | 1/2011 | Binder | 725/131 |
| 2011/0199538 A1 | 8/2011 | Gershfeld | |
| 2011/0252453 A1* | 10/2011 | Binder | 725/111 |
| 2011/0270951 A1* | 11/2011 | Binder | 709/217 |
| 2011/0311033 A1* | 12/2011 | Binder | 379/93.17 |
| 2011/0317823 A1* | 12/2011 | Binder | 379/93.17 |
| 2012/0201508 A1 | 8/2012 | Binder | |

FOREIGN PATENT DOCUMENTS

| | | |
|---|---|---|
| WO | WO 96/23377 | 8/1996 |
| WO | WO 98/02985 | 1/1998 |
| WO | WO 99/03255 | 1/1999 |
| WO | WO 99/12330 | 3/1999 |
| WO | WO 2001028215 | 4/2001 |

OTHER PUBLICATIONS

Hoffman, J.; "Cable, Television, and the Consumer Electronic Bus"; Panasonic Technologies. Inc., (date unknown) pp. 165-173.
Strassberg, Dan; "Home Automation Buses: Protocols Really Hit Home"; EDN Design Feature, Apr. 13, 1995 (9 pages).
Coronaro, M. et al., "Integrated Office Communication System," Electrical Communication, 1986, pp. 17-22, vol. 60, No. 1, FACE Research Center, Pomezia, Italy.
Lon Works LPI-10 Link Power Interface Module User's Guide; Echelon Corporation, 1995 (37 pages).
Lon Works LPT-10 Link Power Transceiver User's Guide Version 2.1; Echelon Corporation, 1995 (60 pages).
Lon Works Router User's Guide Revision 3; Echelon Corporation, 1995 (68 pages).
Using the Lon Works PLT-22 Power Line Transceiver in European Utility Application, Version 1; Echelon Corporation, 1996-1999 (118 pages).
PL3120/PL3150 Power Line Smart Transceiver Data Book, Version 2; Echelon Corporation, 1996-2005 (255 pages).
PL DSK 2.1 Power Line Smart Transceiver Development Support Kit User's Guide; Echelon Corporation, 2005-2006 (18 pages).
Introduction to Pyxos FT Platform; Echelon Corporation, 2007 (34 pages).
LTM-10A User's Guide, Revision 4; Echelon Corporation, 1995-2001 (46 pages).
Lon Works Twisted Pair Control Module, User's Guide Version 2; Echelon Corporation, 1992-1996 (50 pages).
AN1000EVK Evaluation Unit Manual, Draft 1.0; Adaptive Networks Inc., Document No. 04-3170-01-B Aug. 1996 (31 pages).
AN1000 Powerline Network Communications Chip Set, Adaptive Networks Inc., 1995 (56 pages).
From the Ether—Bob Metcalfe, Cheap, reliable 'net connections may be as close as an electrical socket'; by Bob Metcalfe Info World Feb. 10, 1997 vol. 19 Issue 6 (4 pages).
Lon Works Custom Node Development, Lon Works Engineering Bulletin; Echelon Corporation, Jan. 1995 (16 pages).
Building a Lon Talk-to-PLC Gateway, Lon Works Engineering Bulletin; Echelon Corporation, May 1994 (62 pages).
Lon Works 78kbps Self-Healing Ring Architecture, Lon Works Marketing Bulletin; Echelon Corporation, Aug. 1993 (6 pages).
Centralized Commercial Building Applications with the Lon Works PLT-21 Power Line Transceiver, Lon Works Engineering Bulletin; Echelon Corporation, Apr. 1997 (22 pages).
Lon Works for Audio Computer Control Network Applications; Echelon Corporation, Jan. 1995 (30 pages).
Demand Side Management with Lon Works Power Line Transceivers, Lon Works Engineering Bulletin; Echelon Corporation, Dec. 1996 (36 pages).
'Switching Hubs—Switching to the Fast Track', by Gary Gunnerson, PC Magazine, Oct. 11, 1994 (24 pages).
VISPLAN-10 Infrared Wireless LAN system; JVC May 1996 (10 pages).
'JVC Introduces Ethernet Compatible Wireless LAN System'; Business Wire Sep. 26, 1995 (1 page).
Ethernet Wireless LAN Systems; BYTE Feb. 1996 (3 pages).
'JVC Introduces First Ethernet Compatible Wireless LAN System'; Business Wire Nov. 8, 1995 (1 page).
Intelogis to Present on Stage at Internet Showcase 1998; PR Newswire Jan. 28, 1998 (1 page).
High Speed Networking with LAN Switches, by Gilbert Held; Copyright 1997 by John Wiley & Sons, Inc. (290 pages).
"The DSL Sourcebook", Paradyne Corporation, Copyright 2000, DSL-BOOK-3.0-0900, 98 pages.
Olshansky, "A Full Service Network for the Copper Plant", Telephony, 1985, pp. 52-60.
Instant Network Rules on Phone Lines, Electronic Design, 1987.
O. Agazzi, et al., "Large Scale Integration of Hybrid-Method Digital Subscriber Loops, "IEEE Transactions on Communications, vol. COM-30, No. 9, Sep. 1982, pp. 2095-2108.
S.V. Ahamed, et al., "A tutorial on Two-Wire Digital Transmission in the Loop Plant", IEEE Transactions on Communications, vol. COM-29, No. 11, Nov. 1991, pp. 1554-1564.
J. Alves, "Data Over Voice—A Low Cost LAN Alternative", Communications Show and Conference, MECOM 87, January, pp. 13-15.
S.B. Andrews, "The Generic Digital Channel Concept", IEEE International Conference on Communications, 1985, Jun. 23-26, 1985, Chicago, IL, pp. 7.1.1-7.1.3.
G.W. Beene, "Design Considerations for a CO-Powered Distributed-Drop PCM Station Carrier", IEEE Transactions on Communications, vol. COM-30, No. 9, Sep. 1982, pp. 2022-2028.
A. Bienz, "1+1=1—Order Das Telefonnetz Als Datennetz", Sysdata, vol. 16, Aug. 28, 1985, pp. 41-42.
A. Brosio, et al., "A Comparison of Digital Subscriber Line Transmission Systems Employing Different Line Codes", IEEE Transactions on Communications, vol. COM-29, No. 11, Nov. 1981, pp. 1581-1588.
T.P. Byrne, et al., "Positioning the Subscriber Loop Network for Digital Services", IEEE Transactions on Communications, vol. COM-30, No. 9, Sep. 1982, pp. 2006-2011.
R.G. Cornell, et al., "Progress Towards Digital Subscriber Line Services and Signaling", IEEE Transactions on Communications, vol. COM-29, No. 11, Nov. 1981, pp. 1589-1594.
S. Davis, "Integrating Voice and Data: A Marriage of Convenience", Today's Office, vol. 24, No. 9, Feb. 1990, pp. 28-30.
M. Devault, et al., "Resaux Domestiques et Terminaux Audiovisuels Numeriques", L'Echo Des Recherches, No. 126, 1986, pp. 37-46.

(56) References Cited

OTHER PUBLICATIONS

H. Fuchs, et al., "Providing Full Duplex Transmission Over Two-Wire Subscriber Loops", Telephony, vol. 208, No. 11, Mar. 18, 1985, pp. 76, 77, 78 and 84.
H. Fukagawa, et al., "Bus Wiring System for Residences", Matsushita Electric Works Technical Report, No. 36, Feb. 1988, pp. 31-35.
D. Glick, et al., "Providing Telco Customers Continuous Data Services", Telephony, vol. 205, No. 22, Nov. 1983, pp. 46, 50, 51, 54.
J.B. Hughes, et al., "A Receiver IC for a 1+1 Digital Subscriber Loop", IEEE Journal of Solid State Circuitry, vol. S.C. 20, No. 3, Jun. 1985 pp. 671-678.
R. Jelski, "Subscriber Subcarrier System—A New Life," Communications International, vol. 4, No. 5, May 1977, pp. 29-30.
A.J. Karia, et al., "A Digital Subscriber Carrier System for the Evolving Subscriber Loop Network", IEEE Transactions on Communications, vol. COM-30, No. 9, Sep. 1982, pp. 2012, 2014, 2015.
T. Masuda, et al., "2-Wire Video Intercom System with Telephone", National Technical Report, vol. 37, No. 6, Dec. 1991, pp. 74-80.
T. Matthews, "Telecomm System is Nerve Center", Infosystems, vol. 31, No. 5, May 1984, pp. 68-69.
J. K. Merrow, "A New Approach to Integrating Local Area Data and Voice Transmission," Telephony, vol. 250, No. 17, Oct. 1983, 2 pages.
H. Morgan, "Two-Wire Full-Duplex Modem Simplifies Voice and Data Networking", Mini-Micro Systems, vol. 17, No. 3, Mar. 1984, 4 pages.
R. Murakoshi, "Home Automation", Journal of the Society of Instrument and Control Engineers, vol. 23, No. 11, Nov. 1984, pp. 955-958.
R.D. Nash, et al., "Simultaneous Transmission of Speech and Data Over an Analog Telephone Channel", GLOBECOM '85. IEEE Global Telecommunications Conference. Conference Record. Communication Technology to Provide New Services, Dec. 25, 1985, New Orleans, Louisiana, pp. 4.2.1-4.2.4.
H. Ogiwara, et al., Design Philosophy and Hardware Implementation for Digital Subscriber Loops, IEEE Transactions on Communications, vol. COM-30, No. 9, Sep. 1982, pp. 2057-2065.
J.L. Pernin, "Related Evolution of Subscriber Loop Plant and Residential Data Transmission Needs", Intelcon 79 Exposition Proceedings, Feb. 26-Mar. 2, 1979, Dallas, Texas, pp. 596-599.
R.A. Tatum, "Project Victoria—the 7-in-1 Solution", Telephone Engineer and Management, vol. 90, No. 1, Jan. 1, 1986, pp. 47 and 50.
A. Teshima, et al., "Still Video Telecommunication Over the Analog Telephone Network", Journal of the Institute of Television Engineers of Japan, vol. 42, No. 11, Nov. 1988, pp. 1162-1167.
S.R. Treves, et al., "Text, Image and Data Integration in a Distributed Control Digital Voice Switching System", International Switching Symposium—ISS '81 CIC, Sep. 21-25, 1981, Montreal, Quebec, Canada, pp. 1-7.
T. Tsuda, et al., "Experimental In-House Multiservice Communication System", Fujitsu Scientific and Technical Journal, vol. 16, No. 3, Sep. 1980, pp. 29-45.
K. Urui, "Integrated Voice/Data Digital EPBX", Toshiba Review, No. 150, Winter 1984, pp. 30-33.
A.F. Van Den Berg, et al., "Principles van de Modem: Technieken en Specificaties", Elektronica, vol. 32, No. 5, Mar. 9, 1984, pp. 11, 13, 15, 17, 19 and 21.
M.G. Vry, et al., "Digital 1+1 Systems for Local Network Enhancement", Conference on Communications Equipment and Systems, Apr. 20-22, 1982, Birmingham, United Kingdom, pp. 61-64.
M.G. Vry, et al., "The Design of a 1+1 System for Digital Signal Transmission to the Subscriber", NTG-Bachberichte, vol. 73, 1980, pp. 36-40.
J.A. Webb, "A New Concept in Data-Above-Voice (DAV)", PTC '86: Evolutions of the Digital Pacific. Telecommunications—Asia, Americas, Pacific: PTC '86 Proceedings, Jan. 12-15, 1986, Honolulu, Hawaii, pp. 260-265.
K. Yamamoto, "A Home Terminal System Using the Home Area Information Network", IEEE Transactions on Consumer Electronics, vol. CE-30, No. 4, Nov. 1984, pp. 608-616.
"Centrex LAN Can Provide Advanced Network Capabilities Over the Existing Telephone Wires", Communications News, vol. 25, No. 6, Jun. 1988, p. 27.
"Data Over Voice is Solution for Corporate Network", Telephone Engineer and Management, vol. 91, No. 9, May 1, 1987, pp. 67-69.
"Data Carrier System Allows Simultaneous Voice/Data Transmission for PABX Telephone Systems", Computer Design, vol. 21, No. 5, May 1982, pp. 68 and 70.
"Computerized Telephone System Integrates Voice and Data Switching", Computer Design, vol. 20, No. 4, Apr. 1981, 6 pages.
"AT&T's Systemax Premises Distribution System Solves Networking Problems", Fiber Optics Magazine, vol. 12, No. 4, Jul.-Aug. 1990, pp. 14-16.
M.M. Anderson, "Video Services on Copper", Conference: ICC 91, International Conference on Communications Conference Record, Jun. 2-26, 1991, Denver, CO, pp. 302-306.
M. Bastian, "Voice-Data Integration: An Architecture Perspective," IEEE Communications Magazine, vol. 24, No. 7, Jul. 1986, pp. 8-12.
M. Boubekker, "Bandwidth Reduction for the Transmission of Sign Language Over Telephone Lines", Proceedings of the SPIE—The International Society for Optical Engineering, vol. 1001, Part. 1, 1988, pp. 223-230.
S. Bramblett, "Connect Terminals to Your CPU Over PBX Telephone Lines", EDN, vol. 31, No. 5, Mar. 6, 1986, pp. 239-243, 245, 246 and 248.
48-Volt DC Power Supply Connection Guide; 3Com Published Mar. 2000 (12 pages).
SuperStack II PS Hub User Guide; 3Com Published Jul. 1997 (188 pages).
SuperStack II Entry Hub User Guide; 3Com Published Nov. 1996 (8 pages).
SuperStack II Baseline Switch User Guide; 3Com Published Mar. 1998 (8 pages).
SuperStack II Baseline 10/100 switch; 3Com Published Apr. 1998 (8 pages).
SuperStack II Desktop Switch User Guide; 3Com Published Jun. 1997 (148 pages).
SuperStack II Switch 610 User Guide; 3Com Published May 1999 (54 pages).
Line carrier modems—1: Build a Pair of Line-Carrier Modems (Part 1); Radio Electronics, Jul. 1988, pp. 87-91 by Keith Nichols (7 pages).
Line carrier modems—2: Build a Pair of Line-Carrier Modems (Part 2); Radio Electronics, Aug. 1988, pp. 88-96 by Keith Nichols (5 pages).
Universal Serial Bus Specification Revision 1.0; Jan. 15, 1996 (268 pages).
3ComImpact IQ External ISDN Modem User product brochure; Published Jun. 1996 (4 pages).
3ComImpact IQ External ISDN Modem User Guide; Published Jul. 1997 (157 pages).
Cisco Catalyst 5000 Series Configuration Worksheet, 1996 (11 pages).
Cisco Catalyst 5000 Product Announcement, Published 1996 (22 pages).
Cisco Catalyst 5000 ATM Dual PHY LAN Emulation Module; Posted Sep. 24, 1996 (4 pages).
Cisco Catalyst 5000 Group Switching Ethernet Modules; Posted May 6, 1996 (5 pages).
The Mac Reborn; Macworld Sep. 1996, p. 104-115 (16 pages).
The Mac reborn; Macworld vol. 13, Issue 9, Sep. 1996 (9 pages).
IEEE Standard for a High Performance serial Bus; IEEE Std 1394-1995 Published 1996 (392 pages).
DSLPipe Reference Guide; by Ascend Communications, Jun. 2, 1997 (162 pages).
DSLPipe User's Guide; by Ascend Communications, Jun. 3, 1997 (245 pages).
Ascend DSLPipe-S Features and specifications; Posted May 12, 1997 (4 pages).

(56) References Cited

OTHER PUBLICATIONS

CiscoPro EtherSwitch CPW2115; December, 95 (4 pages).
HART Field Communication Protocol—An introduction for users and manufacturers' published by the HART Communication Foundation, Austin, Texas, Oct. 1995 (12 pages).
SuperStack II Desktop Switch; 3Com Sep. 1996 (2 pages).
Edward Cooper, Broadband Network Technology—An overview for the data and communications industries, Sytek Systems, Mountain View, CA, 1984 (4 pages).
Grayson Evans, The Cebus Standard User's Guide May 1996 (317 pages).
Technical Report TR-001 ADSL Forum System Reference Model May 1996 (6 pages).
Cisco Catalyst 5000 Group Switching Ethernet Modules Data Sheets; 1996 (2 pages).
Cisco Catalyst 5000 Switching System Data Sheets; 1996 (2 pages).
Cisco Catalyst 5000 ATM LAN Emulation Module Data Sheets; 1995 (2 pages).
Cisco Catalyst 5000 Family Fast EtherChannel Switching Modules Data Sheets; 1999 (3 pages).
Motorola CableComm CyberSURFR Cable Modem Specifications; Apr. 1998 (4 pages).
G.D. Carse, "New and Future Technologies in the Local Telephone Network: The Victoria System", Conference: IEEE International Conference on Communications '86, ICC '86: Integrating the World Through Communications Conference Record, Jun. 22-25, 1986, Toronto, Ontario, Canada, pp. 410-412.
C. Dougligeris, et al., "Communications and Control for a Home Automation System", Conference: IEEE Proceedings of the Southeastcon '91, vol. 1, pp. 171-175.
D.G.J. Fanshawe, "Architures for Home Systems", Conference: IEEE Colloquium on Home Systems—Information, Entertainment and Control, Oct. 1, 1990, London, United Kingdom, pp. 3/1-3/3.
N.C. Hightower, "Integrated Voice, Data and Video in the Local Loop", IEEE 1986, pp. 915-919.
M. Inoue, et al., "A Home Automation System", IEEE Transactions on Consumer Electronics, vol. CE-31, No. 3, Aug. 1985, pp. 516-527.
J.W. Lechleider, "Study of the Feasibility and Advisability of Digital Subscriber Lines Operating at Rates Substantially in Excess of the Basic Access Rate", T1E1.4 Technical Subcommittee (T1E1.4/89-070), 1 page.
S. Motoyama, et al., "A Subscriber Loop Multiplexing System for Integrated Service Digital Networks", Conference: NTC '81, IEEE 1981 National Telecommunications Conference, Innovative Telecommunications—Key to the Future, Nov. 29-Dec. 3, 1981, New Orleans, Louisiana, pp. D5.1.1-D5.1.5.
G. Neumann, Flexible and Cost-Minimising System Concept (Ericsson Digital PABX MD 110), NET Nechrichten Elektronik-Telematik, Special Issue, Mar. 1988, pp. 11, 12, 14 and 15.
H. Nishi, et al., "Control of a Star/Bus Key Telephone System", NTT R & D, vol. 39, No. 8, 1990, pp. 122, 1222, 1224-1228.
A. Pietrasik, et al., "Subscriber Carrier Telephony System 1+1", Wiadomosci Telekomunikacyjne, vol. 17, No. 7-8, Jul.-Aug. 1977, pp. 183-198.
V. Punj, "Broadband Applications and Services of Public Switched Networks", IEEE Transactions on Consumer Electronics, vol. 35, No. 2, May 1989, pp. 106-112.
T. Sodeyama, et al., "Intelligent House", Journal of the Institute of Electronics, Information and Communication Engineers, vol. 72, No. 9, Sep. 1989, pp. 1024-1026.
H. Tanaka, et al., "Telecontrol System VJ-501", National Technical Report, vol. 32, No. 6, Dec. 1986, pp. 809-817.
C. Valenti, "Study of the Feasibility and Advisability of Digital Subscriber Lines Operating at Rates Substantially in Excess of the Basic Access Rate", T1E1.r Technical Subcommittee (T1E1.4/91-115), pp. 2 and 4.
D. L. Waring, "The Asymmetrical Digital Subscriber Line (ADSL): A New Transport Technology for Delivering Wideband Capabilities to the Residence", Globecom '91, IEEE, pp. 1979-1986.
K. Yamamoto, et al., "New Home Telephone System Using Japanese Home Bus System Standard," IEEE Transactions on Consumer Electronics, vol. 35, No. 3, Aug. 1989, pp. 687-697.
T. Yamazakii, et al., "Home Appliance Technologies," NEC Research and Development, No. 96, Mar. 1990, pp. 292-299.
Funkschau, "CEBus: US Households are Being Networked", No. 9, Apr. 1989, pp. 45-47.
"Shared Services (Data/Voice Network)", Communications News, vol. 25, No. 11, Nov. 1988, pp. 46-47.
Freeman, "Telecommunication Transmission Handbook", 2.sup.nd Ed., Cover, 1981, pp. xi-xxvii, Chapter 3 (pp. 79-127), Chapter 5 (pp. 172-252), Chapter 6 (pp. 253-288).
A. Artom, et al., "The Possible Use of Customer Loop for New Services During the Transition From Analogue to Digital", Revue F.I.T.C.E., Mar.-Apr. 1981, vol. 20, No. 2, pp. 50-56.
A. Artom, et al., "Medium-Term Prospects for New Servies to the Telephone Customers," Conference Record, Jun. 14-18, 1981, Int'l Conf. on Communications, Denver, CO., pp. 14.4.1-14.4-6.
Hoe-Young Noh, "Home Automation", Korea Information Science Society Review, Apr. 1989, vol. 7 No. 2, pp. 40-44, Republic of Korea. (Translation Provided).
M. Coronaro, et al., "Integrated Office Communication System," Electrical Communication, 1986, pp. 17-22, vol. 60, No. 1, FACE Research Center, Pomezia, Italy.
Chow, et al., "A Multi-drop In-House ADSL Distribution Network"; IEEE 1994, pp. 456-460.
English Language Abstract for Japanese Patent 1-27358 (64-27358) Jan. 30, 1989.
Bellcore: Request for Information: Asymmetrical Digital Subscriber Line (ADSL) Systems That Support Simplex High-Bit-Rate Access and POTS in the Copper Loop Plant; Jun. 1991.
Twisted Pair Physical Layer and Medium Specification; Revision: IS-60 8-18-95 (49 pages).
Introduction to the CEBus Standard; Revision Feb. 5, 1995 Draft Copy (19 pages).
Compaq to Ride the CEBus; by Mark Nachman, EBN Jan. 22, 1996 (1 page).
CEBus Router Testing; IEEE Transactions on Consumer Electronics Nov. 1991, vol. 37 No. 4 (8 pages).
Broadband Network Technology—An Overview for the Data and Telecommunications Industries; by Edward Cooper, Copyright 1984, p. 51-52 (4 pages).
33 Technical Report TR-001 ADSL Forum System Reference Model; May 1996 (6 pages).
Ascend DSLPipe-S Features; Posted May 12, 1997 (2 pages).
Broadband Digital Subscriber Line—A Full Service Network for the Copper Plant; Telephony / Jun. 12, 1995, vol. 228 No. 24 (8 pages).
Commtek Intros Video over UTP; Communications Week, Feb. 10, 1992 (3 pages).
Aurelio Amodei, et al., "Increasing the Throughput of the HomePNA MAC Protocol, IEEE, Proceedings of the 29th Annual IEEE International Conference on Local Computer Networks (LCN '04), 8 Pages", Nov. 1, 2004, 8 pages(s), None.
"Home Phoneline Networking Alliance", Interface Specification for HomePNA 2.0 10M8 Technology Link Layer Protocol, (Dec. 1, 1999), pp. 1-39.
"Home Phoneline Networking Alliance", Interface Specification for HomePNA 2.0 10M8 Technology, (Dec. 1, 1999), pp. 1-77.
Paola Bisaglia, et al., Receiver Architectures for HomePNA 2.0 , Hewlett Packard Laboratories, Bristol, U.K., Oct. 17, 2001.
Loh, L.; Ozturk, Y.; Quality of Support and Priority Management in HomePNA 2.0 Link Layer.quadrature..quadrature.Computers and Communication; Jun. 30-Jul. 3, 2003. (ISCC 2003). Proceedings. Eighth IEEE International Symposium; pp. 861-866 vol. 2.
Phoneline / HPNA / HomePNA Networks, http://www.homenethelp.com/web/howto/HomeNet-HPNA.asp (visited Jul. 29, 2003) (3 pages).
Anonymous, HomePNA Specification 1.0 Field Tests Status, Mar. 1999, Home Phoneline Networking Alliance, Inc, pp. 1-6.
21145 Phoneline/Ethernet LAN Controller, Intel Corporation . COPYRGT. 1999, http://developer.intel.com/design/network/21145.htm.

(56) References Cited

OTHER PUBLICATIONS

Simple, High-Speed Ethernet Technology for the Home, White Paper, Home Phoneline Networking Alliance, Jun. 1998, pp. 1-11.
Information on Home PhoneLine Networking Alliance (Home PNA), dated Jun. 1998 and before.
Cisco Catalyst 5000; Industry's First Modular, Multilayer-Capable switching System for the Wiring Closet; Posted May 16, 1996 (22 pages).
Catalyst 5000 switching System; Cisco (4 pages).
Canned Heat; Data Communications Feb. 1996 (10 pages).
Fast Ethernet 100-Mbps Solutions; Posted Mar. 112, 1996 (10 pages).
Forget the Forklift; Data Communications Sep. 1996 (11 pages).
LAN Emulation; Posted Nov. 15, 1995 (16 pages).
IBM LAN Bridge and Switch Summary, IBM, published Jan. 1996 (70 pages).
Continuation of IBM LAN Bridge and Switch Summary, IBM, published Jan. 1996 (70 pages).
Computer Dictionary, 2nd edition, 1994, Microsoft Press, pp. 167, 298.

* cited by examiner

INFORMATION DEVICE

This is a continuation of application Ser. No. 11/506,907, filed on Aug. 21, 2006, which is itself a continuation of parent application Ser. No. 11/017,060 filed Dec. 21, 2004.

FIELD OF THE INVENTION

This invention relates information devices. More specifically, the invention relates to a method, device and system for obtaining information from a remote location to an information device.

BACKGROUND OF THE INVENTION

In modern life there is a continuous need for updated information, such as weather forecasts, traffic reports, stock market quotes, sports results and general news. Such information may be obtained in various ways using many types of media and communication means. Such communication means may include physical delivery such as newspapers, or using networking such as landline telephony, cellular telephony, radio and television. The Internet is gradually being recognized as an important, reliable and rich source of information.

In order to obtain updated information, and specifically to obtain specific information required by a specific user, the user is required to actively and repetitively seek for the information. For example, in order to get the weather forecast via the television the user is required to turn on the television set, select a weather channel and watch until the relevant information appears on the screen. Using the Internet to obtain a weather forecast requires turning on a computer, connecting to the Internet, running a web browser and selecting the relevant web site.

It would be more convenient to obtain and display information, and specifically information tailored towards specific user preferences, automatically and periodically without any user intervention. U.S. Pat. No. 6,442,573 to Schiller et al. discloses an appliance which automatically and periodically connects to a remote server for obtaining information. However, the appliance and system taught by Schiller et al. is oriented towards mailing images between users being part of a community.

SUMMARY OF THE INVENTION

It is therefore an object of the invention to provide a method, device and system for periodically and automatically obtaining information from a remote location.

An information device according to the present invention comprises a communication unit for connecting to the remote location, an info memory for storing the information obtained and a display unit for displaying the stored obtained information. The device periodically and automatically initiates a communication session with the information-storing server in the remote location, during which selected information is downloaded to the information device.

The communication with the remote site may use the PSTN, to which the information device is connected, by a dial up modem or a cellular network, to which the device connected thereto by a cellular modem. Other telephony connections or any other medium may also be employed. Connection to a telephone outlet may either use cable or be cordless. In addition to narrowband, any broadband connection such as ADSL or cable modem may be employed. The communication may be direct point-to-point connection (such as in telephony) or via the Internet.

The information device may connect to a single remote site, or alternatively may connect to multiple such sites, such as for retrieving distinct information from each site. The communication session may be initiated by the information device or by the remote location.

Settings and parameters such as the telephone number to dial or the URL to download from, the connection period interval as well as the selection of required information may be set in production, by the user (using on device controls) or by the remote location.

In the case wherein the communication unit is a dial up modem or cellular modem, various means may be employed in order to avoid interference with other devices and services using the same connection. The device may include means for delaying and stopping the call initiation in the case wherein other devices (of higher priority) requires the connection medium.

The information device may be powered from a regular AC power, batteries or by extracting power from the telephone connection.

The information device may be housed within a self-contained stand-alone enclosure, or may be integrated with another appliance. In such integration additional functionalities may be integrated added to the shared housing. For example, the communication means may be shared, the display, the control and the information memory or any combination of the above. As such, the information device may be integrated within a telephone set (either landline or cellular), a PDA or a television set. Similarly, the information device may share other appliances display or connection means.

A system according to the present invention comprises one or more user sites, each employing an information device as described below, and one or more remote sites, each comprising an information server storing the information to download and connection means for connecting to the information devices.

It is understood that other embodiments of the present invention will become readily apparent to those skilled in the art from the following detailed description, wherein are shown and described only embodiments of the invention by way of illustration. As will be realized, the invention is capable of other and different embodiments and its several details are capable of modification in various other respects, all without departing from the scope of the present invention as defined by the appended claims. Accordingly, the drawings and the detailed description are to be regarded as illustrative in nature and not as restrictive.

BRIEF DESCRIPTION OF THE DRAWINGS

The invention is herein described, by way of non-limiting example only, with reference to the accompanying drawings, wherein.

DESCRIPTION OF THE INVENTION

Figure 1:
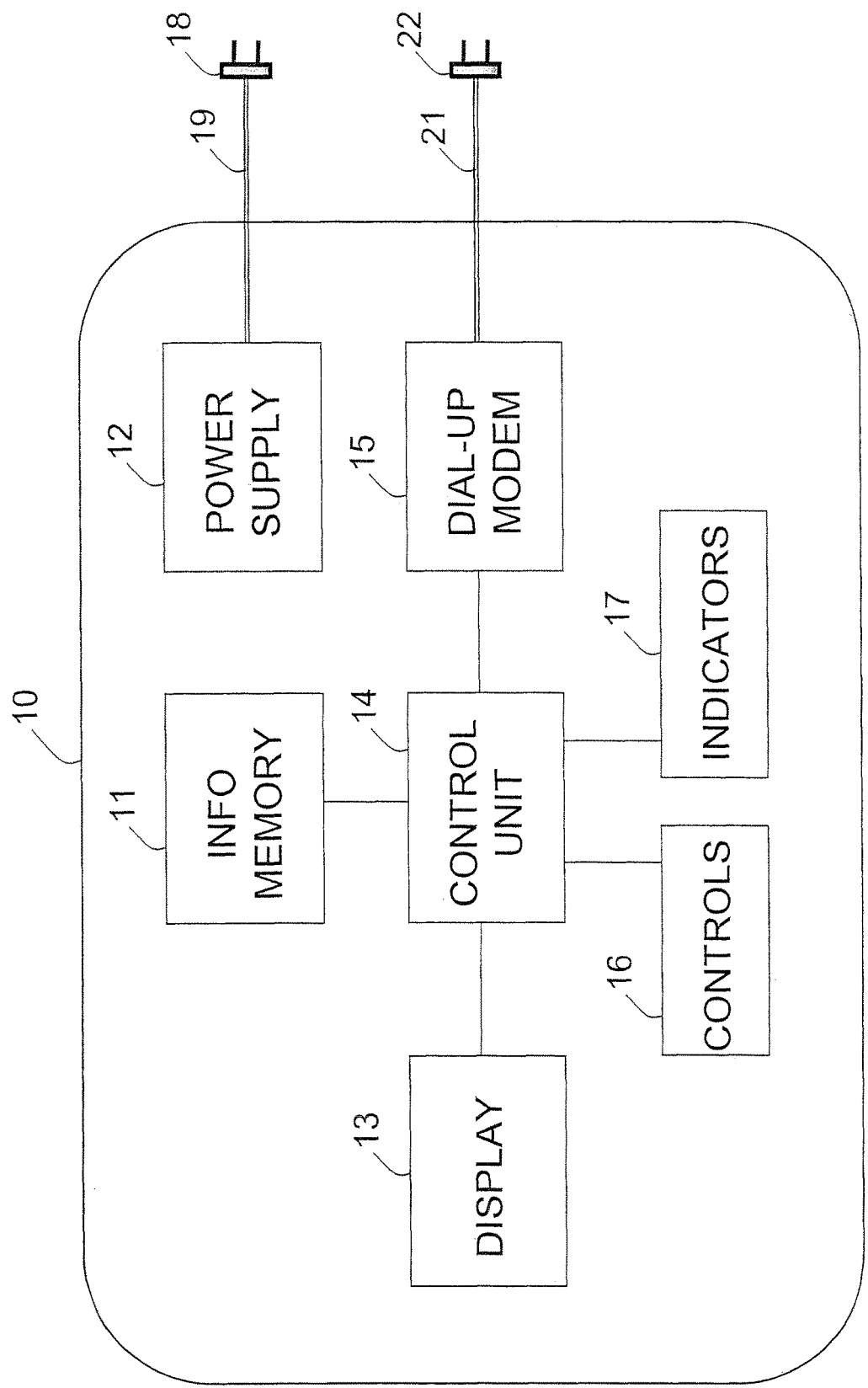
FIG. 1 shows a functional block diagram of exemplary information device according to the present invention.

In the following description numerous specific details are set forth in order to provide a more thorough understanding of the present invention. It will be apparent, however, to one skilled in the art, that the present invention may be practiced without these specific details. In other instances, well-known features have not been described in detail so as not to obscure the invention.

The principles and operation of a device, system and method according to the present invention may be understood with reference to the drawings and the accompanying description. The drawings and descriptions are conceptual only. In actual practice, a single component can implement one or more functions; alternatively, each function can be implemented by a plurality of components and circuits. In the drawings and descriptions, identical reference numerals indicate those components that are common to different embodiments or configurations.

Information Device

A functional block diagram according to one or more embodiments of the invention is shown in FIG. 1. The information device 10 shown comprises a dial-up modem 15 for connecting the information device 10 to a remote location over the PSTN (Public Switched Telephone Network). The dial-up modem may use standard common protocols such as ITU-T V.34, V.90 and V.92 known in the art. The dial-up modem 15 connects to a telephone outlet 24 by telephone plug 22 via cable 21. The information received from the remote location is stored in the info memory 11, and displayed to the user by display means 13. The display means 13 may be alpha-numeric only or analog video display, and may use technologies such as LCD (Liquid Crystal Display), FED (Field Emission Display, or CRT (Cathode Ray Tube). The memory may be volatile or non-volatile type, such as Flash, DRAM and RAM. In many cases, an adaptor (not shown) is required in order to connect the analog display to digital data device. For example, the adaptor may convert to composite video (PAL, NTSC) or S-Video or HDTV signal. The information device 10 is powered by the local AC power (110 VAC in North America, 220 VAC in Europe) from a standard wall outlet 25, connected thereto by a power plug 18 and power cable 19, feeding a power supply 12 within the information device 10. The power supply converts the AC power to the various voltages, usually DC type, required for proper operation of the active circuits within the device 10. In one or more embodiments, a small outlet plug-in transformer may be used.

Operations of the information device 10 are controlled and managed by a control unit 14, comprising a microprocessor as known in the art. Various user controls 16 are available to allow the user to control and effect the device 10 operations, such as on/off switch, reset button and others. Other exemplary controls involve display 13 settings such as contrast, brightness and zoom. Other controls may involve selecting specific information to be shown, changing the language displayed and so forth. Various indicators 17 are available to visually indicate to the user the status of the device 10, such as power indication showing that the unit is properly powered, indication when the device 10 communicates with the remote location and so on. The control unit 14 couples to most or all device components either for getting data and status information, or for controlling/activating the sub-systems. The control unit 14 may be based on CPU (Central Processing Unit) such as a microprocessor or microcomputer, and coupling to the other components may be serial or shared bus type.

Figure 2:
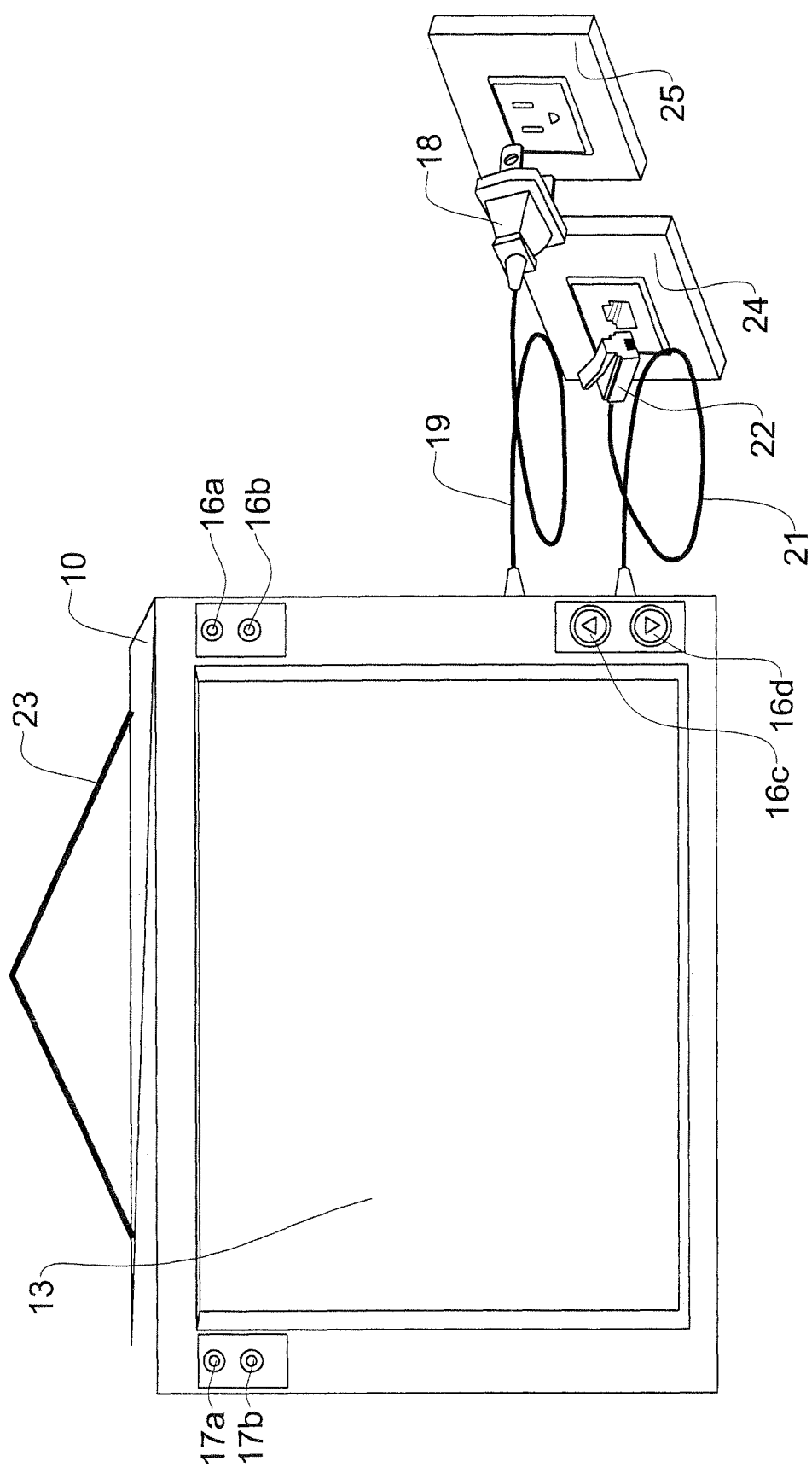
FIG. 2 shows a pictorial view of an exemplary information device according to the present invention.

An exemplary illustrative configuration of an information device 10 is shown in FIG. 2. A 'hanging picture' like unit is shown, suitable for hanging on a wall using wire 23. A screen 13 serves as the display means, located in the center of the unit. Four controls named ON/OFF 16a, UPDATE 16b, UP 16c and DOWN 16d pushbuttons are shown as examples of controls 16. Similarly, indicators 17 are shown as POWER indicator 17a and STATUS indicators 17b, illustrated as a small round shaped illuminating units, such as common LEDs. A physical cables and connectors are also shown, such as plug 18 and cable 19 connecting the device 10 to a power outlet and plug 22 and cable 21 connecting to telephone outlet.

Information Network.

Figure 3:
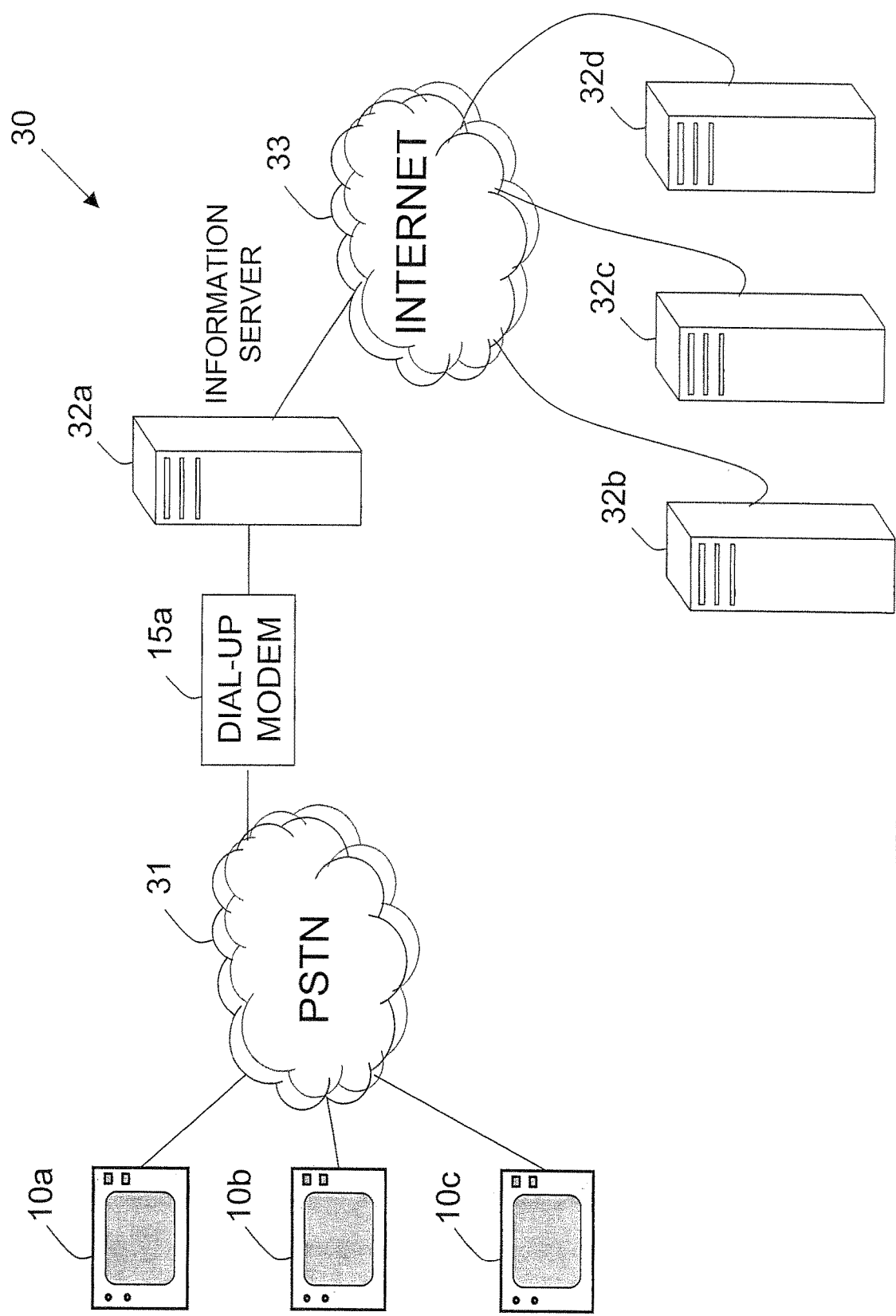
FIG. 3 shows an exemplary single provider system according to the present invention.

The information device 10 connects to an information provider in a remote location for downloading information and displaying it. An exemplary network 30 illustrating user and provider equipments is shown in FIG. 3. Single provider location comprising an information server 32a is described, serving multiple information devices 10a, 10b and 10c, wherein each may be located in a different premises and thus serving different users. Information server 32 is any apparatus (e.g. computer) storing information and connectable to an information device 10 for transmitting the information thereto. Each such information device, such as device 10a, connects to the PSTN 31 (via its dial up modem 15, cable 21 and telephone connector 22 shown in FIG. 1). Similarly, the information server 32a in the information provider location connects to the PSTN 31 via dial up modem 15a. In the case wherein the information server 32a contains all the required information to send to the information devices 10, no other connections are required. However, in most cases the information may not be available, thus requiring the information server 32a to connect to other providers to get additional information. Network 30 suggests that information server 32a connects to other servers 32b, 32c and 32d via the Internet network 33 in order to receive the required information. For example, server 32b may provide weather related information, server 32c may contain news and server 32d may contain sport results information. In this case, each such server may support an Internet web page providing the dedicated information, gathered by the providers' information server 32a. It should be understood that any other type of communication may be employed in order to allow the information provider to get the required information into the information server 32a, wherein it can be retrieved by any information device 10 connected thereto via the PSTN network 31.

Figure 4:
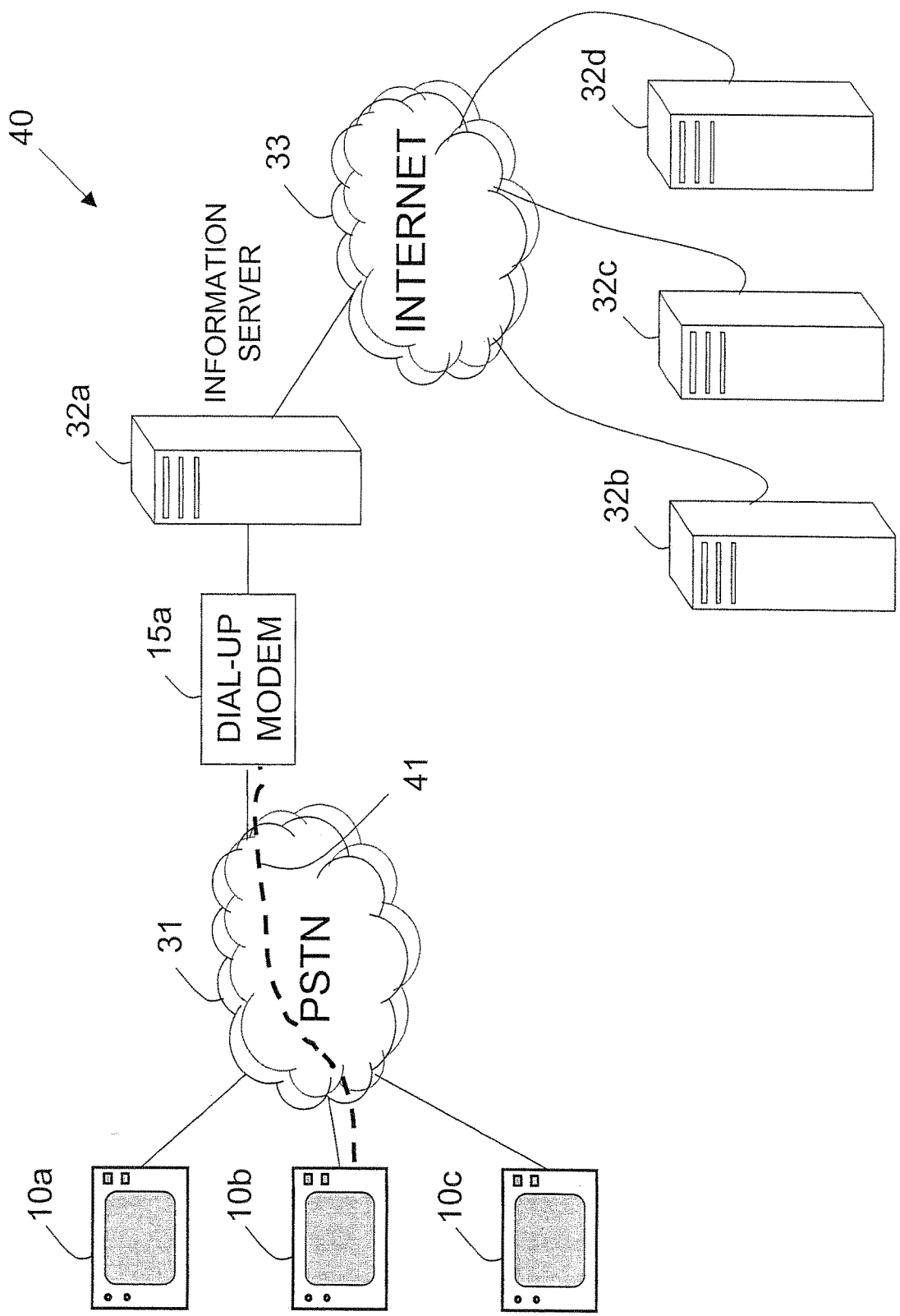
FIG. 4 shows a communication link in an exemplary single provider system according to the present invention.

As shown in system 40 in FIG. 4, in order to obtain information from server 32a, information device 10b (for example) communicates via the PSTN network 31 with the dial up modem 15a, thus creating a communication link 41, enabling data transfer between the information device 10b and server 32a.

Figure 5:
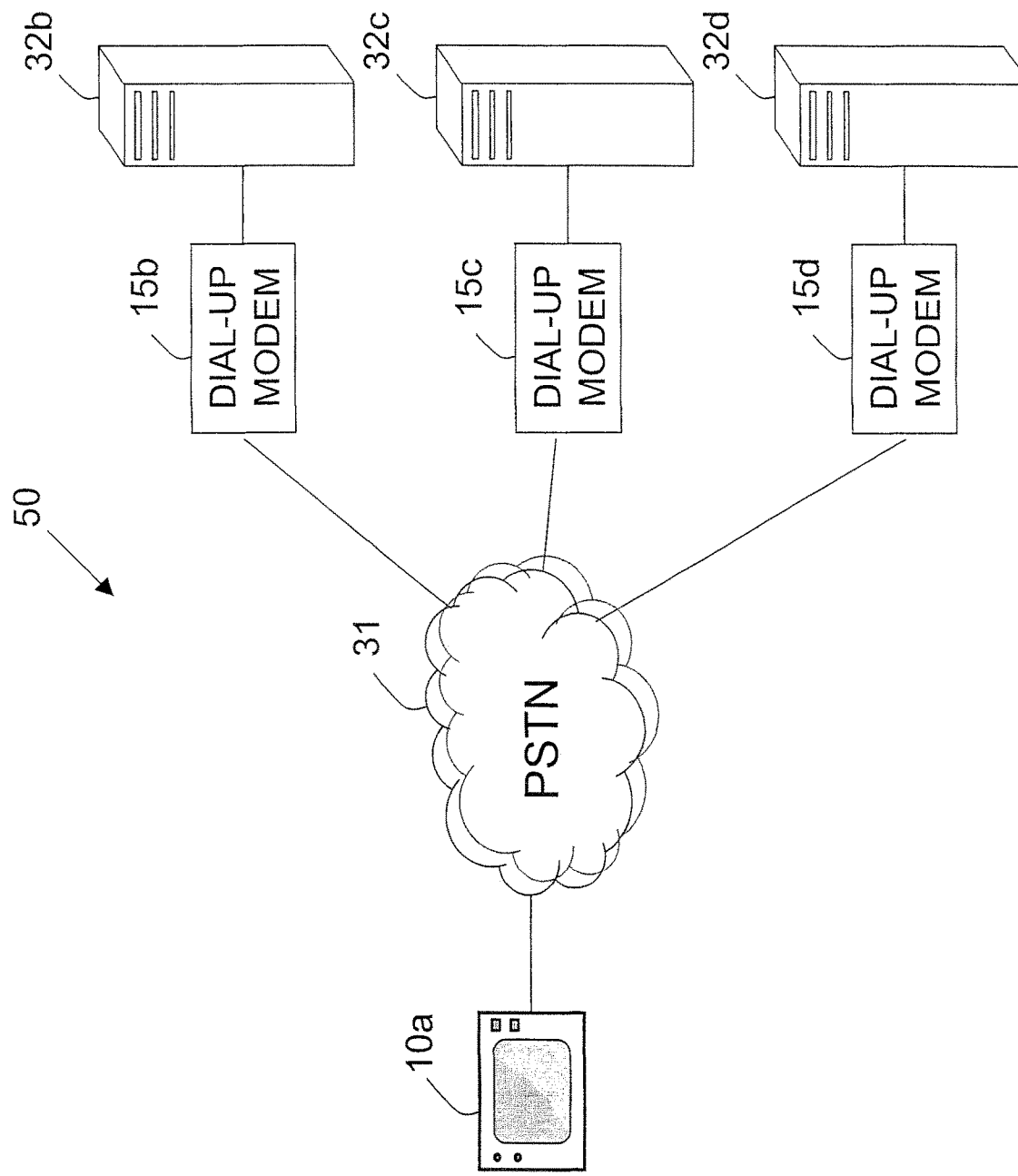
FIG. 5 shows an exemplary multiple providers system according to the present invention.

An alternative exemplary embodiment of a network 50 is shown in FIG. 5. In such configuration, the information device 10 directly connects to multiple providers (or a single provider operating multiple locations/servers). Dedicated information servers 32b, 32c and 32d are connected to the PSTN 31 via respectively dial up modems 15b, 15c and 15d. In such a case, information device 10a connects one at a time to each server 32 to receive dedicated information.

While the invention has been described above with respect to direct telephone connection between the user and the provider, it will be appreciated that any other type of connection can be used, allowing data communication session between the information device 10 and the provider server 32. In the particular case where the connection uses the Internet, the user connects (through the PSTN, ISDN or any other means) to an ISP (Internet service Provider) for connection to the Internet. Similarly, the server 32 also connects the Internet, thus allowing a communication session between the information device 10 and the information server 10 using the Internet.

Operational Sequence.

Figure 6:
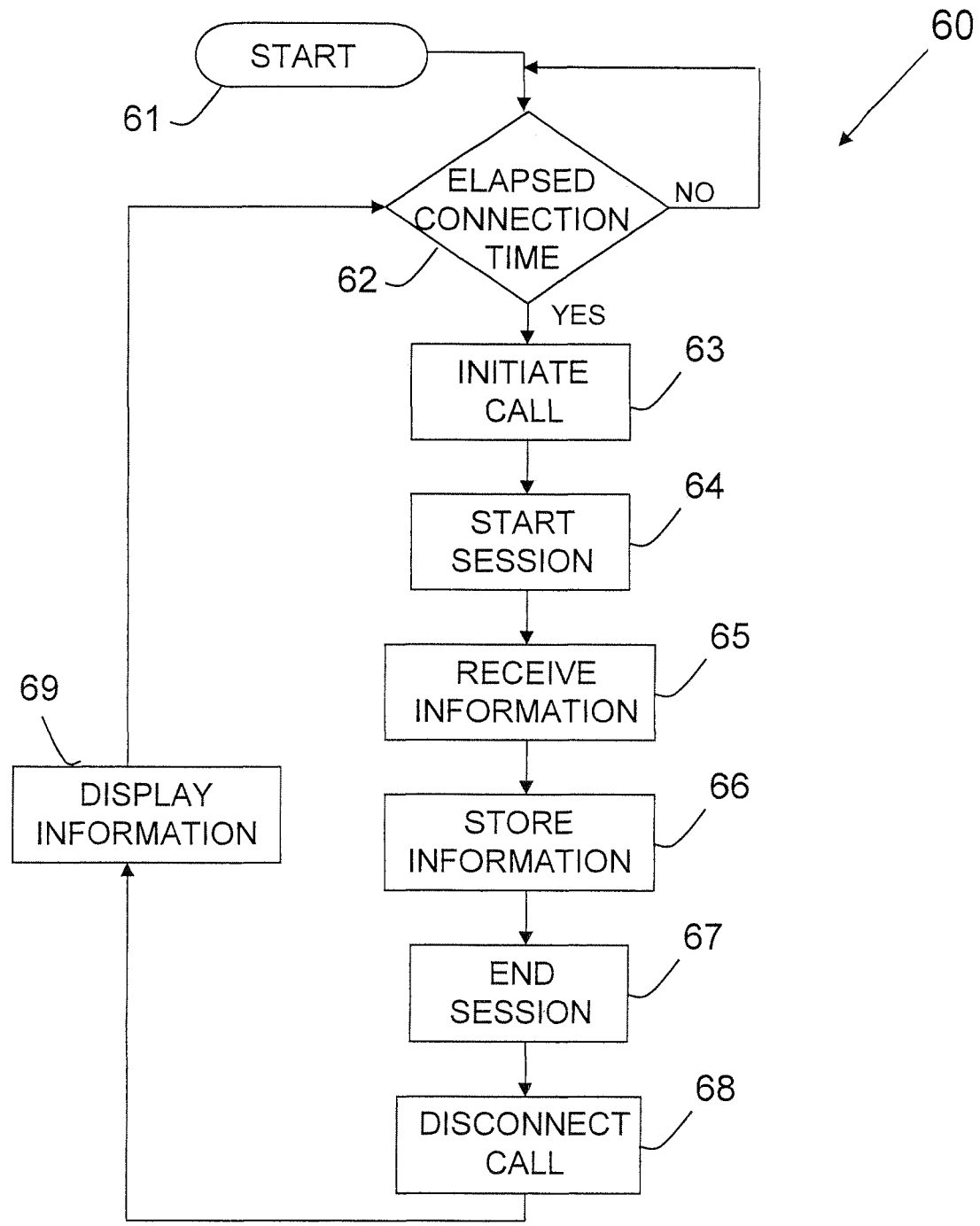
FIG. 6 shows an exemplary flow chart to be executed by an information device according to the present invention.

The operations carried out by an information device 10 are shown in FIG. 6 as flow-chart 60. In most cases, the control unit 14 executes these operations. The general principle of operation involves periodically contacting the information provider server, downloading information therefrom, and displaying the received information. Upon powering up or following device rest, the device starts at step 61. A pre-determined connection-time is established. In step 62, the device waits for the connection time to expire before commencing communication. The connection timing may be defined and executed in various forms:

a. A fixed time-of-day (TOD). In this configuration, the device is set to communicate at a specific time of the day, preferably during the night wherein the telephone traffic is low. For example, a device 10 can be set to communicate on daily basis at 2.00 AM. In such a case, every day at 2.00 AM the device will commence communication (moving to step 63 in the flow chart 60). It will be obvious that the device can be set to communicate a plurality of times during a 24-hour day, or alternatively, to commence communication less frequently than daily, such as once a week, once a month and so forth. In such configuration, the control unit 14 within device 10 should comprise a real-time clock keeping track of the time, and store (preferably in non-volatile memory) the parameter of the time of day wherein the communication should be initiated.

b. Time interval. In this configuration, the next communication is commenced as a fixed time interval after the last communication session. For example, an interval period of 6 hours may be selected, wherein every 6 hours the device commences a communication session. The control unit 14 includes a timer being reset after each communication session, and counting towards the next session until the stored period value has elapsed.

One or both the above timing mechanisms may be supported. Selection of the timing mechanism, as well as the values associated (time of day or period value), may each be selected by:

a. Production set. In this configuration, the timing mechanism is set during production and cannot be modified later.

b. User set. In this scenario the user may select the timing method (if such selection is available and is not production set) as well as the timing value. Such programming may use the device controls 16 or a dedicated setting interface (not shown).

c. Provider set. In this case the provider may, during communication session, access and modify the device timing mechanism.

In the case wherein multiple information servers are discussed as shown in network 50, a different timing mechanism may be associated with each such server.

Upon a decision by the timing mechanism to commence a communication session, the device 10 shifts to step 63, in which the device dials the telephone number of the provider. Such a number may be a toll-free number (1-800 in the U.S.). Upon an off-hook response from the called dial-up modem (such as 15a in network 30), physical layer communication is completed, and both the calling device 10 and the called server 32 start a communication session as part of step 64, during which the authorization for information access is checked, for example. Upon decision of the server 32 to provide information, the information flows from the server 32 through the PSTN to the calling device 10, as part of step 65, using agreed upon or standard protocol. For example, the popular TCP/IP protocol may be used. In another one or more embodiments, the World Wide Web (WWW) system using the Internet protocol (commonly known as TCP/IP) is used, wherein the provider uses a web server having a URL (Uniform Resource Locator) and the information device 10 client software is based on a common web browser such as Microsoft Internet Explorer, used to transmit and access the URL of the web site stored by the information server. The information received is stored in the info memory 11 of the device 10. After completing the information downloading, device 10 and the called server 32 end the session, as shown in step 67. At this point, the calling device 10 or the respective called server 32 dial up modem 15 disconnects the call as shown in step 68, thus ending the communication session. The calling device 10 then displays the new information received (step 69), and shifts to step 62, waiting again until the time for the next session elapse.

It will be understood that the operation sequence described above results in a periodic automatic device operation to obtain and display information, without the need for any manual intervention. Furthermore, the information device 10 may be operated in an 'always on' mode, wherein it is continuously powered and operative, obviating the need for turning it on and off.

Figure 6A:
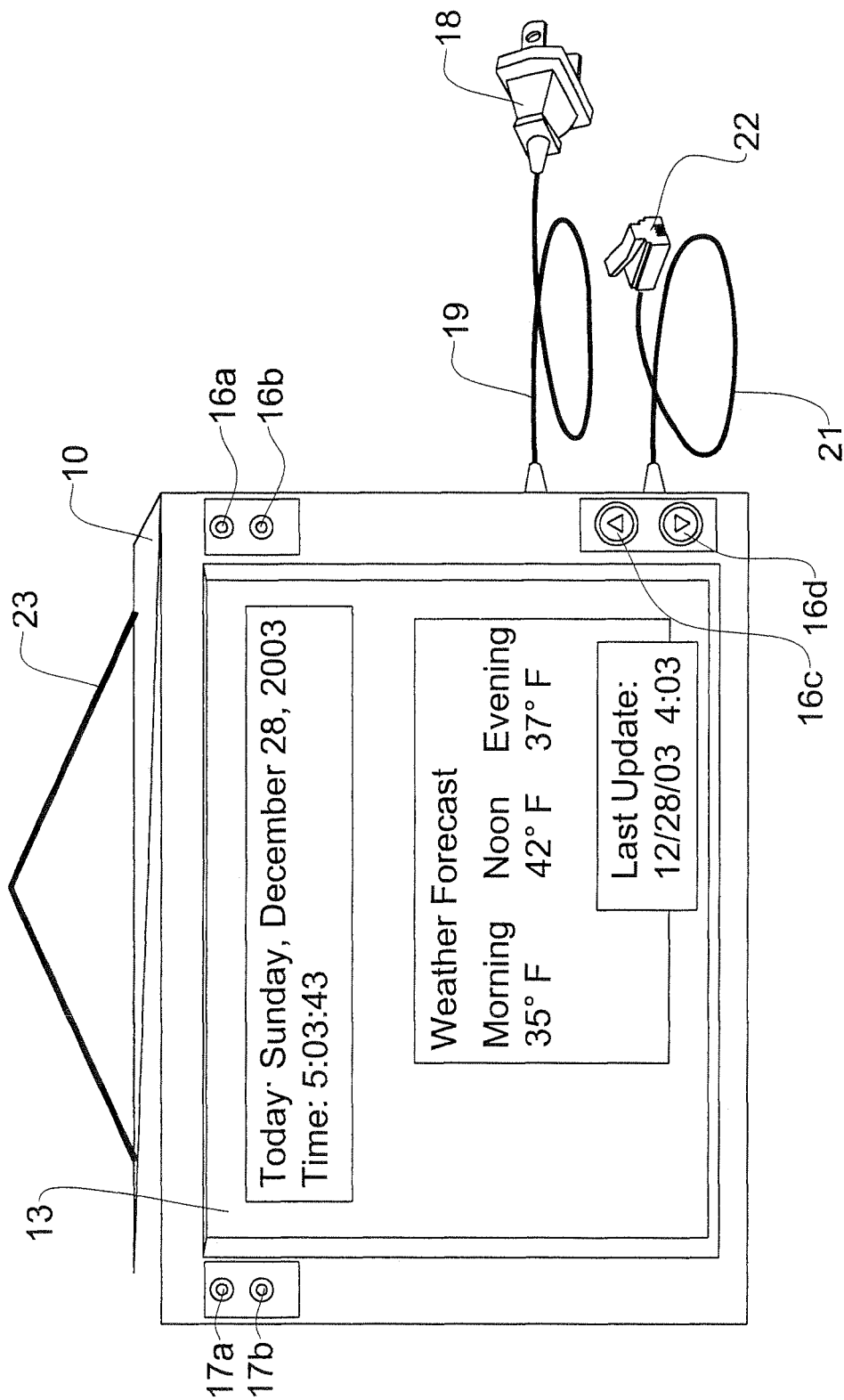
FIG. 6a shows a pictorial view of an exemplary operating information device according to the present invention.

For example, the information device may be used to get local weather forecast. The device 10 contacts a weather server 32 daily in 5.00 AM while the user is asleep. Upon getting up in 6.00 AM, the device 10 displays the most updated weather forecast for the day, as shown for example in FIG. 6a, enabling the user to plan his activities accordingly.

While the invention has been so far described with respect to automatic information obtaining without any user intervention, alternative embodiments of the invention involve initiating a communication session upon a user request. For example, a button 'UPDATE' shown as control 16b in FIG. 2 may be used for such a function. Upon user pushing this button, the information device 10 will immediately initiate a communication session by executing step 63 in the flow chart 60, rather than waiting for the next scheduled communication session. In one or more embodiments, the information device 10 initiates a communication session only upon user request. Yet in another one or more embodiment, both mechanisms are supported. In the latter case, a session is initiated by either a scheduled operation or by a user request.

Information Types and Selection.

'Public information' is any information that is available to the general public. Public information may be available for free ('free public information'), such as information available in most of the Internet WWW web sites. Major newspapers, radio stations and television stations, as well as other information providers frequently operate a web site wherein updated information may be accessed. Printed newspapers and other some web sites in the Internet require payment in exchange for providing access to the information ('paid public information'). Public information includes any information which may accessed, either for free or for a fee.

'Non-public information' is information which is not included in the above definition of public information. For example, information which is owned by a person who is not willing to share this information with the public, but rather to a small pre-selected group (e.g. family, friend) or with no one. The term 'information' as used herein includes both public information (both free and paid) as well as non-public information.

Updated information with respect to the present invention refers to information which was not available in the last communication session, but was created since.

Non-limiting examples of public and updated information types may include any information found in periodicals such as newspapers, such as:
 Weather forecast.
 Sport event results.
 Stock market quotes.
 News.
 Traffic information.
 Lottery results.
 Personal ads.
 Exchange rates.
 Travel information.
 Future events (sport, culture, entertainment)
 TV/radio guide.

The term information herein includes both public information (both free and paid) as well as non-public information. In one or more embodiment, the information includes updated information.

The information device 10 comprises inherently limited info memory 11, and a display 13 of limited visual area, and in order to reduce communication session length, the size of the information content to be downloaded in a single communication session is limited. Hence, in most cases there is a need to clearly define the required information to be obtained from the server 32. Such selection can make use of:

a. No selection. In this case the user cannot select the required information, and the content is fixed and determined by the server 32 settings.

b. User set. In this scenario the user may select the information to obtain. Such programming may use the device controls 16 or a dedicated setting interface (not shown).

c. Information provider set. In this case the information provider transmits the selected information based on the identification of the specific information device 10.

Dial-Up Connection.

Figure 7:
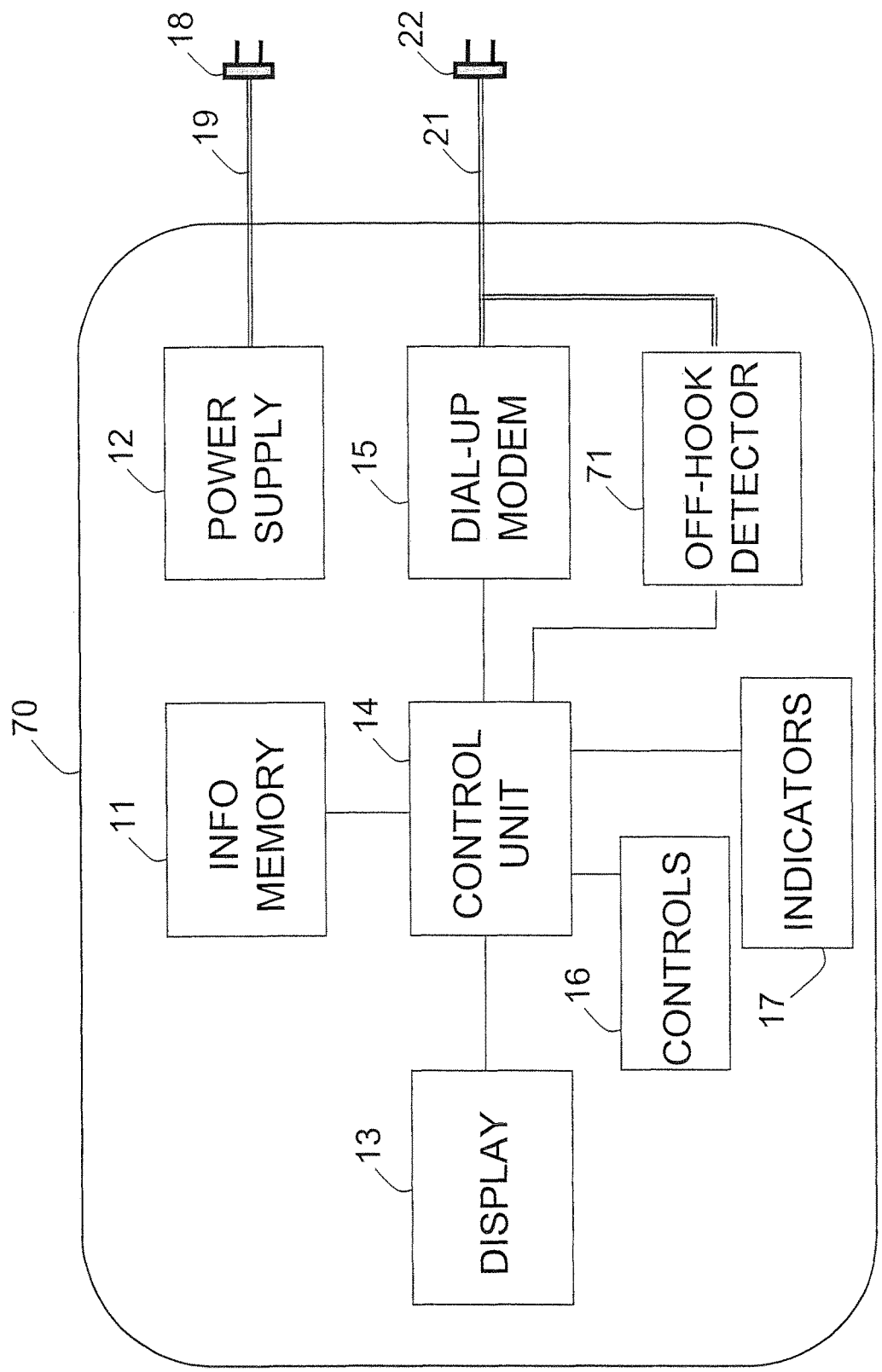
FIG. 7 shows a functional block diagram of exemplary information device according to the present invention.

In many cases, an external telephone connection is shared between few telephone devices such as telephone sets, facsimile and answering machines and others. In the case wherein the telephone connection is in use, for example by a person having a telephone conversation using a telephone device connected thereto, the information device 10 will interfere with the telephone connection usage upon its trying to connect. In order to obviate such scenario, an off-hook detector 71 is added to the information device 70 shown in FIG. 7. The off-hook detector 71 connects to the external telephone connection (using cable 21 and connector 22) and couples to the control unit 14. Basically, the off-hook detector 71 measures the voltage over the telephone lines. While nominally the voltage is about 40-60VDC, in the case of any connected device switching to off-hook state, the voltage drops under 15VDC. As such, the information device 70 first measures the voltage over the telephone lines by the off-hook detector 71, and if low voltage is detected, meaning off-hook condition of a connected device, the dial-up modem 15 operation is postponed by a pre-determined time. Most existing dial-up modems integrate the off-hook detector functionality described above.

Figure 8:
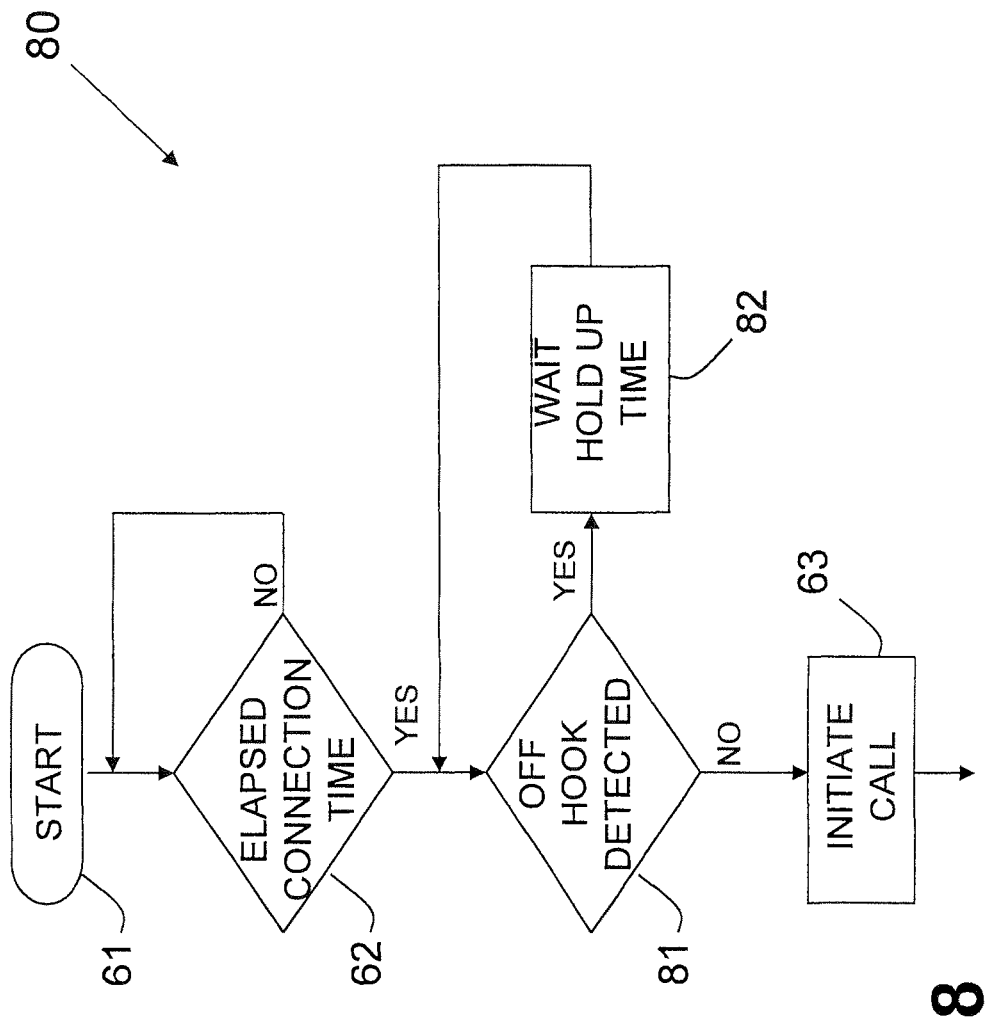
FIG. 8 shows part of an exemplary flow chart to be executed by an information device according to the present invention.

The operational sequence 60 described above applies also to the information device 70, wherein steps 81 and 82 are added between steps 62 and 63, as described in the partial flow chart 80 in FIG. 8. In step 81, the device 70 checks the telephone connection status using the off-hook detector 71. In the case wherein on-hook status is detected, the device continues to initiate the communication session. Detection of off-hook state will cause the device to shift to step 82, wherein the communication initiation is delayed by a fixed period. The time delay may be set in the production phase, by the user or by the provider as described above.

In most cases, the operation of the information device 10 is considered to be of low priority versus other uses of a telephone connection. As such, in the case wherein other devices connected to the telephone line switch to off-hook, as is the case wherein a user picks up a telephone headset, the information device should halt its operation to allow the other device to use the telephone connection.

In one or more embodiments, the device 10 stores multiple telephone numbers for connecting to a provider. In the case wherein a telephone connection cannot be obtained after a few attempts (such as due to a busy line or malfunctioning connection), the device 10 dials alternate telephone numbers according to a predefined priority.

Cordless Connection.

As explained and shown in FIGS. 1 and 2 above, the information device 10 requires two cables for proper connection, one for telephony and the other for power. Such cabling may be not aesthetic and also complicates the installation and operation of the device. Telephone cable may be eliminated by using non-wired telephone connection such as cellular telephony, as will be described below. In one or more embodiments, a cordless telephone scheme is used.

Cordless telephones are long known as means to eliminate the telephone cord. A cordless telephone is basically a combination of a telephone and radio transmitter/receiver, and has two major parts: a base unit and a handset. The base is connected to the phone jack and to a power jack, and converts the telephone signals to radio frequency signals. The handset converts the radio frequency signals to audio signals. The radio frequency used may be 27, 43-50, 900, 2400 or 5800 MHz, and the communication may use Digital Spread Spectrum (DSS) scheme.

Figure 8A:
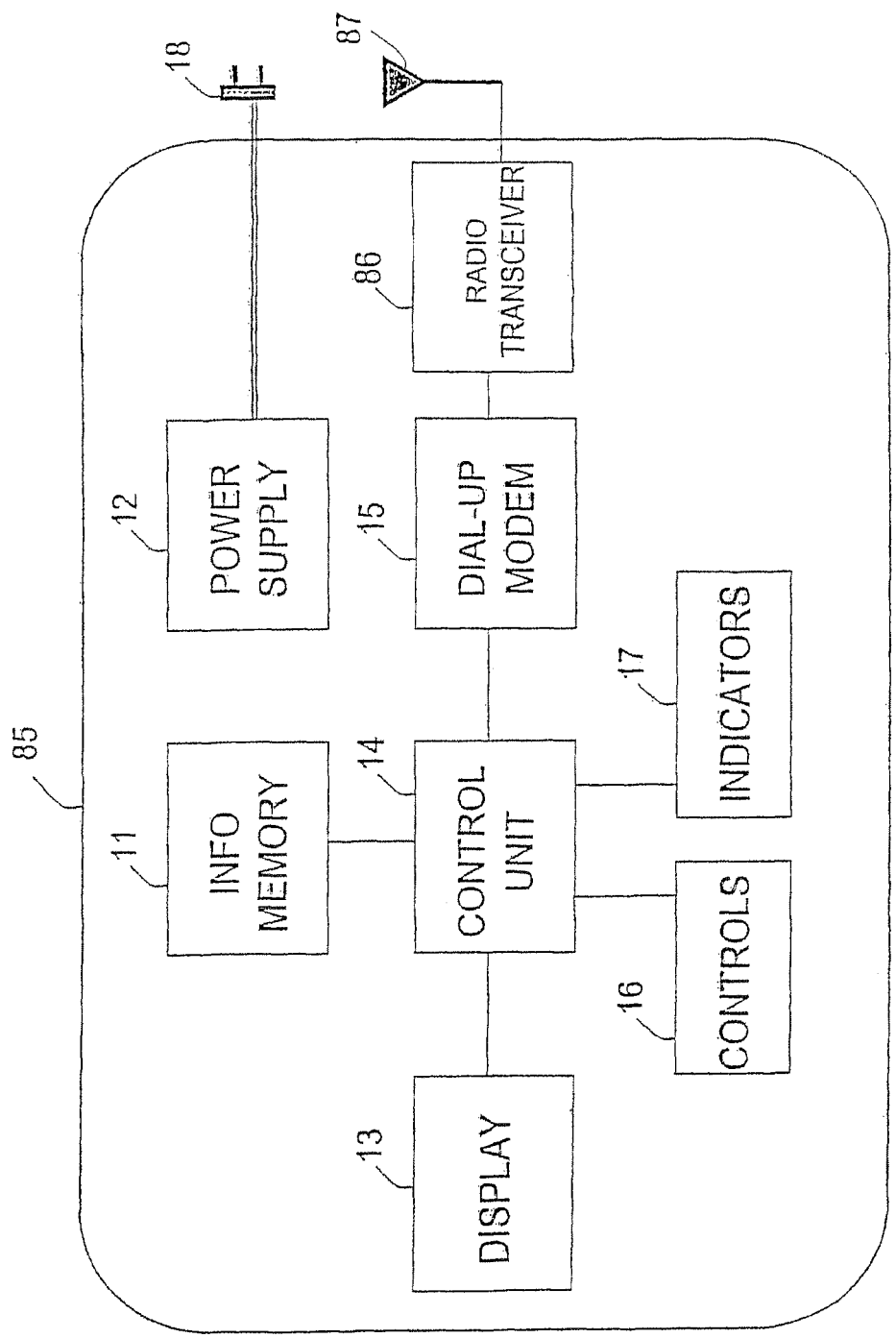
FIG. 8a shows a functional block diagram of exemplary information device according to the present invention.

In one or more embodiments, an ordinary cordless base unit is used. Part of the handset functionality is integrated into the information device 10. In such a configuration, the dial up modem 15 communicates cordlessly with the base unit, eliminating the need for a connecting cable. Such information device 85 is shown in FIG. 8a. The dial-up modem 15 is coupled to a radio transceiver 86, cordlessly communicating with the base unit (not shown) via antenna 87. In addition to the full duplex audio/telephony carried between the device 85 and the base unit, various control signals such as on-hook, off-hook, ring, dial-tone, busy tones and other telephony related signals are communicated as known in the art. In such a way, the same functionality of corded coupling is obtained, yet without using any cable.

Figure 8B:
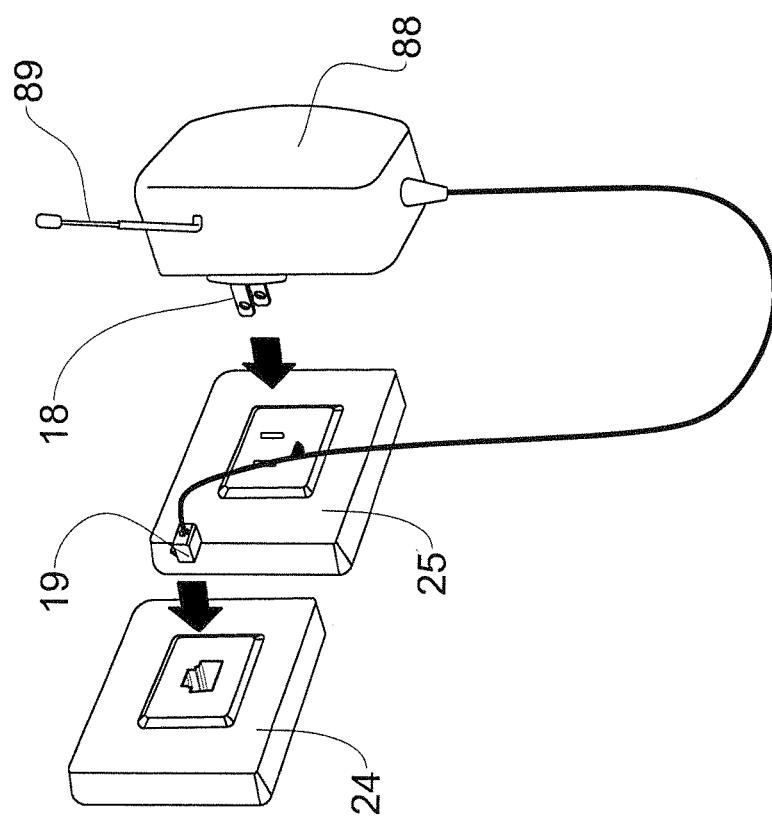
FIG. 8b shows a pictorial view of an exemplary cordless base unit according to the present invention.
Figure 8C:
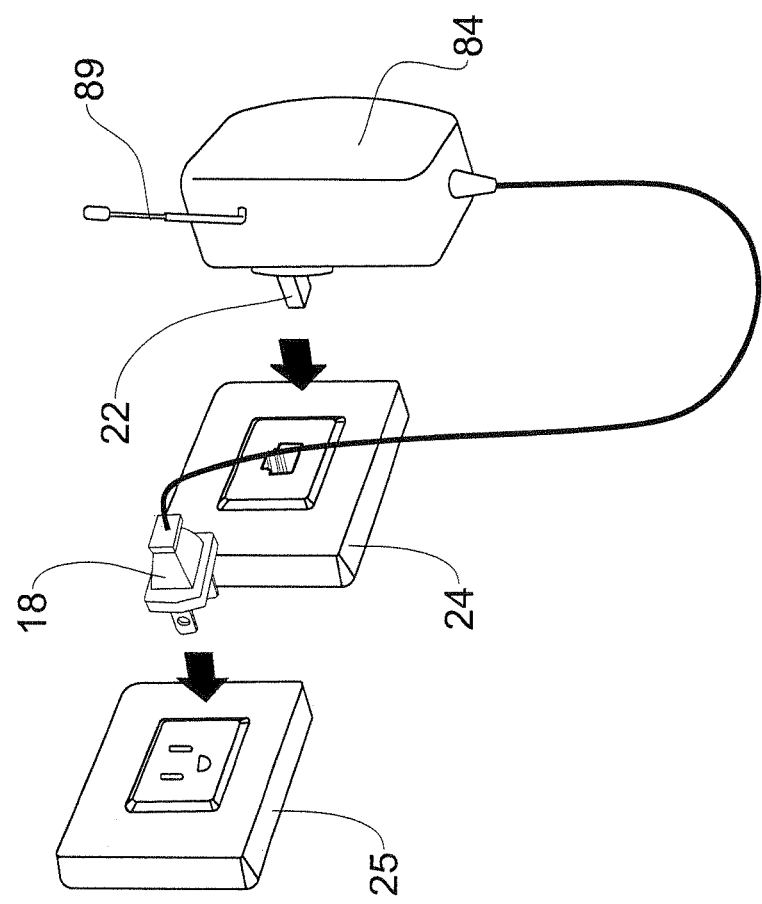
FIG. 8c shows a pictorial view of an exemplary cordless base unit according to the present invention.

Cordless telephone set base units commonly employ, in addition to the radio transceiver and the telephony associated functionalities, a charger which is used to charge a rechargeable battery within the handset. Since in most cases there may not be a direct contact between the base unit and the information device 85, such charger is not required. As such, a dedicated base unit may be used, pictorially shown in FIG. 8b. The base unit 88 is shaped as a power outlet plug-in unit, plugged into a power outlet 25 using the power prongs 18. The base unit 88 connects to the telephone outlet 24 via a cable and telephone connector 22, and communicates wirelessly with the information device 85 via antenna 88. Similarly, the base unit may be shaped as telephone plug-in unit 84 as shown in FIG. 8c.

While the above cordless related apparatus and method have been so far described with respect to information device 10, it will be appreciated that such cordless apparatuses and methods are applicable to other types of devices, including any devices which automatically or periodically communicate with a remote location.

Powering.

While the invention has been described wherein the information device is being AC powered, in one or more embodiments the information device 10 is powered by batteries.

Other embodiments may involve extracting power from the telephone line. In most cases, only limited power may be extracted from a telephone line in an on-hook state, since the current flow is also used an off-hook indication. Such limitation is imposed by the FCC in the USA. However, in the case of a very low power consumption implementation of the information device 10, the allowed power may suffice for its operation. Much higher power consumption from a telephone connection may be obtained during off-hook state. Hence, the device 10 may extract power during its communication session or when other devices connected to the same telephone line switch into off-hook state, as detected by the off-hook detector 71 or any other means.

Figure 9:
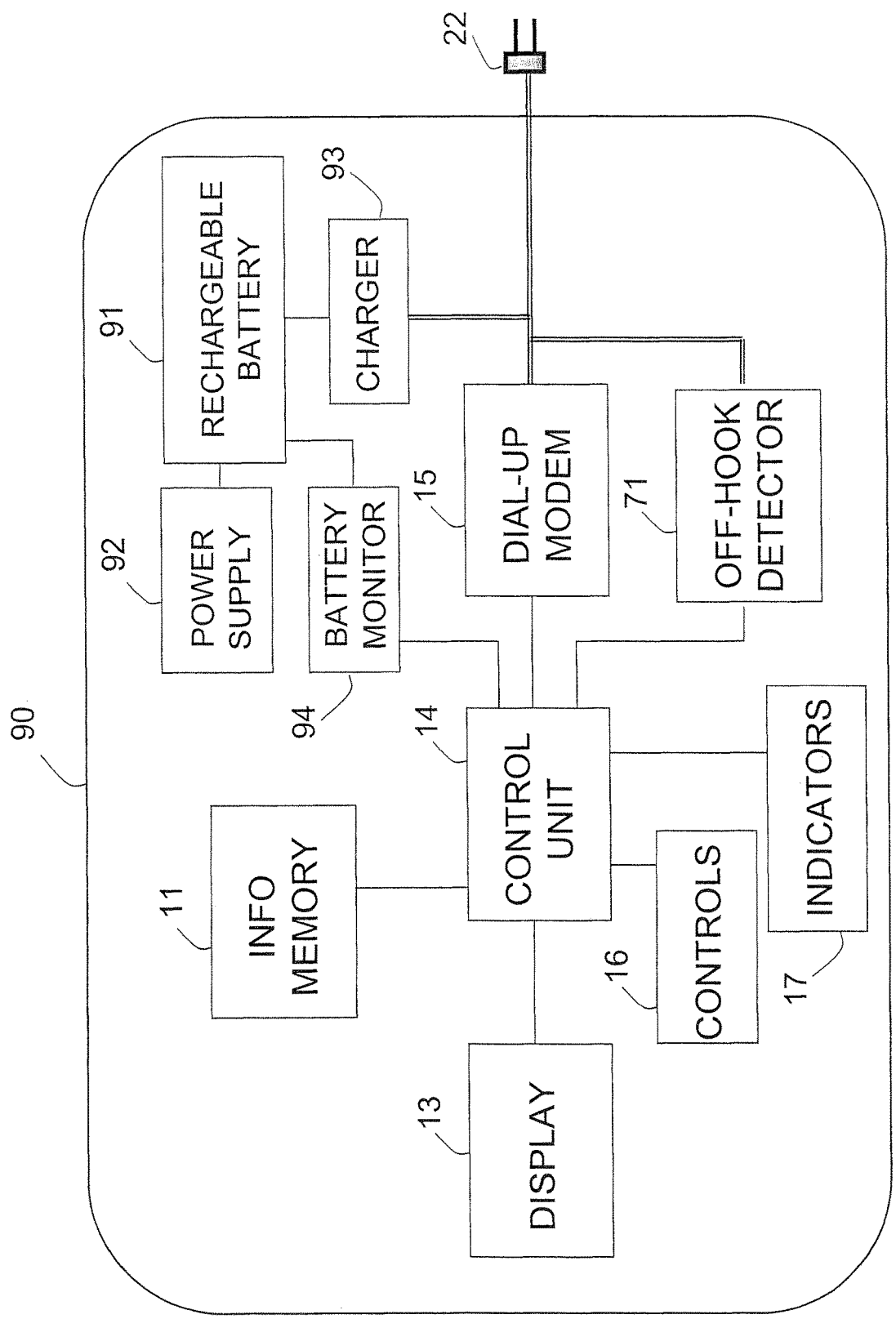
FIG. 9 shows a functional block diagram of exemplary information device according to the present invention.

It should be understood that any combination of the above powering schemes may be used. In one or more embodiments, a combination of off-hook power extraction and rechargeable batteries is used, as shown as device 90 in FIG. 9. The information device 90 connects solely to the telephone connection via telephone connector 22, obviating the need for AC power connection 18. During off-hook state, a charger 93 (connected to the telephone connection) is operated to extract power from the telephone line and charge rechargeable battery 91. The battery 91 in turn feeds a power supply 92 which in turn feeds all power consuming components of the device 90. Whenever off-hook state is detected by detector 71, either initiated by the device 90 itself or by any other device connected to the same telephone connection, and as long as the battery 91 is not fully charged, power is consumed to charge the battery 91.

In order not to allow the battery stored energy to be reduced below the level enabling proper operation of the device 90, a battery energy monitor 94 may be used. The monitor 94 detects low energy level in the battery 91, and signals the control unit 14 accordingly. Upon detection that the stored power is lower than a predefined threshold, the device initiates an off-hook state in order to consume power to charge the battery. Upon the predefined energy level being restored, the device disconnects itself and resumes on-hook state. These 'dial for power' powering cycles preferably coincides with the communication sessions described above. However, some embodiments may require more powering cycles than information ones, or vice versa.

It should be understood that such the above powering mechanisms may be used in any appliance having a telephone connection, and are not limited to the information device 90 described above. Furthermore, any combination of the above powering schemes may be used.

While the above powering related apparatus and method have been so far described with respect to information device 10, it will be appreciated that such powering apparatuses and methods are applicable to other types of devices, including any devices which automatically or periodically communicate with a remote location.

Appliance Integration.

Figure 10:
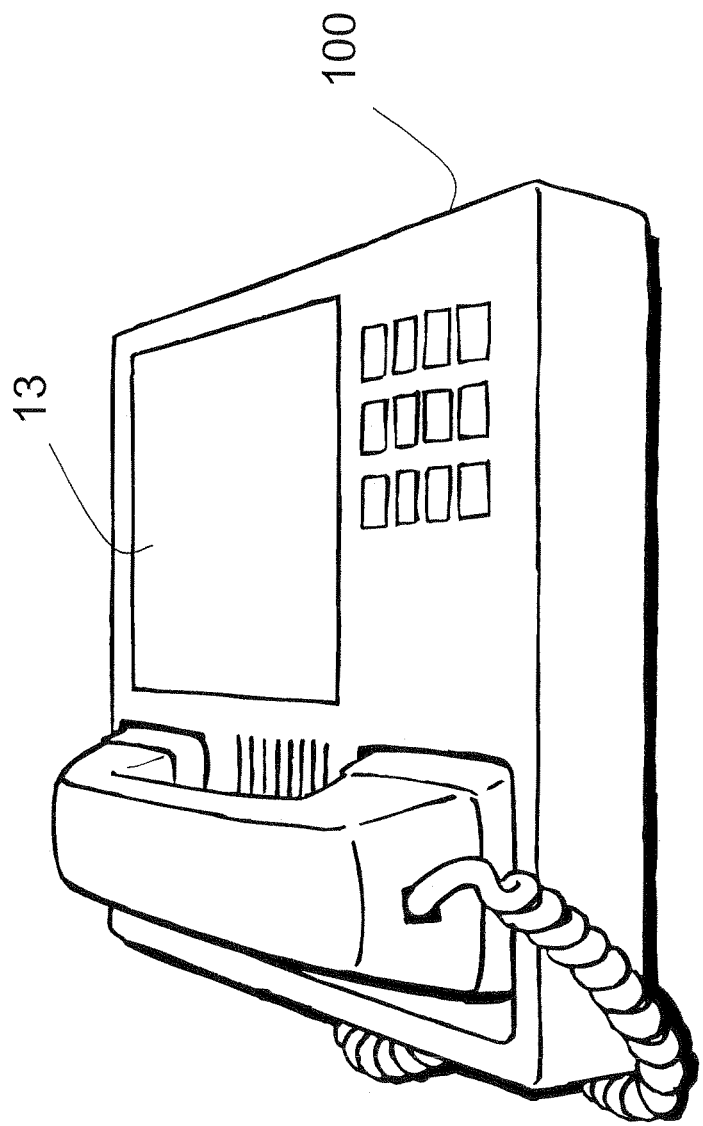
FIG. 10 shows a pictorial view of an exemplary telephone set integrated information device according to the present invention.

While the information device 10 has been described above as a stand-alone self-contained dedicated appliance, it will readily be understood that the device may be integrated with various other appliances. In one exemplary embodiment shown in FIG. 10, the device is integrated into the housing of a telephone device 100. Display 13 of the device 10 is shown. Similarly, the information device 10 may be integrated into any appliance, and preferably into devices which also require telephone connection such as fax, answering machine and personal computer with dial-up modem, as well as ADSL modem and Residential Gateway known in the art.

Several levels of integration with appliances may be implemented:
 a. Mechanical integration. This type of basic level of integration involves the housing of the device 10 and the appliance in a single physical packaging, and sharing the same telephone connection (if also required by the appliance). No additional components or functionality are involved.
 b. HMI (Human Machine Interface) sharing. In these embodiments various HMI components are shared and are used by both the device 10 and the other appliance. For example, the device 100 shown in FIG. 10 may share the screen 13 for displaying both device-related information and telephone-related information (such as Caller-ID telephone number). Similarly, telephone numbers buttons may be doubly used as controls 16, and dual-function visual indicators may also be used.
 c. Information sharing. This configuration involves interface between the device 10 and the appliance allowing for sharing at least part of the available information. For example, the device 10 housed within the device 100 may download telephone numbers, which are programmed into speed dialing within the telephone set.
 d. Full integration. In these embodiments various components are used for both functions. For example, a processing unit within an appliance may also implement the control unit 14 functionalities. In such a case, all or part of the above integration levels are also implemented.

Display Appliance Integration.

Figure 11:
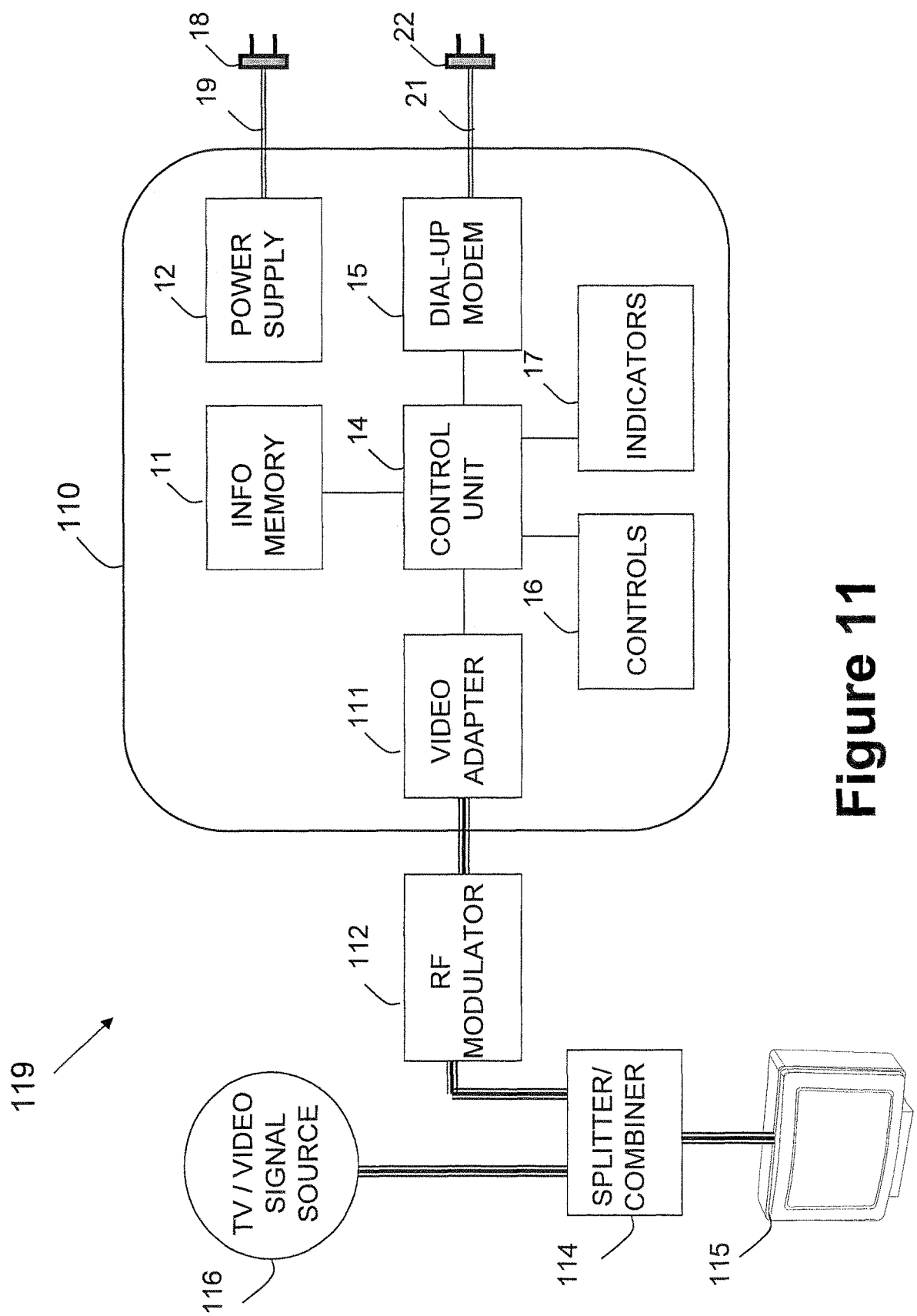
FIG. 11 shows a functional block diagram of exemplary information device using television set as a display according to the present invention.

In other embodiments, the device 10 uses other appliances display, preferably existing ones. Such configuration can reduce the cost, complexity and space requirements of a device 10. Common existing displays within premises include a personal computer screen and television sets. An exemplary embodiment of the latter case is described in FIG. 11. The information device 110 shown in the figure does not comprise any display means 13, but rather only employ a video adapter 111, connectable to any external video monitor. Such device 110 may be used with a dedicated external video monitor. Another embodiment using existing television set is shown as system 119 in FIG. 11. The video output of device 110 is connected to an RF modulator 112 producing a video signal carried over a television channel. The signal is multiplexed with the existing TV signal by a splitter/combiner 114, whereby the multiplexed signal is fed to the television set 115. The information received by the information device 110 may then be shown on one of the television channels. System 119 may be fed from any TV signal source 116, which may be a set top box connected to a CATV or satellite network, or local video source such as VCR and DVD players.

Information Personalization.

The information downloaded by an information device 10 can be general and identical to all information devices 10 connected to a provider. Alternatively, the information can be 'personalized': different information being tailored for the requirements of each user. For example, a user may be interested in the weather forecast in his local neighborhood, rather than nation-wide general weather forecast.

In order to support the providing of personalized information, the information server 32 needs to identify the calling device 10 and to accordingly provide the relevant information. An information device 10 may be individually identified or as part of a group, all group members requiring the same information type. Identification of a calling information device 10 (either as individual or as a group member) may be communication related, such as:
 a. Using Caller-ID: The user is identified by her calling telephone number using Caller-ID feature. For example, by identifying the caller telephone number, the provider can associate a relevant geographical location (e.g. zip code info), and provide weather forecast specifically for that location.
 b. Time of dialing in: Each group (or individual) is assigned a specific time for dialing in. Hence, by noting the calling time the provider can associate and identify the caller or its group. For example, all users calling between 2.00 AM and 2.10 AM are all located in a specific geographical region, hence the relevant weather forecast for that location will be provided.
 c. Telephone number dialed: The provider uses a plurality of telephone numbers, wherein the information is dependent upon the telephone number called. For example, telephone number XXX-XXX-XX01 will relate to a specific region or county, and number XXX-XXX-XX02 to another defined geographical region.

In communication related identification, all the information devices 10 are identical to each other, thus easy to manufacture and handle.

In alternative embodiments, the information 10 device transmits its identification as part of the communication session, during the start session step 64. The identification may consist of:
 a. A unique identification code ('address'), associated with a single information device 10. Such mechanism may be based on the popular and standard IP/Ethernet MAC/IP address structure, or may be of a proprietary nature. Similarly, a user name, password and other personalization techniques known in the art may be used.
 b. A code identifying the type of information requested. In this configuration, the information device 10 transmits a code that identifies the required info rather than the individual user. For example, a device 10 may request the info about the weather in a specific location, and the results of a specific sport event.

In both cases, each information device 10 may be different from other ones, having a specific identification value (or values). Furthermore, multiple communication sessions and the information types obtained may be different for the same device 10 during different sessions based on parameters or values. Such values (or parameters) may be assigned to the device by any of the following:
 a. Production set. In this configuration, the identification value is set during production and cannot be modified later.
 b. User set. In this scenario the user may change the identification value. Such programming may use the device controls 16 or a dedicated setting interface (not shown).
 c. Provider set. In this case the provider may, during communication session, access and modify the identification value.

The above identification mechanism may also serve for authorization and billing purposes. After the above values or parameters are set, all following communication sessions will use the set parameters/values.

Community Application.

While personalization has been described above relating to a single user/information device, the same may be applied to a group of users/information devices. Such community may all be personalized for a specific type of information, either exclusively or in addition to another information (which may also be individually personalized or not). For example, all students in a school may subscribe to school-related information such as no-school announcements. Similarly, a municipality may broadcast emergency information to all its residents. In addition to geographically grouping, interest-based groups may be formed, allowing all group members to obtain the same information simultaneously.

While the personalization related apparatus and method has been so far described with respect to information device 10, it will be appreciated that such apparatuses and methods are applicable to other types of devices, including any devices which automatically or periodically communicate with a remote location.

Cellular Connection.

While the invention has been so far described with respect to wired telephone connection, it should be understood that the invention can be equally applied to any other telephone connection, including non-wired based telephone service such as cellular telephony.

Figure 12:
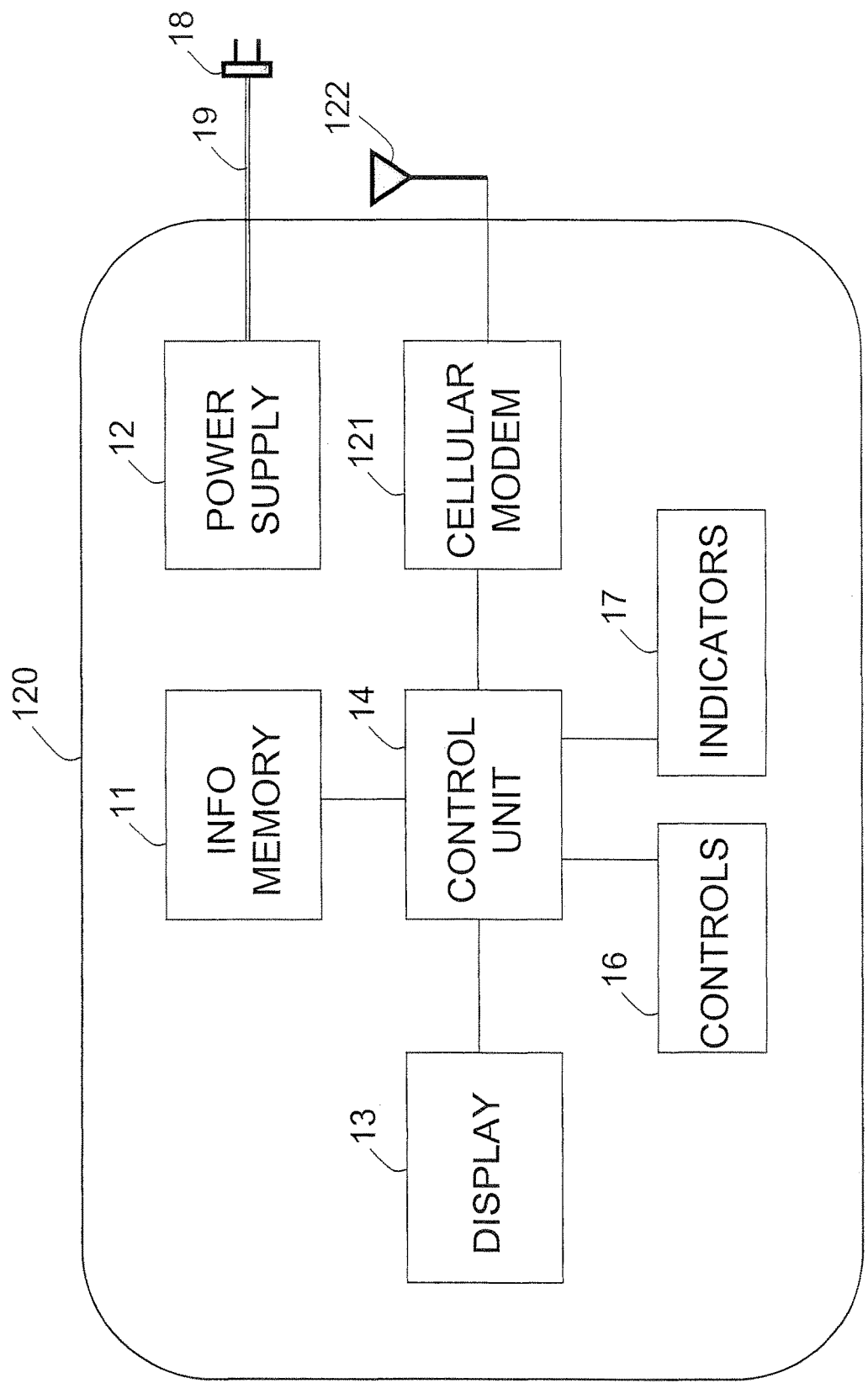
FIG. 12 shows a functional block diagram of exemplary information device according to the present invention.

Information device 120 modified to use a cellular telephone service rather than wired telephony is shown in FIG. 12. The dial up modem 15 (together with the wired connection cable 21 and connector 22) are eliminated and substituted with a cellular modem 121, connected to a cellular antenna 122. In such a configuration, the information device 120 uses the cellular medium to communication with the information provider.

Figure 13:
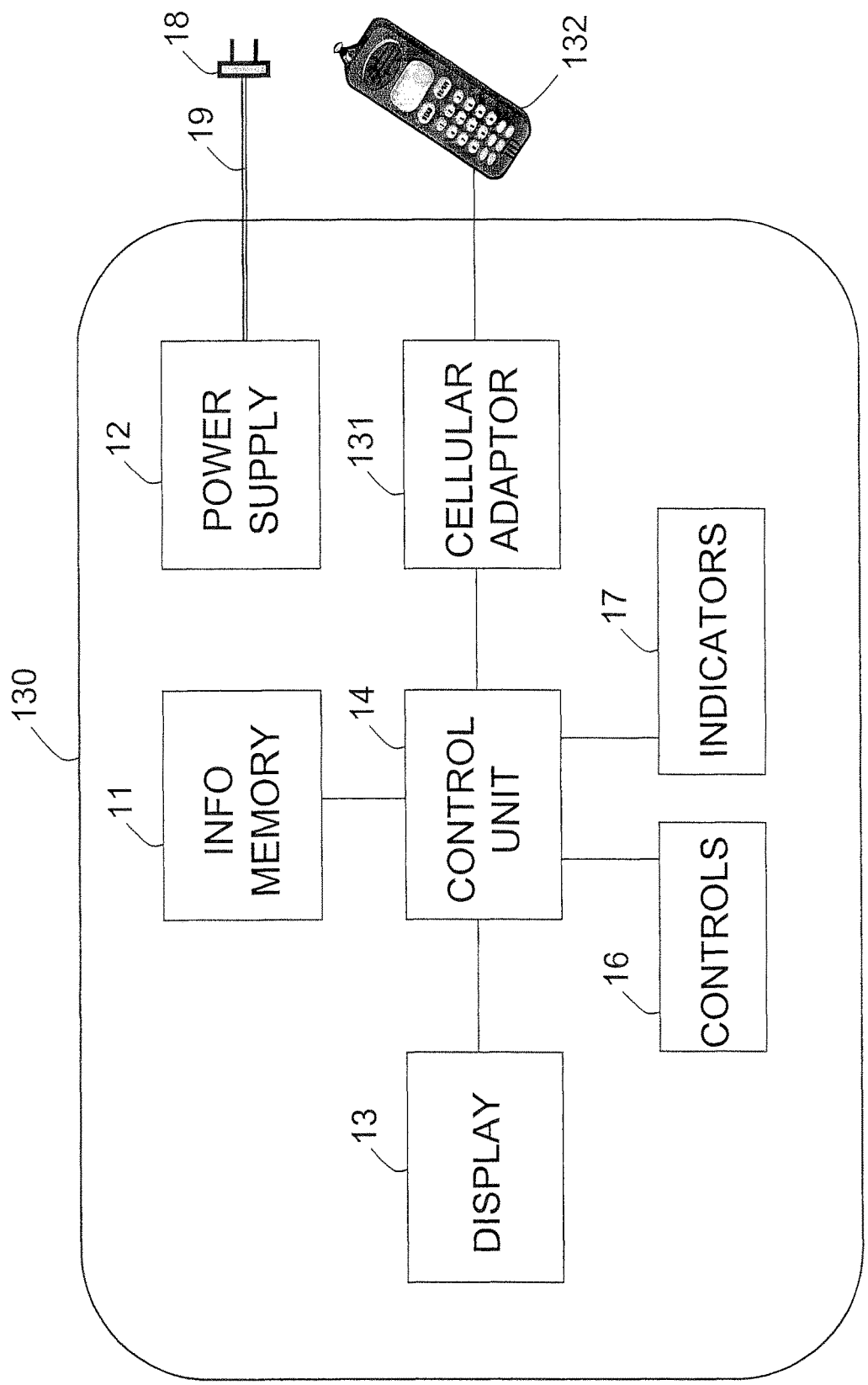
FIG. 13 shows a functional block diagram of exemplary information device according to the present invention.

FIG. 13 shows another embodiment where, instead of a dedicated cellular modem 121 and antenna 122, a cellular telephone set 132 is used as the communication means. While the mechanical and electrical connections to the telephone set 132 may be fixed, this limits the usage of the telephone set 132 as a mobile device. In a one preferred embodiment, the cellular telephone set 132 is detachable from the device 130. Cellular adaptor 131 is used to electrically mediate between the device 130 and the cellular telephone 132. This mediation can make use of known implementations commonly used for telephone cradles and 'hands-free' systems.

Figure 14:
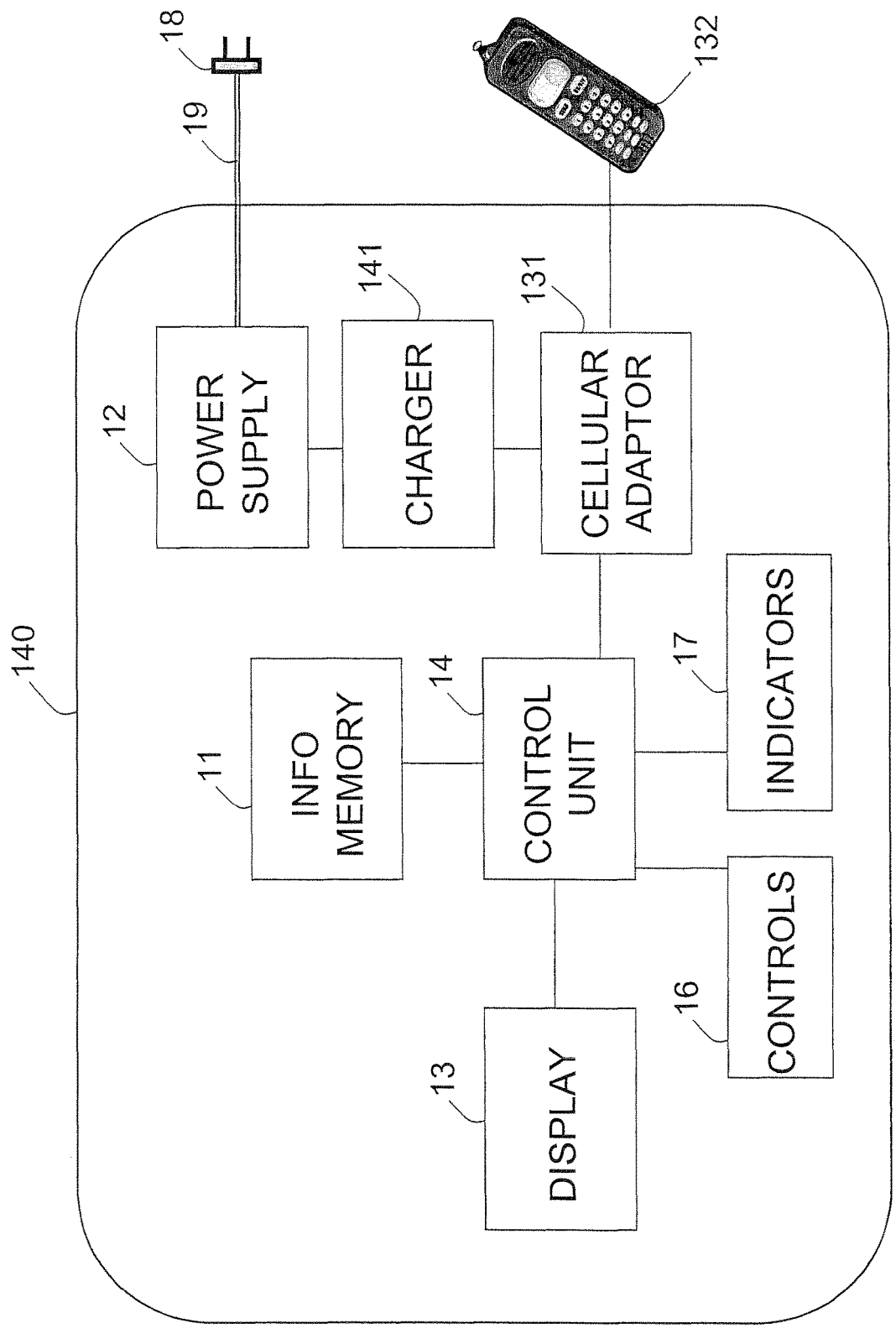
FIG. 14 shows a functional block diagram of exemplary information device according to the present invention.
Figure 15:
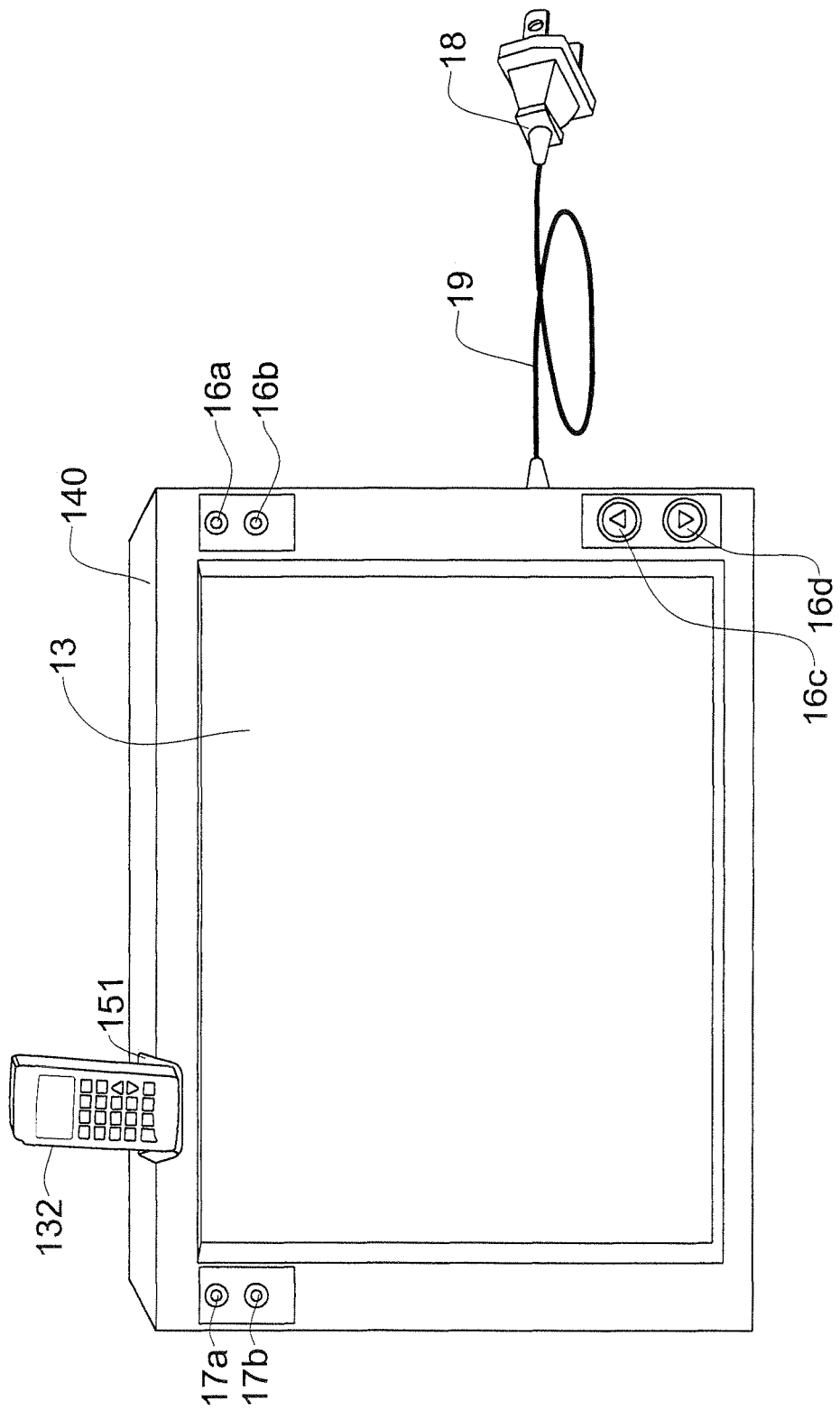
FIG. 15 shows a pictorial view of an exemplary cellular telephone set attachable information device according to the present invention.

In the case wherein a cellular telephone set 132 is used as the communication means, and assuming this is the sole communication means, the information device 130 may be required to operate only upon attaching the cellular telephone set 132 thereto. Since cellular telephone sets 132 commonly require periodic charging time, the device 130 may be modified to comprise such a charger. In such configuration, attaching a cellular telephone set 132 to an information device supports two functions: charging and communication. Such a device 140 is shown in FIG. 14. The power supply 13 feeds a charger 141, connected to the cellular telephone 132 via the adaptor 131. An exemplary pictorial view is shown in FIG. 15. Mechanical adaptor 152 is shown, enabling attaching and detaching the cellular telephone set 132 to the information device 140. Upon attaching the telephone set 132, the telephone is charged and may be also used by the device 140 for communication purposes.

In one or more embodiments, the information device 120 is partially or fully integrated with the cellular telephone set 132. All the functions of the device 120 are available in a cellular telephone set 132. The number keys and other function buttons can also serve as controls 16, and existing visual indicators may doubly function as indicators 17. Since commonly cellular telephone set 132 comprises at least small alphanumeric screen for displaying the dialed number, this screen can doubly function as display means 13. Similarly, the microcontroller controlling the telephone set 132 functions can double to perform the control unit 14. As such, adding the information device 120 functionality to an existing design of a telephone set 132 may only require software update in order to execute at least part of flow chart 60.

Figure 15A:
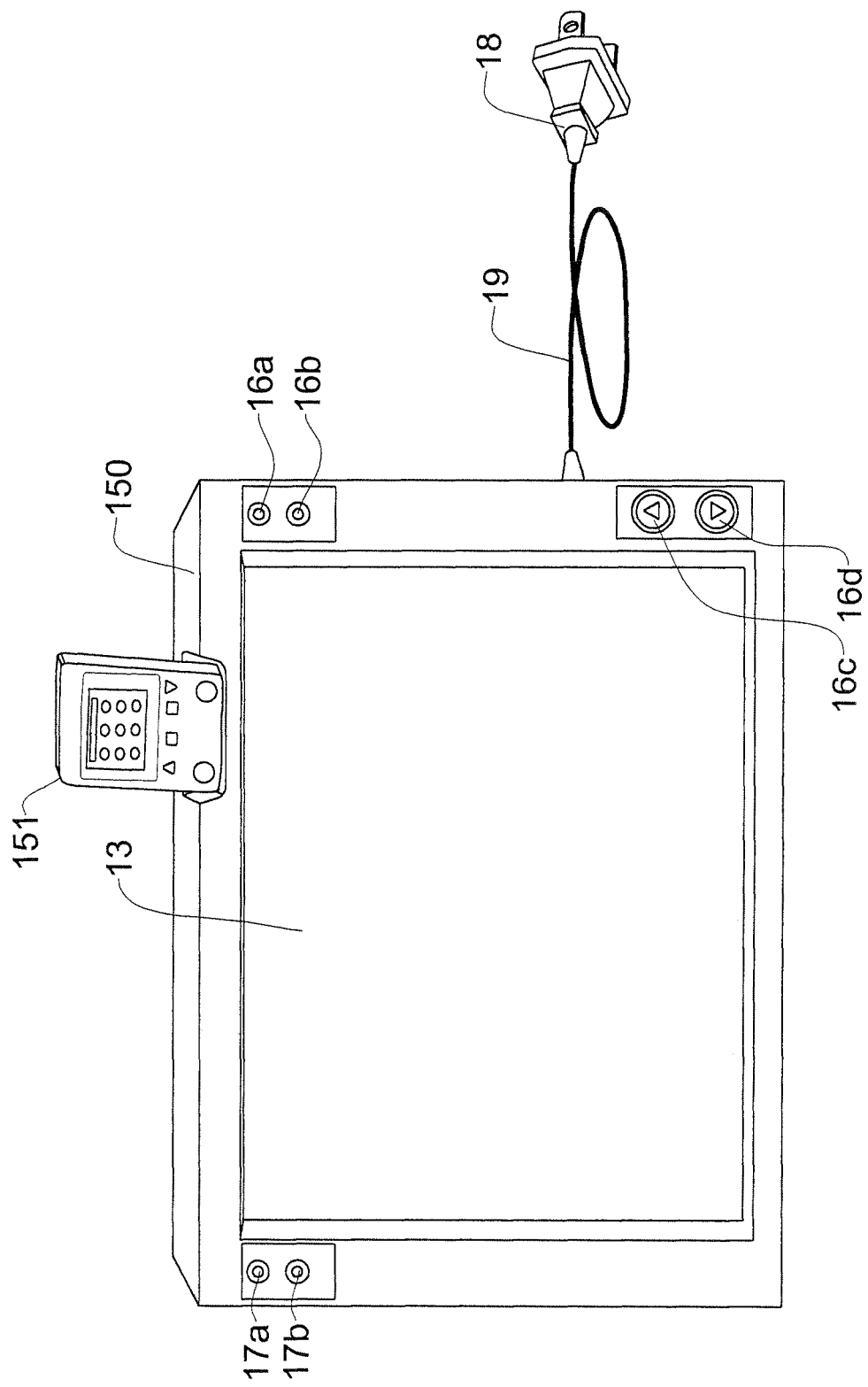
FIG. 15a shows a pictorial view of an exemplary PDA attachable information device according to the present invention.
Figure 15B:
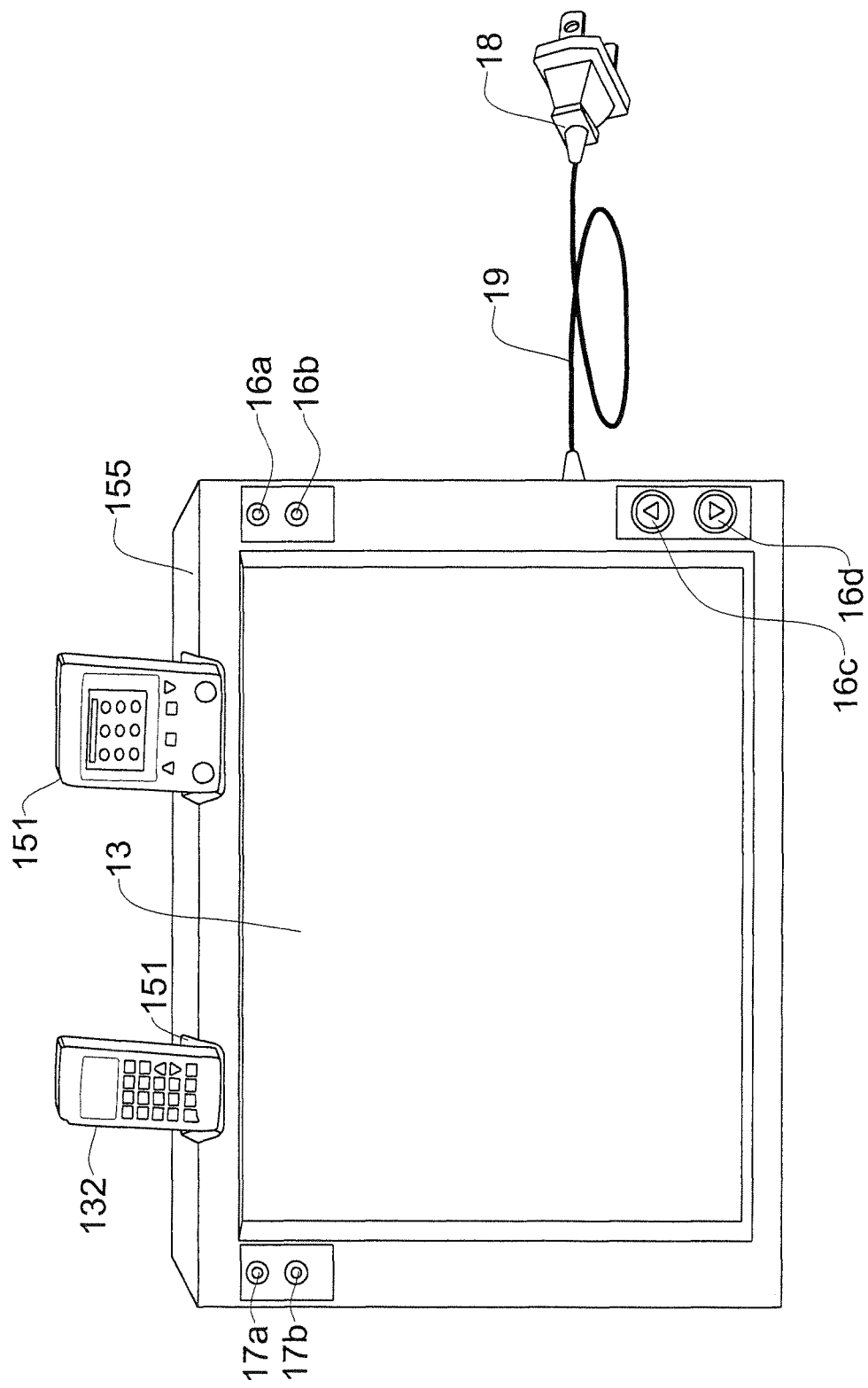
FIG. 15b shows a pictorial view of an exemplary PDA and cellular telephone set attachable information device according to the present invention.

While the invention has been described above with respect to cellular telephone set, it will be appreciated that PDA (Personal Digital Assistant) may be equally used. Such a device 150 is shown in FIG. 15a, involving PDA 151. In one or more embodiments, the PDA charger is included in the device 150. In one or more embodiments, the PDA 151 is used as communication means, utilizing its built-in communication means (e.g. cellular modem, wireless modem or wired network connection). In one or more embodiments, the PDA 151 doubles to implement part or all of the information device 10 functionalities. Similarly, other devices may be employed with the information device 10. Furthermore, multiple devices may be employed either independently or in combination, as shown in FIG. 15b describing an information device 155 and both a PDA 151 and cellular telephone set 132.

Broadband Connection: ADSL.

While the invention has been so far described with respect to cases wherein the connection to the information provider uses dial-up or cellular telephony, it will be appreciated that any connection may be used, either narrow- or broadband, and being either wired-based or wireless. One common telephone-line based broadband connection uses xDSL (Digital Subscriber Line) technology. ADSL (Asymmetric DSL) is popular for residential and office connections. Other versions include VDSL (Very high speed DSL), RADSL (Rate Adaptive DSL), HDSL (High speed DSL) and others. While ADSL will be discussed hereinafter, any other xDSL may as well be used.

Figure 16:
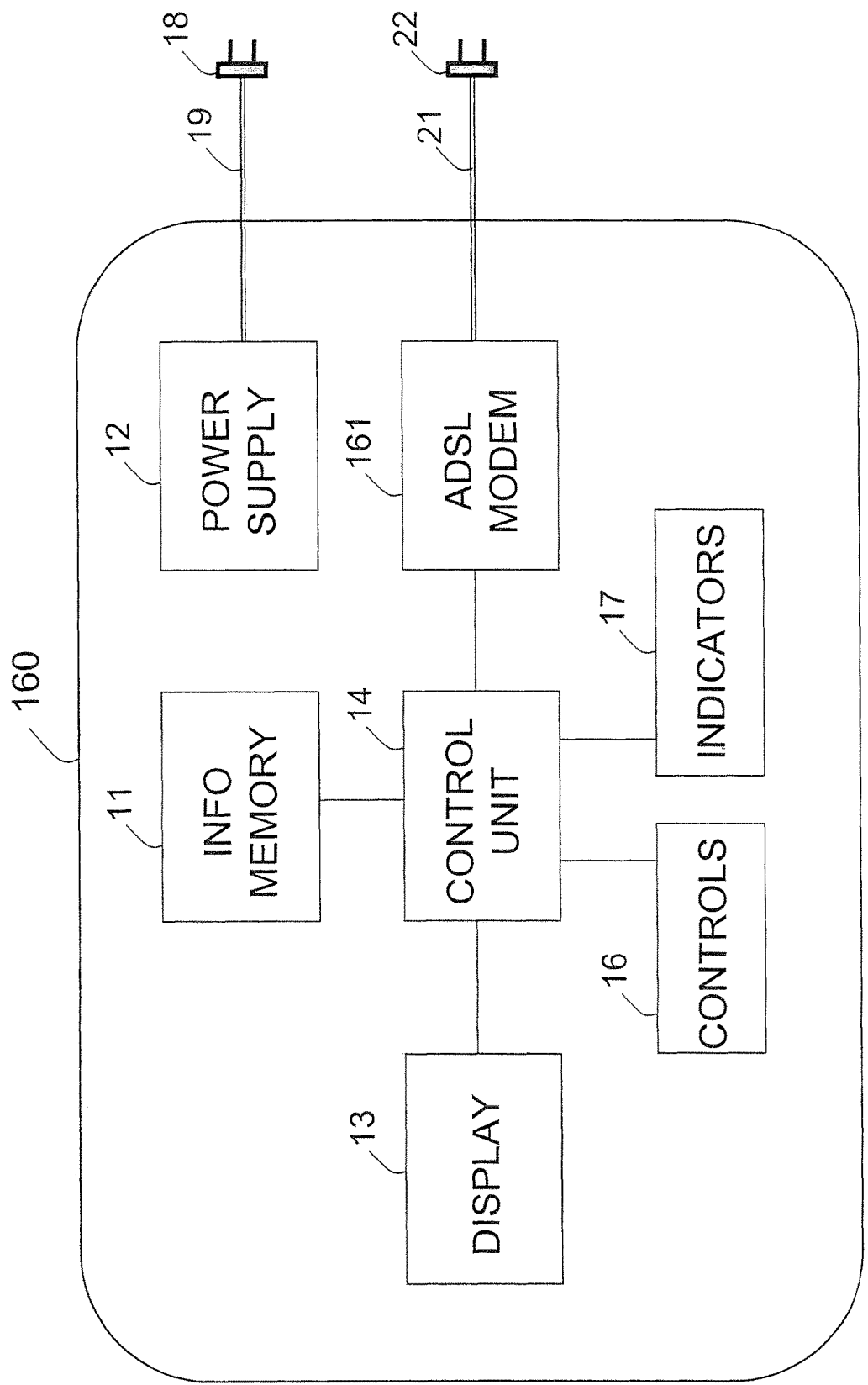
FIG. 16 shows a functional block diagram of exemplary information device according to the present invention.

An information device 160 comprising an ADSL modem 161 is shown in FIG. 16. The ADSL modem 161 substitutes the dial-up modem 15 described above, still connecting via a telephone connection. In one or more embodiments, the information device 160 periodically initiates physical layer ADSL connection, and disconnect the connection upon session completion. Such implementation requires a 'start up' period for modem training in the beginning of each such session. However, multiple ADSL modems may connect to a single telephone connection one at a time. Alternative embodiments use the 'always on' feature of the ADSL connection, wherein the physical layer ADSL connection is always on, but higher layers remain inoperative until being 'logged on' by the connected device. In this case, there is no need for any 'start up' period, but no other ADSL modem can concurrently use the telephone connection.

Similar to the above description, the information device can be integrated with any other device having ADSL modem such as stand-alone dedicated ADSL modem, Residential Gateway and so forth.

Broadband Connection: CATV.

Figure 17:
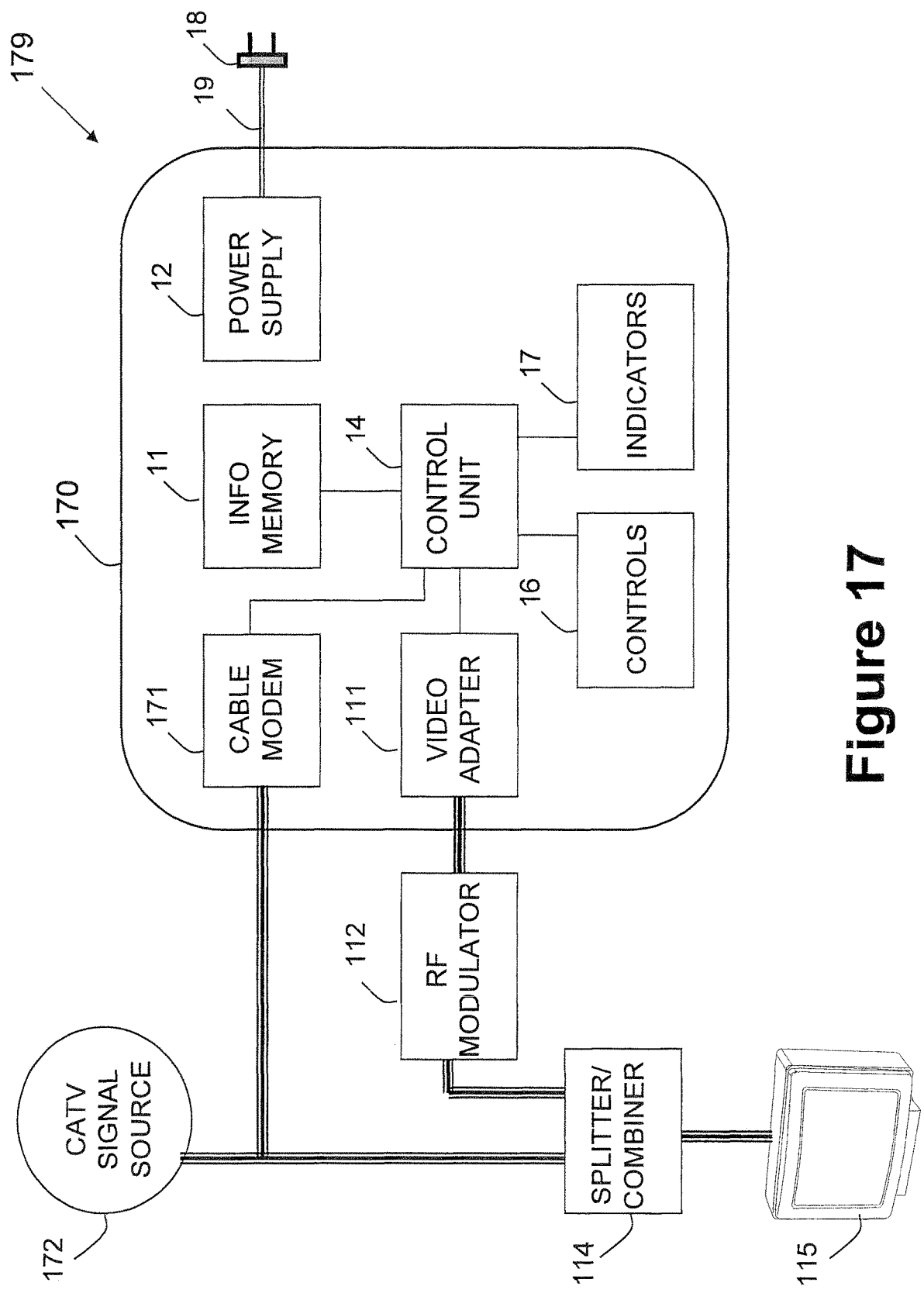
FIG. 17 shows a functional block diagram of exemplary information device using television set as a display according to the present invention.

Another popular broadband connection is based on the CATV (Cable Television) cabling, dedicating part of the carried spectrum to data networking in addition to the video channels. Most available systems are based on Cable-Labs™DOCSIS standards. Information device 170 comprising a cable modem 171 is shown in FIG. 17. The device 170 shown comprises video adapter 111 for connecting to an external video display. However, built in display means 13 may alternatively be used. The cable modem 171 typically connects to a CATV outlet for connecting to the CATV in-building wiring, connected in turn to external CATV signal source 172, for coupling to the data channel carried over the CATV wiring.

FIG. 17 further illustrates a system 179, wherein the television set is used for both displaying the video channels carried as part of the CATV network, and as a display means of the information received by the information device 170. The splitter/combiner 114 combines the video signal from the information device 170 modulated by the RF modulator 112 with the CATV video channels enabling displaying of all channels in the television set 115 (it is assumed that the television set is 'Cable Ready' and there is no need for converter or set top box). The various components shown, such as the information device 170, the RF modulator 112 and the splitter/combiner 114 may be in full or in part integrated into television set, to a set top box or to a stand alone cable modem.

While the invention has been so far described with respect to modem embedded within the information device 10 which connects directly to the remote server 32, it will be appreciated that such external connection (either narrow or broadband, Local- or Wide area network) may be shared with other networked appliances over a home network. As known in the art, in such a configuration a single device, commonly known as Residential Gateway connects to the external connection, whereby multiple in-home appliances share this external pipe by means of an in-home network. Home networks may use dedicated wiring commonly known as 'structured wiring' and employing Ethernet IEEE802.3 protocols. Other implementations involve wireless RF based network such as standardized in IEEE802.11x or BlueTooth. Other alternatives involve using existing wiring structure such as telephone wiring (e.g. HomePNA technology), powerlines (e.g. HomePlug) and CATV wiring. Adapting the information device 10 to support a home network basically requires substituting the dial-up modem 15 with a modem appropriate for the home network media, such as Ethernet transceiver for wired Ethernet network, IEEE802.11x wireless transceiver or HomePlug compliant transceiver.

Provider Push.

Figure 18:
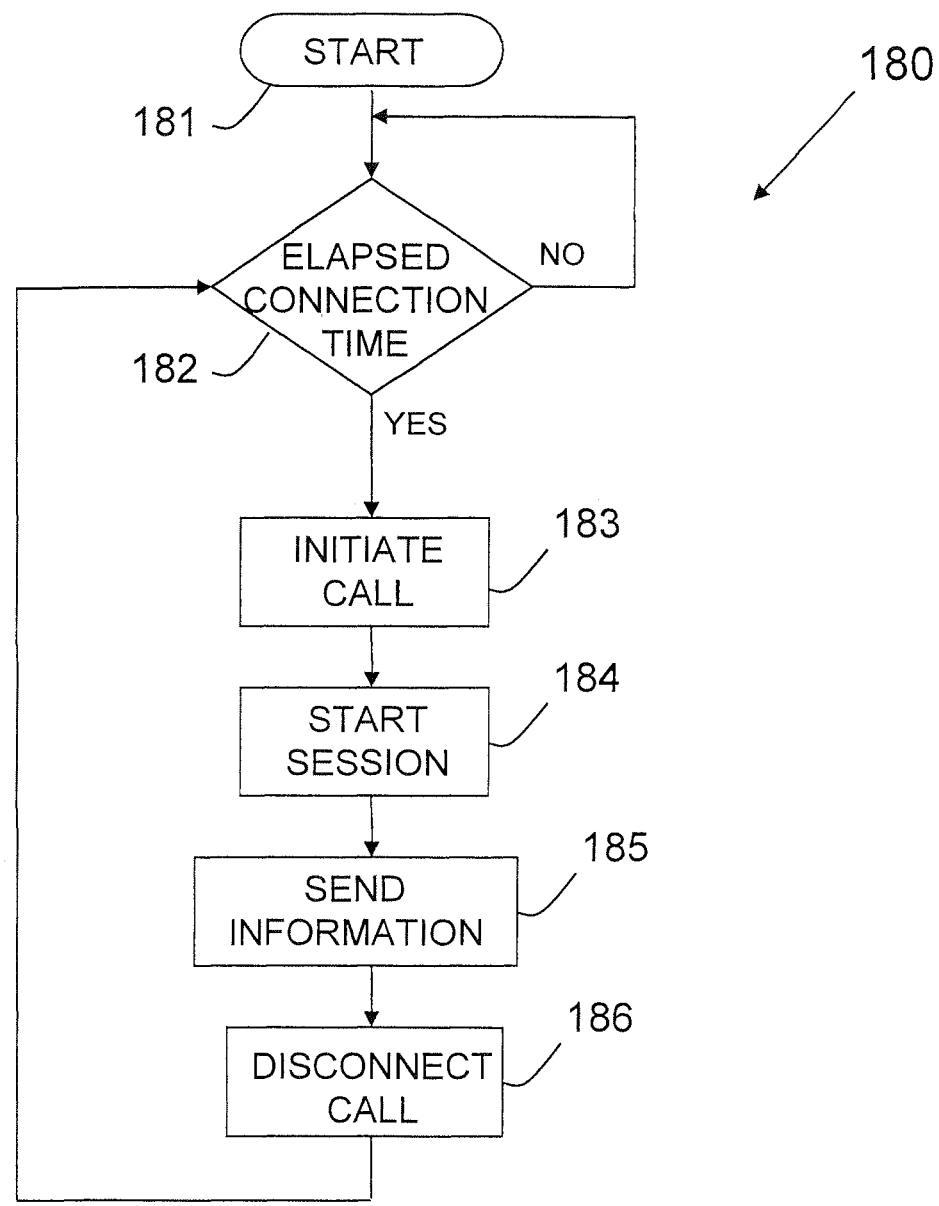
FIG. 18 shows an exemplary flow chart to be executed by the provider site according to the present invention.

While the invention has been so far described with respect to 'user pull', wherein the periodic communication session is initiated by the information device 10, it will be appreciated that the communication sessions can be equally initiated by the information provider ('provider push'). In such a case, the communication can be charged to the provider (being the call initiator) and not to the user. In one or more embodiments, the provider server 32*a* (together with the provider site dial-up modem 15*a*) executes the flow chart 180 shown in FIG. 18. After starting (e.g. power up or reset) step 181 the server 32*a* executes step 182 which results in waiting until expiry of the time to the next session schedule as explained above. Then the server initiates a call as part of the step 183, and starts the session in step 184. During the communication session the pre-defined information is transmitted (step 185) to the user information device 10. After the required information has been submitted, the server 32*a* disconnects and the communication session is terminated. This operational sequence is periodically repeated as explained above.

Figure 19:
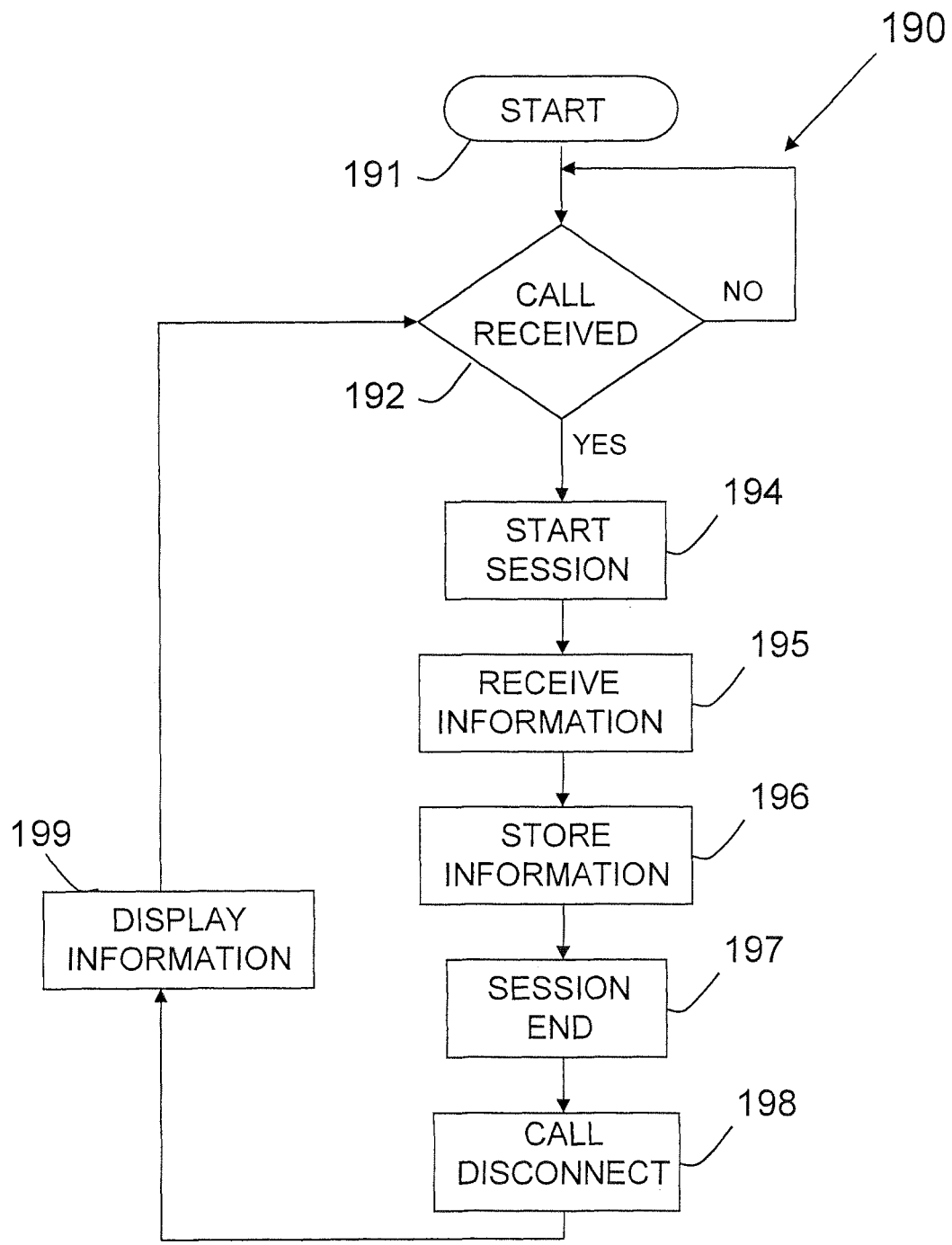
FIG. 19 shows an exemplary flow chart to be executed by an information device according to the present invention.

In the case of 'provider push' the operational sequence executed by the information device 10 is similar to the 'user pull' sequence described above in flow chart 60 (shown in FIG. 6). The modified flow chart 190 is shown in FIG. 19. Rather than initiating a call, the device 10 waits until being called by the provider as shown in step 192. Session start 192, and receive information 195 respectively correlates with the provider states 184 start session 184 and send information 185. The received information is stored (step 196). Thereafter the communication session is ended 197 and the communication disconnected 198, as a response to provider disconnect call step 186. Then the information is displayed 199, and the device 10 rests until the next session initiation.

In the case wherein 'always on' broadband connection type is employed such as ADSL or cable modem, the provider can initiate the communication session by accessing the device 10 identification value, as discussed above. In the case wherein the Internet is used, the IP (Internet Protocol) address of the device 10 may be used to target the information to a specific device 10.

In the case wherein telephone connection (such as landline or cellular telephony) is used for linking the provider server 32*a* to a user information device 10, an inherent unique telephone number is assigned to each such connection: a telephone number for a cellular telephone set and a telephone number for each landline telephone connection. In such a case, the provider server 32*a* dials the telephone number assigned to the information device 10, using dial up modem 15*a*, in order to establish the communication link.

In the case the telephone connection is solely used by the information device 10, no other entities may respond to the provider dialing in signal. Such configuration may be expensive since the telephone connection costs are not shared. However, in the case wherein multiple appliances share the same connection, such as in a residence wherein multiple telephone sets (or answering or facsimile machines) are connected in parallel to the same telephone lines, calling in will possibly interfere with the normal operation. Furthermore, calling in will produce a disturbing telephone ringing. In a similar way, regular cellular telephony service may be disturbed.

In one or more embodiments, the information device 10 is caller-ID capable and can identify the calling provider telephone number (or numbers). The device 10 responds immediately to an incoming call only if the information provider call is identified, and is silent in all other calls. Hence, minimum intervention with the regular telephony (either landline or cellular) is obtained.

While the invention has been so far described with respect to exclusive 'user pull' or 'provider push', wherein in the former the user device 10 initiates the call and in the latter the provider server 32*a* initiates the call, it will be appreciated that any combination of both may also be considered. In one or more such embodiments, the user device 10 initiates the call and starts communication session. During the session, the server 32*a* identifies the device 10 calling number either automatically by Caller-ID or by the information sent to the server 32*a*. As a response, the server 32*a* initiates a call to this number (either immediately or after a pre-defined delay) and starts a session as described above. One advantage of such mechanism is that the longer session is billed to the provider (being the caller) and not to the user.

While the 'provider-push' apparatus and method has been so far described with respect to information device 10, it will be appreciated that such apparatuses and methods are applicable to other types of devices, including any devices which automatically or periodically communicate with a remote location.

Business Method.

Figure 20:
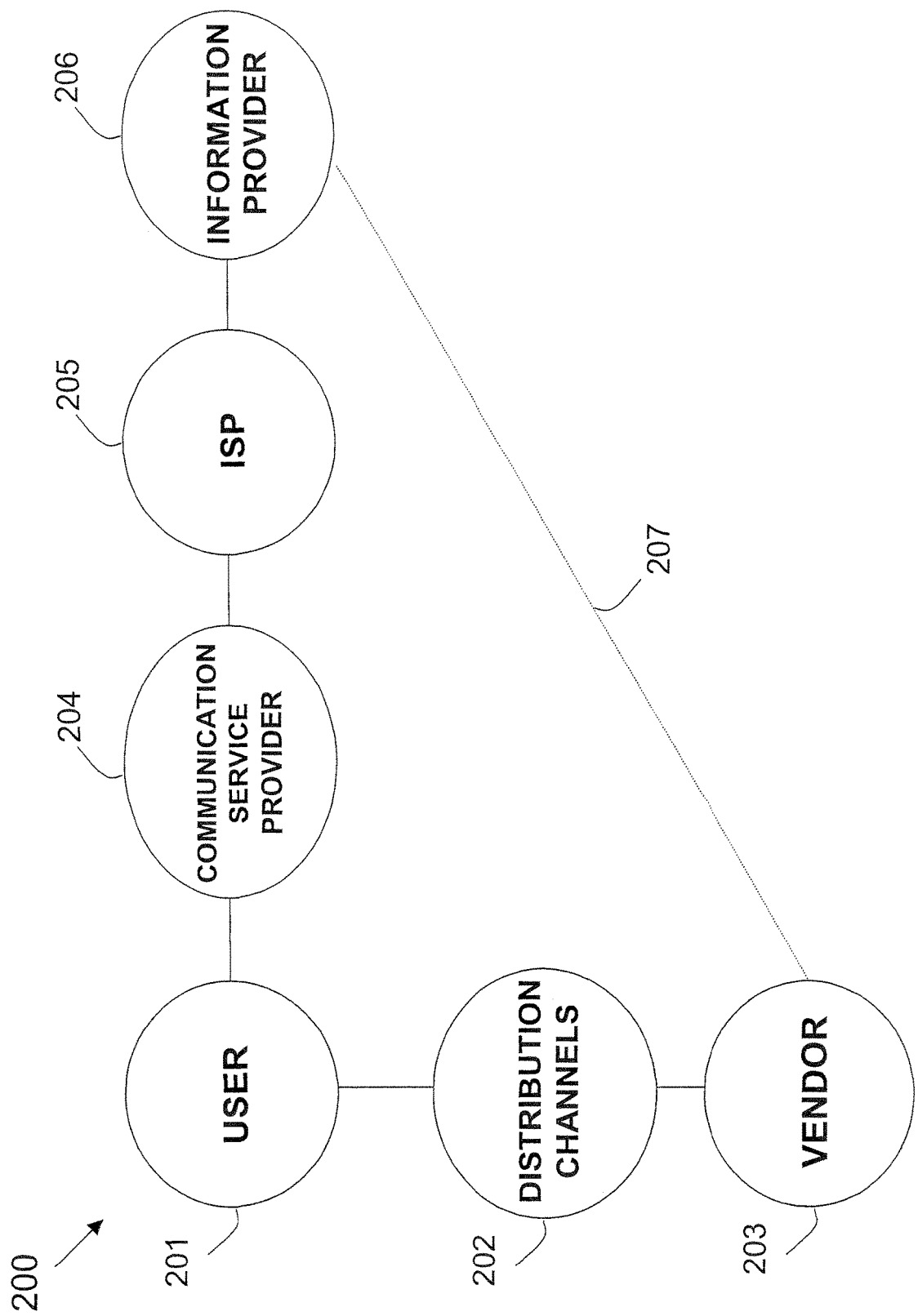
FIG. 20 shows a chart of exemplary business entities involved with the information device providing and operating according to the present invention.

The entities involved in the business aspects of the information device according to the invention are described in diagram 200 in FIG. 20. The vendor 203 provides the information device 10, and may be the actual manufacturer (either directly or via subcontracting) of the device. The user 201 may purchase the information device 10 through any distribution channels 202, such as wholesale or retail stores. However, the user may or may not be the owner of the device 10. However, the terms 'user' and 'owner' are used interchangeably hereinafter. Any distribution channel dealing with electronic or electrical appliances, in particular those channels involving distribution of communication equipment, may include the information device 10 as part of their product portfolio. Generally, any business model or method used to in distributing appliances may be used for the information device 10.

In the cases described below wherein the information device 10 is not self-contained dedicated device but rather is integrated with other appliances such as telephone set 100, cellular telephone set 132 or PDA, the same business channels and methods used for distributing the attached appliance may be used for the added information device 10 functionality, either for free (as improved appliance) or for increased price.

In order to allow for the communication session to take place, the information device 10 connects to the 'external' world by connection through a communication service provider 204. In the case of connecting using dial-up (or ISDN) modem as well as ADSL modem, the communication service provider is the local telephone company ('telco') owning the connecting telephone wiring. In the case of cellular modem, the cellular telephone company is the communication service provider 204. Similarly, the CATV provider is the communication service provider in the case of DOCSIS based cable modem. The information server 32, owned by the information provider 206, may be directly connected to (e.g. through the PSTN), such as described in configurations 30 and 50 above. In other embodiments, the Internet is used for communication between the information device 10 and the information server 32. In such a case, Information Service Provider (ISP) 206 is involved for connecting the user to the Internet.

In addition to the equipment cost, the costs associated with the operation of the information device are as follows:
  a. Communication service. The costs associated with the communication sessions.
  b. ISP, in the case of using the Internet.
  c. Information service. The costs associated with operating the information provider's site, including obtaining the information, storing it and allowing for communication with the information devices 10.

In general, these costs are to be covered by the user 201, as described below.

Communication Service Costs.
  a. In one or more business methods, the information device 10 uses no user associated cost communication, such as toll-free (1-800 numbers in the U.S.). In such a case, the communication cost is usually paid for by the vendor 203.
  b. In one or more business methods, wherein the information device 10 uses direct communication method such as PSTN wherein the information device 10 dials an associated specific information provider 206 number, the information provides 206 may use a service paid number, such as area code 900 in the U.S.
  c. In one or more business methods, the user 201 pays to the communication service provider 204 for the communication services. For example, in the case wherein the information device 10 uses telephony communication method such as PSTN or cellular telephony, communication charge are imposed by the provider 204. Since periodical calls are initiated, a constant and continuous charge is incurred.

Such Added Revenue Per User (ARPU) is mostly beneficial to most communication service provider, since the additional revenues do not require any additional infrastructure investment. As such, a business method wherein the communication service provider (e.g. Telco) 204 provides the information device 10 for nominal cost or even lower than nominal (e.g. free) is viable, wherein the ARPU covers the initial cost after a time.

Furthermore, since in some embodiments the dialing time may be set to be in low telephone traffic periods (e.g. nights, weekends), the additional traffic due to information device 10 initiated traffic do not degrade the regular service and does not require any upgrade or additional investment in the existing infrastructure.

In general, billing the user 201 for communication services by the provider 204 may be:
  a. One time fee.
  b. Flat fee for a period (e.g. monthly).
  c. Per communication session.
  d. Per lengths of communication sessions.
  e. Any combination of the above.

Furthermore, the provider 204 may use a contract to provide the user 201 with the information device 10, in order to 'lock' for a predetermined period (wherein changing provider will result in a fee). Such a model is commonly employed by many communication service providers in order to reduce churn (e.g. cellular telephone service providers with respect to cellular telephone set).

The business methods associated with selling via distribution channels 202 (e.g. retail store) commonly involve changing ownership of the information device 10, wherein after completion of the buying transaction the device 10 is fully owned by the user 201. However, common to other communication service associated devices, one or more business methods involved the ownership of an information device 10 may comprise owning by the communication service provider. Such a model is commonly used regarding Set Top Boxes provided by CATV providers. In some of these methods, the user is requested to pay a periodic (e.g. monthly) fee for renting the device.

In one or more business methods, the information device 10 may comprise a unique addressing means, allowing it to communicate only through a specific service provider. This is similar to cellular telephone sets which may work only in conjunction with a specific cellular telephony provider.

ISP Service Costs.

ISP 205 is required wherein the communication uses the Internet. However, the term ISP should be interpreted to include any network (additional to the communication network described above) required to be used in order to access the server 32. All business methods described above with respect to communication service provider 204 may equally be employed with respect to ISPs. The costs associated with the ISP 205 may also be covered by the vendor 203. Most ISPs charge a flat fee for their services.

Information Service Costs.
  a. Free information service. In this case, there is no cost to the user 201 due to the information obtained. Most existing Internet web pages are available at no charge, including most of the major newspaper and radio/TV news stations. Hence, in one or more embodiments, the information device 10 may download information from such web pages.

In one or more embodiments, the vendor 203 serves also as information provider 206 (line 207). For example, the vendor 203 may operate a web page containing information to be downloaded to the information devices 10.

b. Commercial publication based service. In this case the information obtained comprises publicity information. Such a business method is commonly used in television and radio station broadcasting.

c. Paid information service. In this case the user 201 is charged for the information obtained. In general, billing the user 201 for information services by the provider 206 may be:

a. One time fee.
b. Flat fee for a period (e.g. monthly).
c. Per communication session.
d. Per lengths of communication sessions.
e. Per the information required: Type and quantity.
f. Any combination of the above.

In order to allow such paid information the connecting information device should be authorized to obtain the required information, such as a password or transmitting device address or other identification means as described above and as known in the art.

The invention embraces any combination of the above embodiments. Furthermore, while the above business methods have been so far described with respect to the information device 10, it will be appreciated that such methods are applicable to other types of devices, including any devices which automatically or periodically communicate with a remote location.

Distinction Over Prior Art.

U.S. Pat. No. 6,442,573 to Schiller et al. describes a device which automatically and periodically communicates to obtain and display information. However, the following aspects distinguish the present invention over Schiller et al.:

a. The system described by Schiller et al. is oriented towards sending data (images) from one user to another through a provider server, while the present invention relates to information sent solely from a provider to a user.

b. In Schiller et al. the information received is considered private and is solely targeted towards a specific user, and uses secured mechanism in order not to be shared by any other users, while the present invention refers to public information that may be accessed by multiple users.

c. The information discussed by Schiller et al. comprises images. Images are known to require large files, hence requiring large memory and long communication sessions. Furthermore, the display means oriented towards displaying images requires high quality, high resolution and large screens. In contrast, the information transported as part of the present invention may be of any type, such as simple text data requiring relatively small, low-resolution display means.

d. The system described by Schiller et al. is based on mail delivery system over the Internet. No such limitation is imposed by the present invention since no mailing services are discussed.

e. The information transported in the system described by Schiller et al. (e.g. the images) is generated by a user, and is usually not of interest to the general public. The information in the present invention is mostly oriented towards general public (or a user's group) interest information, which in most cases may be accessed through other communication channels.

f. The system described by Schiller et al. is based on multiple devices working in concert (community/family type). Devices according to the present invention are not related to each other in any way.

There are many prior-art solutions known as 'push technology', such as by PointCast (currently Infogate Inc., of San-Diego, Calif. USA). Such solutions involve 'pushing' information to a personal computer via the Internet using an Internet browser. It will be appreciated that the present invention is distinguished over such solutions since a dedicated device is used rather than a personal computer. Furthermore, the information device according to the present invention is 'always on' and obtains the information continuously while a personal computer needs to be manually turned on and the browser must be operative for obtaining data.

Although exemplary embodiments of the present invention have been described, this should not be construed to limit the scope of the appended claims. Those skilled in the art will understand that various modifications may be made to the described embodiment. Moreover, to those skilled in the various arts, the invention itself a described herein will suggest solutions to other tasks and adaptations for other applications. It is therefore desired that the present embodiments be considered in all respects as illustrative and not restrictive, reference being made to appended claims rather than the foregoing description to indicate the scope of the invention.

What is claimed is:

1. A telephone set operative for making and receiving telephone calls, the telephone set being further operative for obtaining digital data over a WLAN (Wireless Local Area Network) via the Internet from a first remote information server that is identified by a Uniform Resource Locator (URL), and for displaying the digital data, the telephone set comprising:

a telephone apparatus operative for making and receiving telephone calls;

a first memory for storing the URL identifying the first remote information server;

a WLAN antenna for transmitting and receiving digital data over the air;

a WLAN transceiver coupled to the WLAN antenna for bi-directional packet-based digital data communication over the WLAN via the WLAN antenna;

a display component coupled for displaying the digital data received via the WLAN antenna; and a single enclosure housing the telephone apparatus, the WLAN transceiver, the first memory, and the display component, wherein the telephone set has an Internet address identifying the telephone set in the Internet, and the telephone set is further operative for receiving and displaying the digital data received from the first remote information server, and wherein the telephone set is operative to initiate a communication with the first remote information server after a set period following a prior communication session.

2. The telephone set according to claim 1, wherein the WLAN is substantially according to IEEE802.11 standard, and wherein the WLAN transceiver is operative to communicate substantially according to IEEE802.11 standard.

3. The telephone set according to claim 1, wherein: the display component is a video display component; and the telephone set is further operative for obtaining and displaying, on the video display component, the received digital data.

4. The telephone set according to claim 1, wherein the telephone set has a stored digital address and is further operative to send the digital address and a request for digital data to the first remote information server, and to obtain and display the digital data received from the first remote information server in response to the sent request for information.

5. The telephone set according to claim 1, wherein the telephone set has a stored digital address and is further operative to send the digital address and a request for digital data to the first remote information server, and to obtain and display the digital data received from the first remote information server in response to the sent request for information.

6. The telephone set according to claim 1, wherein the communication with the first remote information server is based on Internet Protocol (IP) suite.

7. The telephone set according to claim 6, wherein the communication with the first remote information server is based on TCP/IP.

8. The telephone set according to claim 1, wherein the telephone set has a digital address that is a MAC address or an IP address.

9. The telephone set according to claim 1, wherein the display component comprises a flat screen that is based on Liquid Crystal Display (LCD) technology.

10. The telephone set according to claim 1, wherein the telephone set is operative for automatically and periodically communicating with the first remote information server at all times when the telephone set is in operation.

11. The telephone set according to claim 1, further comprising software and a processor for executing the software, the processor being coupled to control at least the WLAN transceiver and the display component.

12. The telephone set according to claim 11, wherein the processor is one of: a microprocessor; and a microcomputer, and the telephone set further comprises at least one user operated button or switch coupled to the processor, for user control of operation of the telephone set.

13. The telephone set according to claim 11, wherein the software includes at least part of a web client for communication with, and accessing information stored in, the remote information server.

14. The telephone set according to claim 13, wherein the at least part of a web client includes at least part of a graphical web browser.

15. The telephone set according to claim 14, wherein the at least part of a graphical web browser is based on Windows Internet Explorer.

16. The telephone set according to claim 1, wherein the telephone set is operative for communicating with a second remote information server via the Internet for receiving information from the second remote information server, and for displaying the information received from the second remote information server.

17. The telephone set according to claim 14, wherein the telephone set is adapted to communicate with the first and second remote information servers for obtaining selected and distinct information from each remote information server.

18. The telephone set according to claim 1, wherein the set period is at least one of: set by the user; set previously in the telephone set; and set by the first remote information server in a previous communication session.

19. The telephone set according to claim 1, wherein the telephone set is operative to initiate a communication with the first remote information server on a daily basis at a pre-set time of day.

20. The telephone set according to claim 19, wherein the pre-set time of day is at least one of: set by the user; set previously in the telephone set; and set by the remote information server in a previous communication session.

21. The telephone set according to claim 1, wherein the digital data received from the first remote information server and displayed comprises a future event, a planned activity or a forecast of a situation.

22. The telephone set according to claim 21, wherein the digital data received from the first remote information server includes at least one of: a weather forecast; a future sports event; a future culture event; a future entertainment event; a TV station guide; and a radio station guide.

23. The telephone set according to claim 1, wherein the telephone set is further operative to obtain and display, on the display component, information relating to a user-selected geographical location region.

24. The telephone set according to claim 1, wherein the single enclosure is constructed to have a form substantially similar to that of a conventional telephone set.

* * * * *